(12) United States Patent
Rajagopal et al.

(10) Patent No.: US 9,531,573 B2
(45) Date of Patent: Dec. 27, 2016

(54) METHODS AND APPARATUS FOR CYCLIC PREFIX REDUCTION IN MMWAVE MOBILE COMMUNICATION SYSTEMS

(71) Applicant: Samsung Electronics Co., LTD, Suwon-si, Gyeonggi-do (KR)

(72) Inventors: Sridhar Rajagopal, Plano, TX (US); Shadi Abu-Surra, Richardson, TX (US); Ankit Gupta, Richardson, TX (US); Sudhir Ramakrishna, Plano, TX (US); Kaushik Josiam, Dallas, TX (US); Zhouyue Pi, Allen, TX (US); Ying Li, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/856,797

(22) Filed: Apr. 4, 2013

(65) Prior Publication Data

US 2013/0315321 A1 Nov. 28, 2013

Related U.S. Application Data

(60) Provisional application No. 61/799,356, filed on Mar. 15, 2013, provisional application No. 61/655,902, (Continued)

(51) Int. Cl.
*H04K 1/10* (2006.01)
*H04L 27/28* (2006.01)
(Continued)

(52) U.S. Cl.
CPC ......... *H04L 27/2607* (2013.01); *H04B 7/0695* (2013.01); *H04J 13/0062* (2013.01); *H04L 27/261* (2013.01); *H04L 1/0031* (2013.01)

(58) Field of Classification Search
CPC ............... H04L 27/2607; H04L 1/0031; H04L 25/0212; H04L 25/0204; H04L 25/0224; H04L 25/0228; H04L 5/0051; H04B 7/0695; H04B 7/086; H04B 7/088; H04B 7/0413; H04J 13/0062
(Continued)

(56) References Cited

U.S. PATENT DOCUMENTS

2006/0013325 A1* 1/2006 Agrawal et al. .............. 375/260
2006/0067441 A1* 3/2006 Park et al. .................... 375/346
(Continued)

OTHER PUBLICATIONS

Mo Zhu; Awoseyila, A.B.; Evans, B.G., "Low complexity time-domain channel and delay spread estimation for OFDM systems," Consumer Electronics, IEEE Transactions on , vol. 56, No. 4, pp. 2170,2177, Nov. 2010.*

(Continued)

*Primary Examiner* — Hirdepal Singh
*Assistant Examiner* — Amneet Singh

(57) ABSTRACT

To reduce the duration of a cyclic prefix used for a multiple input, multiple output (MIMO) communications channel, delay spread variations for different transmit/receive beam pair combination is estimated and used for fast beam switching and to support single user MIMO (SU-MIMO) even when the CP difference between two beams is large. Beam switching reference signals are employed to estimate delay spread exceeding current CP, and to support beam switching. CP covering sub-clusters within clusters for the MIMO channel are exploited to reduce the CP requirement and improve efficiency. Any one of a number of different CP durations may be selected for each different mobile station, using one of a finite set of subframe configurations for which the CP durations of different symbol locations within the subframe are predefined. Dynamically switching subframe configurations by the system accommodates high mobility.

27 Claims, 36 Drawing Sheets

Related U.S. Application Data filed on Jun. 5, 2012, provisional application No. 61/621,842, filed on Apr. 9, 2012, provisional application No. 61/655,888, filed on Jun. 5, 2012.

(51) Int. Cl.
| | | |
|---|---|---|
| *H04L 27/26* | (2006.01) | |
| *H04J 13/00* | (2011.01) | |
| *H04B 7/06* | (2006.01) | |
| *H04L 1/00* | (2006.01) | |

(58) Field of Classification Search
USPC .................................. 375/260, 231; 455/273
See application file for complete search history.

(56) References Cited

U.S. PATENT DOCUMENTS

| | | | |
|---|---|---|---|
| 2007/0211822 A1* | 9/2007 | Olesen ................. | H04B 7/0697 375/299 |
| 2008/0068980 A1* | 3/2008 | Lim ..................... | H04L 25/0226 370/208 |
| 2008/0080472 A1* | 4/2008 | Bertrand et al. .............. | 370/344 |
| 2008/0285670 A1* | 11/2008 | Walton et al. ................. | 375/260 |
| 2009/0290661 A1* | 11/2009 | Barriac et al. ............... | 375/343 |
| 2010/0075705 A1 | 3/2010 | van Rensburg et al. | |
| 2010/0210219 A1* | 8/2010 | Stirling-Gallacher et al. ........................... | 455/67.11 |
| 2010/0239034 A1* | 9/2010 | Lee et al. ....................... | 375/260 |
| 2010/0303165 A1* | 12/2010 | Gore et al. ..................... | 375/260 |
| 2010/0323612 A1 | 12/2010 | Xu et al. | |
| 2011/0033012 A1 | 2/2011 | Matsuoka et al. | |
| 2011/0158342 A1* | 6/2011 | Srinivasan et al. ........... | 375/285 |
| 2011/0274187 A1* | 11/2011 | Huang ................ | H04L 25/0216 375/260 |
| 2011/0280294 A1* | 11/2011 | Luo et al. ...................... | 375/224 |
| 2011/0312355 A1* | 12/2011 | Cheng et al. .................. | 455/501 |
| 2012/0027048 A1* | 2/2012 | Lindoff et al. ................. | 375/140 |
| 2012/0033636 A1* | 2/2012 | McCoy .......................... | 370/329 |
| 2012/0147821 A1* | 6/2012 | Bertrand et al. .............. | 370/328 |
| 2012/0182857 A1* | 7/2012 | Bertrand et al. .............. | 370/210 |
| 2012/0182895 A1* | 7/2012 | Jwa ............................... | 370/252 |
| 2012/0195246 A1* | 8/2012 | Papasakellariou et al. .. | 370/311 |
| 2012/0307704 A1* | 12/2012 | Roman ............... | H04W 56/004 370/312 |
| 2012/0309426 A1* | 12/2012 | Lee et al. ..................... | 455/456.3 |
| 2013/0070869 A1* | 3/2013 | Motamed et al. ............ | 375/295 |
| 2013/0244676 A1* | 9/2013 | Koivisto ............. | H04L 25/0224 455/452.1 |

OTHER PUBLICATIONS

Jun-Hee Jang; Se-Bin Im; Jeong-soon Park; Hyung-Jin Choi, "DFT-based decision directed channel estimation for OFDM systems in very large delay spread channels," Communications, 2008. APCC 2008. 14th Asia-Pacific Conference on , vol., No., pp. 1,5, Oct. 14-16, 2008.*

Semlani, Y.; Stephenne, A.; Affes, S., "A Downlink Switched-Beam OFDM Pilot Scheme Based on Subcarrier-Multiplexing," Communications, 2006 23rd Biennial Symposium on , vol., No., pp. 291,294, 0-0 0.*

Yucek, T.; Arslan, H., "Time Dispersion and Delay Spread Estimation for Adaptive OFDM Systems," Vehicular Technology, IEEE Transactions on , vol. 57, No. 3, pp. 1715,1722, May 2008.*

Zyren, J., "Overview of the 3GPP Long Term Evolution Physical Layer" Freescale semiconductor, Jul. 2007, pp. 1-24.*

Zhang Zhao-yang, Lai Li-feng, "A novel OFDM transmission scheme with length-adaptive Cyclic Prefix", Journal of Zhejiang University Science, 2004, pp. 1336-1342.*

Yucek, T.; Arslan, H., "Delay spread and time dispersion estimation for adaptive OFDM systems," Wireless Communications and Networking Conference, 2006. WCNC 2006. IEEE , vol. 3, No., pp. 1433,1438, Apr. 3-6, 2006.*

International Search Report dated Jul. 26, 2013 in connection with International Patent Application No. PCT/KR2013/002968, 3 pages.

Written Opinion of International Searching Authority dated Jul. 26, 2013 in connection with International Patent Application No. PCT/KR2013/002968, 5 pages.

Extended European Search Report dated Oct. 29, 2015 in connection with European Patent Application No. 13776330.6, 7 pages.

\* cited by examiner

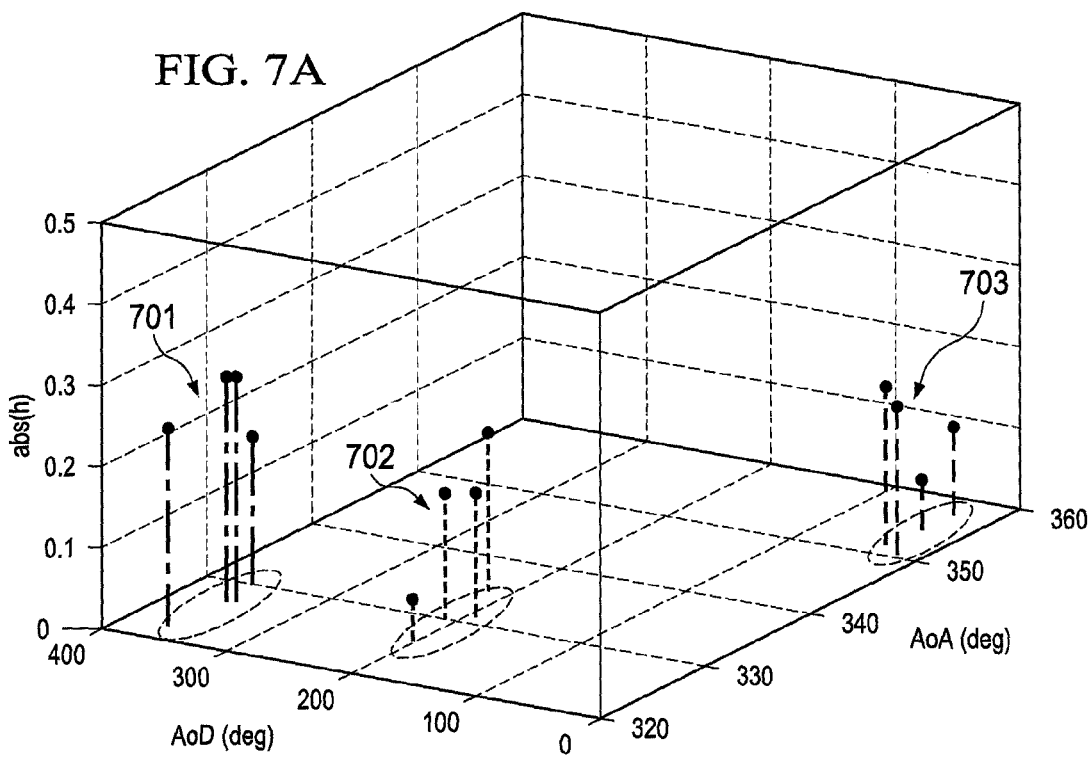
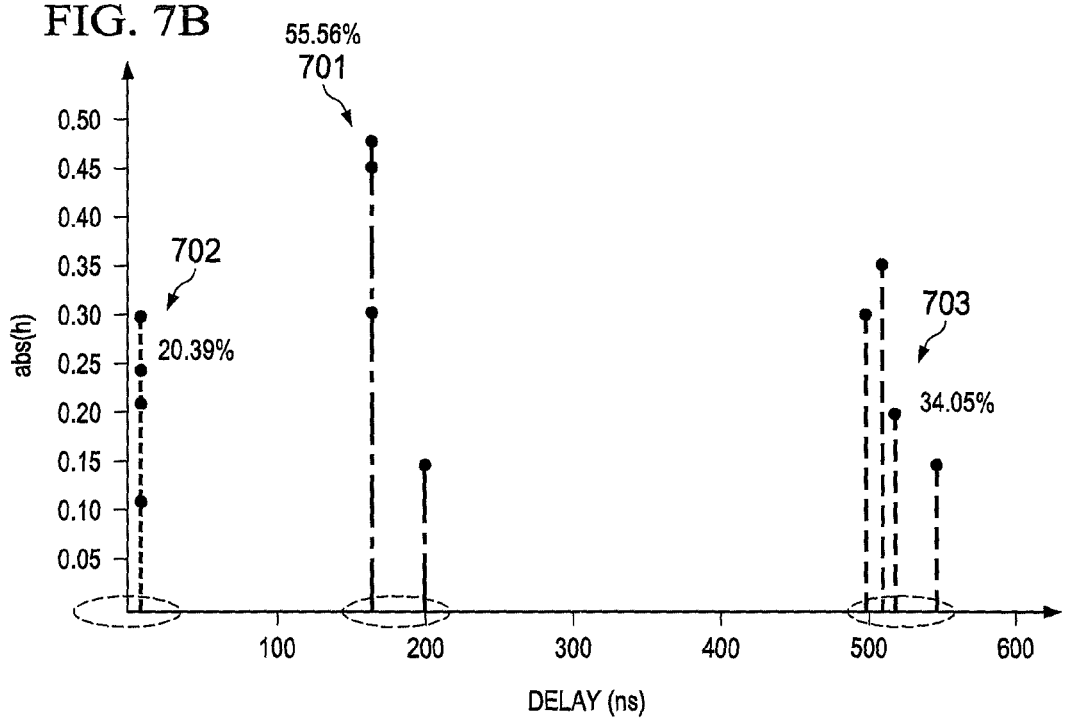

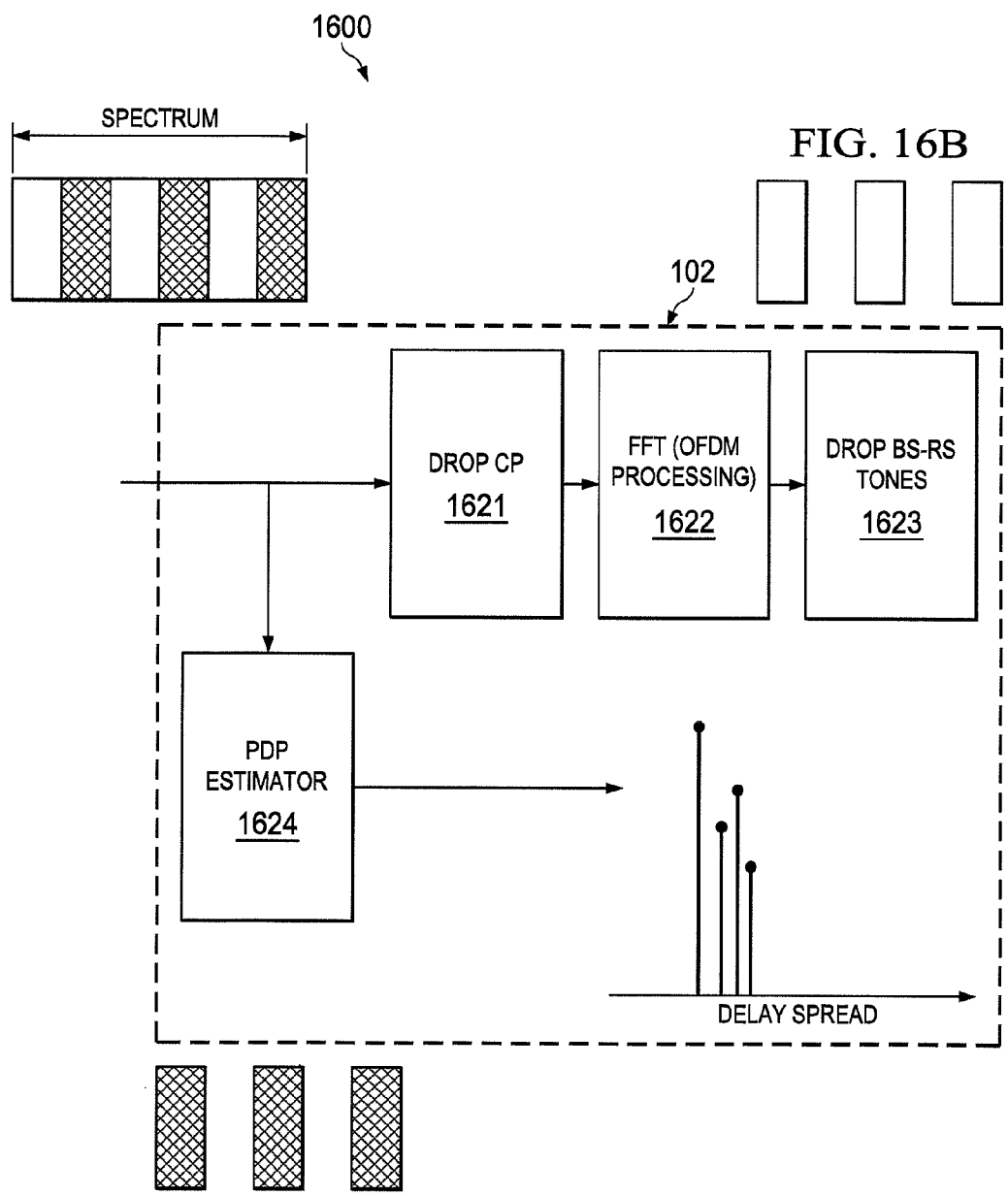

PHY RESOURCE TILE FOR PREFERRED
CP FEEDBACK CHANNEL TO CARRY
THE SEQUENCE OF THE CP INDEX

METHODS AND APPARATUS FOR CYCLIC PREFIX REDUCTION IN MMWAVE MOBILE COMMUNICATION SYSTEMS

This application hereby incorporates by reference U.S. Provisional Patent Application No. 61/799,356, filed Mar. 15, 2013, entitled "METHOD AND APPARATUS FOR CYCLIC PREFIX REDUCTION IN MMWAVE MOBILE COMMUNICATION SYSTEM," U.S. Provisional Patent Application No. 61/655,888, filed Jun. 5, 2012, entitled "METHOD AND APPARATUS FOR CYCLIC PREFIX REDUCTION IN MMWAVE MOBILE COMMUNICATION SYSTEM," U.S. Provisional Patent Application No. 61/655,902, filed Jun. 5, 2012, entitled "METHOD AND APPARATUS FOR CYCLIC PREFIX REDUCTION IN MMWAVE MOBILE COMMUNICATION SYSTEM," and U.S. Provisional Patent Application Ser. No. 61/621,842, filed Apr. 9, 2012, entitled "CONFIGURABLE CP IN AN OFDM COMMUNICATION SYSTEM."

TECHNICAL FIELD

The present disclosure relates generally to cyclic prefix duration in wireless mobile communication systems and, more specifically, to reducing cyclic prefix duration to accommodate the increased control overhead associated with beamforming.

BACKGROUND

In an Orthogonal Frequency Division Multiplexing (OFDM) wireless communications system, a cyclic prefix (CP) is added to the front of each OFDM symbol to overcome inter symbol interference (ISI). When two consecutive OFDM symbols are transmitted from the base station and there are two communications paths from the base station to the mobile station, the mobile station receives two replicas of the symbol pair at different corresponding path delays, resulting on one symbol in one pair overlapping (in time) the other symbol in the second pair. That temporal overlap of the two symbols creates the potential for ISI, and is overcome by adding the CP. As the delay spread between the two different path delays becomes larger, a longer duration CP is needed to eliminate the possibility of overlap. However, a longer CP decreases the data rates by allocating less of the available time to data transmission.

There is, therefore, a need in the art for reduced cyclic prefix duration as delay spread increases within multiple transmission path environments.

SUMMARY

To reduce the duration of a cyclic prefix used for a multiple input, multiple output (MIMO) communications channel, delay spread variations for different transmit/receive beam pair combination is estimated and used for fast beam switching and to support single user MIMO (SU-MIMO) even when the CP difference between two beams is large. Beam switching reference signals are employed to estimate delay spread exceeding current CP, and to support beam switching. CP covering sub-clusters within clusters for the MIMO channel are exploited to reduce the CP requirement and improve efficiency. Any one of a number of different CP durations may be selected for each different mobile station, using one of a finite set of subframe configurations for which the CP durations of different symbol locations within the subframe are predefined. Dynamically switching subframe configurations by the system accommodates high mobility.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, where such a device, system or part may be implemented in hardware that is programmable by firmware or software. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 7A and 7B illustrate delay spread variation with omni-directional antennas;

FIGS. 16A and 16B depict a BS-RS transmitter and receiver architecture design for use in estimating delay spread for millimeter wave wireless communications in accordance with still another embodiment of the present disclosure;

DETAILED DESCRIPTION

FIGS. 1 through 39, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Figure 1:
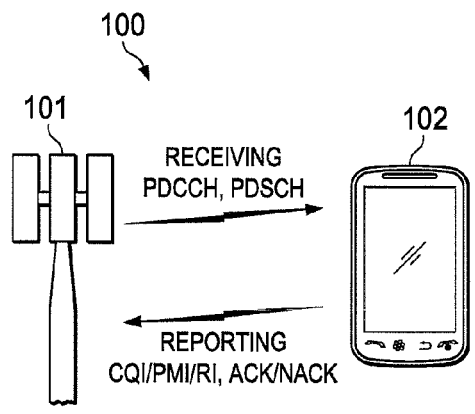
FIG. 1 is a high level diagram illustrating an exemplary wireless communication system Physical Downlink Shared CHannel (PDSCH) operating procedure.

The physical downlink shared channel (PDSCH) is used in mobile communication systems such as Long Term Evolution (LTE) to send common user data and control information (such as paging messages) to all mobile devices operating within a coverage area. The PDSCH is utilized basically for data and multimedia transport, and therefore is designed for very high data rates. FIG. 1 is a high level diagram illustrating an exemplary wireless communication system PDSCH operating procedure. Open-loop and closed-loop modes of operation are both supported during wireless communications 100 between a base station (BS) 101 and a mobile station (MS) or user equipment (UE) 102. Closed-loop modes are characterized by detailed information about the channel state being available at the transmitter, including information such as sub-band channel quality information (CQI), precoding matrix information (PMI) and rank information (RI) if multiple input, multiple output (MIMO) communication is employed. However, due to implementation complexity or high mobility scenarios, in certain cases open-loop operation is desirable, where only partial information about the channel is available. For example, only a wideband CQI estimate (e.g., average CQI across all tones) may be available and there may be no PMI fed back to the transmitter in the case of MIMO transmission.

Figure 2:
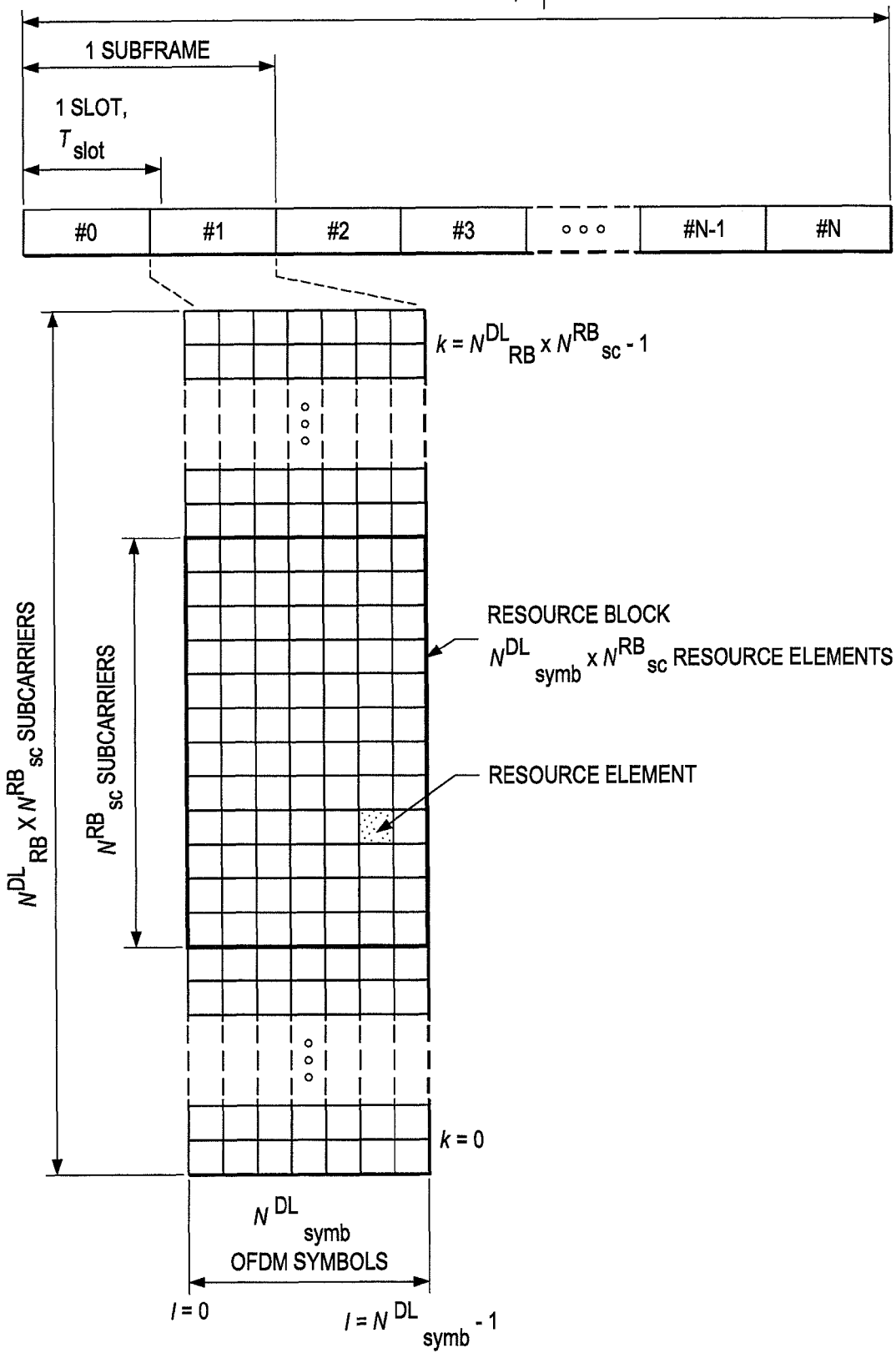
FIG. 2 illustrates one possible frame structure that may be employed for downlink transmission in wireless communications systems.

One possible frame structure that may be employed for downlink transmission in wireless communications systems is illustrated in FIG. 2, and includes frames $T_f$ divided into multiple transmission slots $T_{slot}$. The transmitted signal in each slot is further defined by one or more resource grids of $N_{RB}^{DL} N_{sc}^{RB}$ subcarriers and $N_{symb}^{DL}$ Orthogonal Frequency Division Multiplexing (OFDM) symbols. Each element in the resource grid for antenna port p is called a resource element and is uniquely identified within a slot by the index pair (k,l), where k=0, ..., $N_{RB}^{DL} N_{sc}^{RB}-1$ and l=0, ..., $N_{symb}^{DL}-1$ are the indices in the frequency and time domains, respectively. Resource element (k,l) on antenna port p corresponds to the complex value $a_{k,l}^{(p)}$. When there is no risk for confusion, or no particular antenna port is specified, the index p may be dropped.

There has been a recent interest in exploring millimeter wave (mmWave) frequencies for outdoor, mobile broadband communication for multi-gigabit/second (Gb/s) communication over several hundreds of meters. The current system designs in existing Third Generation and Fourth Generation (3G/4G) wireless standards, such as Long Term Evolution, Advanced (LTE-A), are close to capacity, which makes meeting the ever-increasing demands of higher data rate communication with limited spectrum below 3 gigaHertz (GHz) extremely difficult. Communication using higher mmWave frequencies provides access to potentially GHz of spectrum bandwidth, enabling multi-Gb/s communication.

Moving to higher millimeter wave (mmWave) frequencies for traditional outdoor mobile communication systems have been associated with challenges such as Line of Sight (LOS) directional communication, poor radio frequency (RF) efficiency and higher path loss. As a result, these frequencies have been typically deployed for wireless backhaul with fixed LOS transmitters and receivers, until recent increased interest in using mmWave frequencies for short range non-Line of Sight (NLOS) communication with multi-Gb/s data rates, especially at 60 GHz. These system designs have been include large antenna arrays to support beamforming, which compensates for the path loss and enables NLOS communication for stationary users over short distances.

For a given linear antenna array of size N, the gain is proportional to $10 \times \log_{10}(N)$ decibels (dB). However, the half power beam width (HPBW) is inversely proportional to N. Thus, large antenna arrays can give good beamforming gains but will have a very narrow beam width. This tradeoff between beamforming gain and the width of the beam can give rise to the challenges for the system design. Transmission of control information, broadcast signals, and multicast signals from a base station to multiple UEs requires a wide beam width, which results in low gain and low data rates. Transmission of user data to one specific UE may employ a narrow beam width, which allows for high gain and high data rates.

Traditional communication system designs with omni-directional transmissions are useful for control and broadcast data to all users, but are extremely inefficient for user-specific data communication since the energy is sent in all directions. Directional communication in the mmWave frequencies has the converse problem in the sense that directionality can be advantageous for user-specific data communication, but the control and broadcast channel design for multiple users can be challenging. For broadcast or control data, coverage is important, which translates into a large beamwidth and broadcast/control channels that can function with low signal-to-noise (SNR) where high beamforming gain is not required. For user specific data, high beamforming gain can be utilized for providing multi-Gb/s data rates but needs to be sent to a specific user in a specific direction, so that narrow beams are acceptable. As a result, both narrow and wide beam widths may be desired with the same antenna array. In addition, for user-specific communication, the user may be mobile or the channel may have variations due to fading/blocking, such that a very narrow beam may not be desired in all cases for reliability and mobility support.

Figure 3:
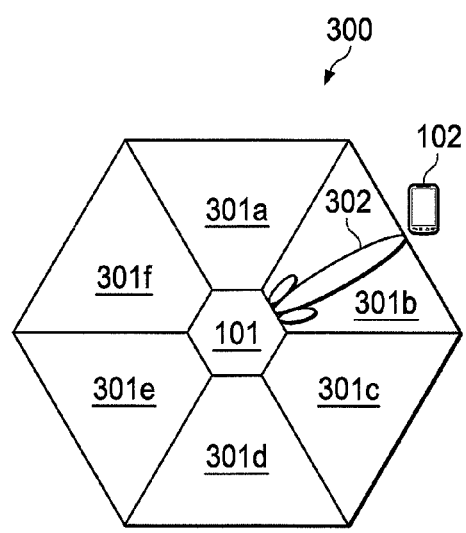
FIGS. 3 and 3A depict an example of a six-sector base station for millimeter wave communication.
Figure 3A:
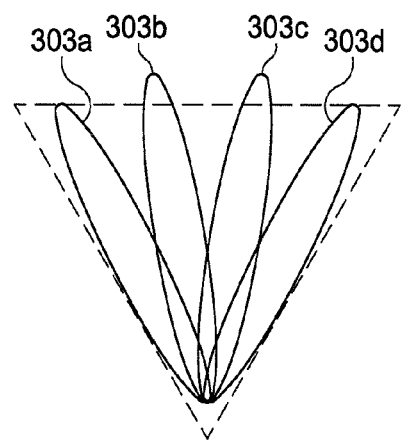

FIGS. 3 and 3A depict an example of a six-sector base station for millimeter wave communication. Using an antenna array at the base station 101, narrow, steered beams 302 can be transmitted to user equipment 102 within one of the six, 60° sectors 301a, 301b, 301c, 301d, 301e and 301f to provide high data rates via beamforming gains. Beamforming may also be performed at the receiver (for example, using a patch antenna array at UE 102) for additional beamforming gain. In order to provide a region that is sufficiently broad for control to attain some beamforming gain, a "slice" in the sector is defined. Each slice is defined as a region occupied by the beam 303a, 303b, 303c or 303d transmitted by the BS during a synchronization and control operation within a sector. For example, as shown in FIG. 3A, there may be four slices in a sector, covering 60° sector by beams of 15° each to obtain some beamforming gain. The control and synchronization information are repeated across these multiple slices to cover the entire sector.

Figure 4:
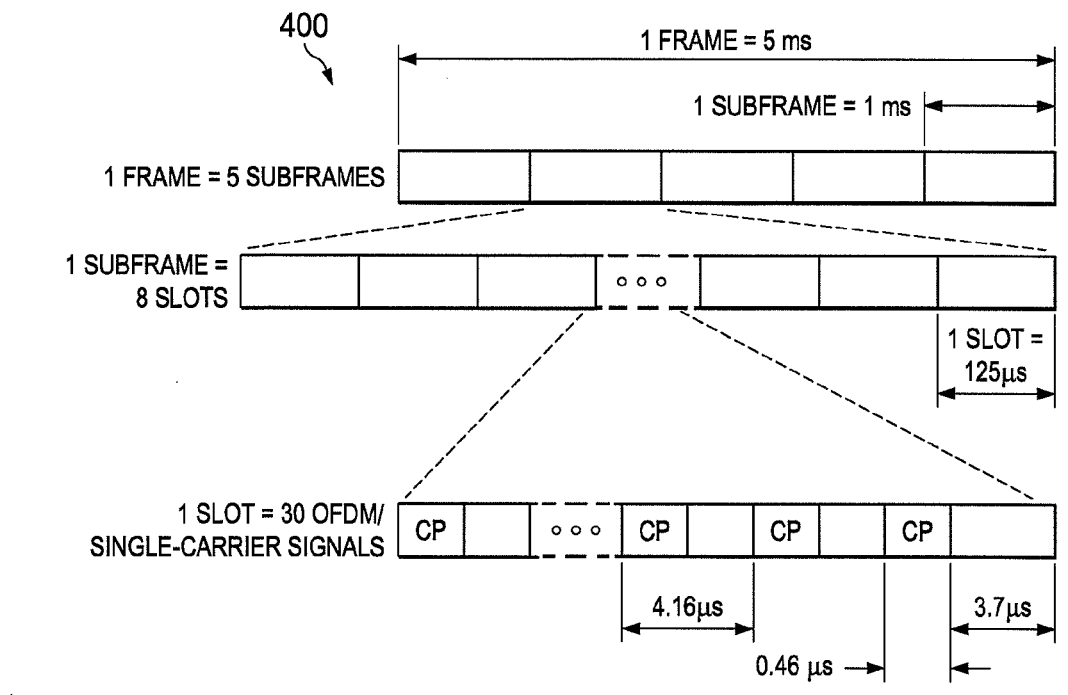
FIG. 4 illustrates a frame structure for a wireless communication system.

FIG. 4 illustrates a frame structure 400 that may be employed for a wireless communication system, such as a Fifth Generation (5G) system. OFDM symbols are grouped into a slot (for example, 30 OFDM symbols per slot) for scheduling granularity, with eight slots forming a subframe and five subframes within a frame. These different granularities (symbol, slot, subframe and frame) are the granularity at which data, control and reference symbols are transmitted. Each OFDM symbol is 4.16 microseconds (μs) in duration, such that a slot made up of thirty OFDM symbols is 125 μs in duration, a subframe is 1 millisecond (ms) in duration, and a frame is 5 ms in duration. Beamforming may be expected to be the mainstay of such a wireless communication system, which indicates the directive nature of transmission for both control and data. Directivity depends, among other things, on the location of the mobile station relative to the base station, the amount of shadowing within the communication path, and the presence of signal reflectors in the vicinity. Therefore, to identify the optimum direction for transmission between the MS and the BS, some form of training is required. The mobile stations must identify, from the different directions for transmissions (beams), the best beam that can support transmission between the respective MS and the BS. Reference symbols are transmitted in different directions, received by the MS, and processed to identify the best beam for transmissions between the MS and the BS.

Figure 5:
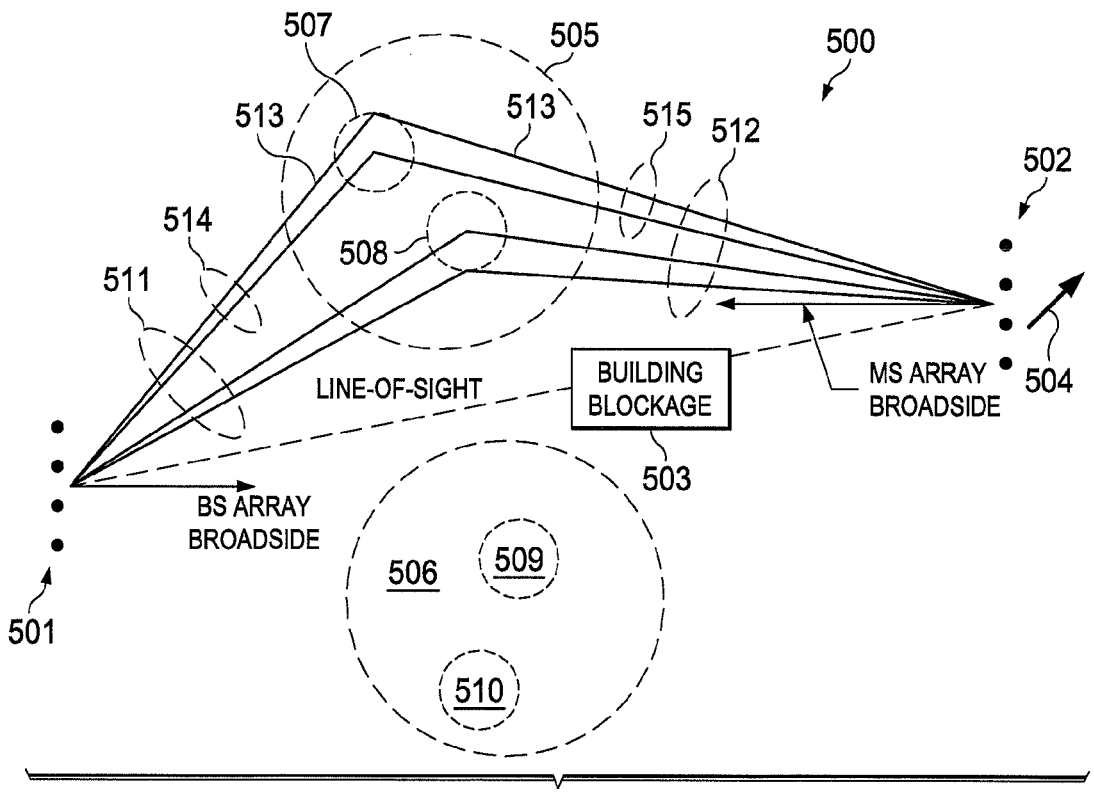
FIG. 5 is a diagrammatic depiction of an exemplary millimeter wave spatial channel in a multiple input, multiple output wireless communications system.

The design of the mmWave communication system requires a deeper understanding of the spatial channel model to understand the impact of beamforming on the system. FIG. 5 is a diagrammatic depiction of an exemplary mmWave spatial channel. The channel 500 as depicted represents typical spatial channel models such as those used in the Spatial Channel Model (SCM) and the WiGig 60 GHz channel models. The antenna array 501 for the BS 101 and the antenna array 502 for the MS 102 have respective array broadside orientations that are typically not aligned. Blockages 503 such as buildings may be located along the LOS between the two arrays 501, 502, and the mobile station may be moving at a vector 504 relative to the base station. Multiple spatial clusters 505, 506 are used to model multiple rays between the two arrays 501, 502. Multiple sub-path components within each ray (sub-clusters 507, 508, 509 and 510) are used to model time-domain evolution of the channel. Each cluster 505 represents paths between the two arrays 501, 502, with a respective transmission (Tx) cluster angular spread 511 and a respective reception (Rx) cluster angular spread 512. Each sub-cluster 507, 508, 509 and 510 represents a group of sub-paths (such as sub-path 513) with a respective Tx sub-cluster angular spread 514 and a respective Rx sub-cluster angular spread 515. The Tx/Rx beamforming is not part of the channel, but the effect of beamforming can be integrated in the parameterization of the channel model.

Figure 6A:
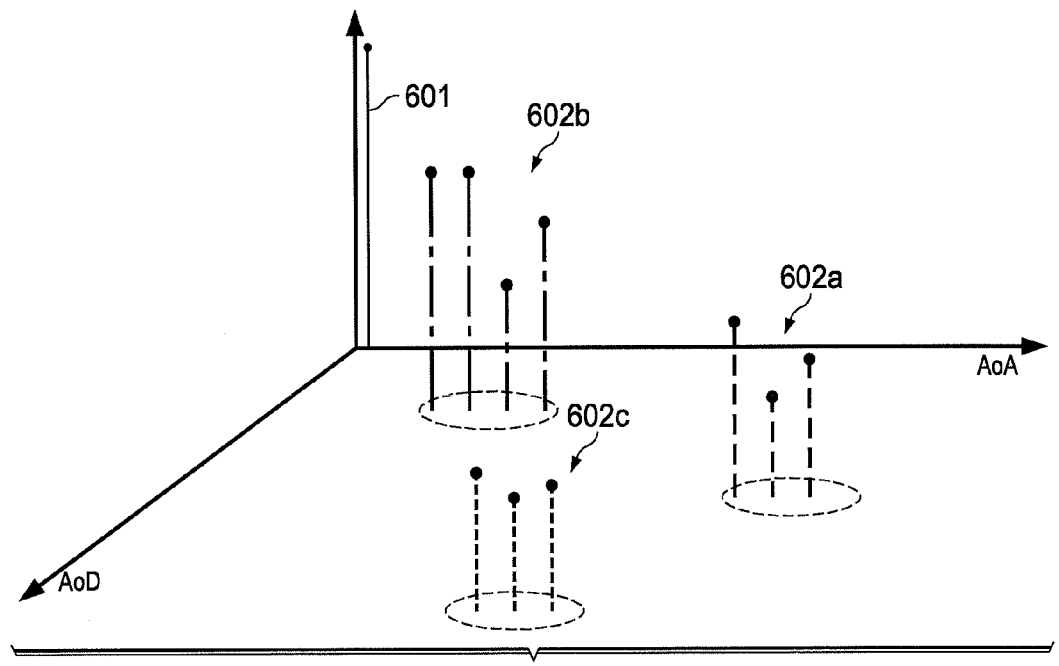
FIGS. 6A and 6B illustrate angle of arrival, angle of departure, and time of arrival for the signal paths taken by the different beams in a multiple input, multiple output wireless communications system.
Figure 6B:
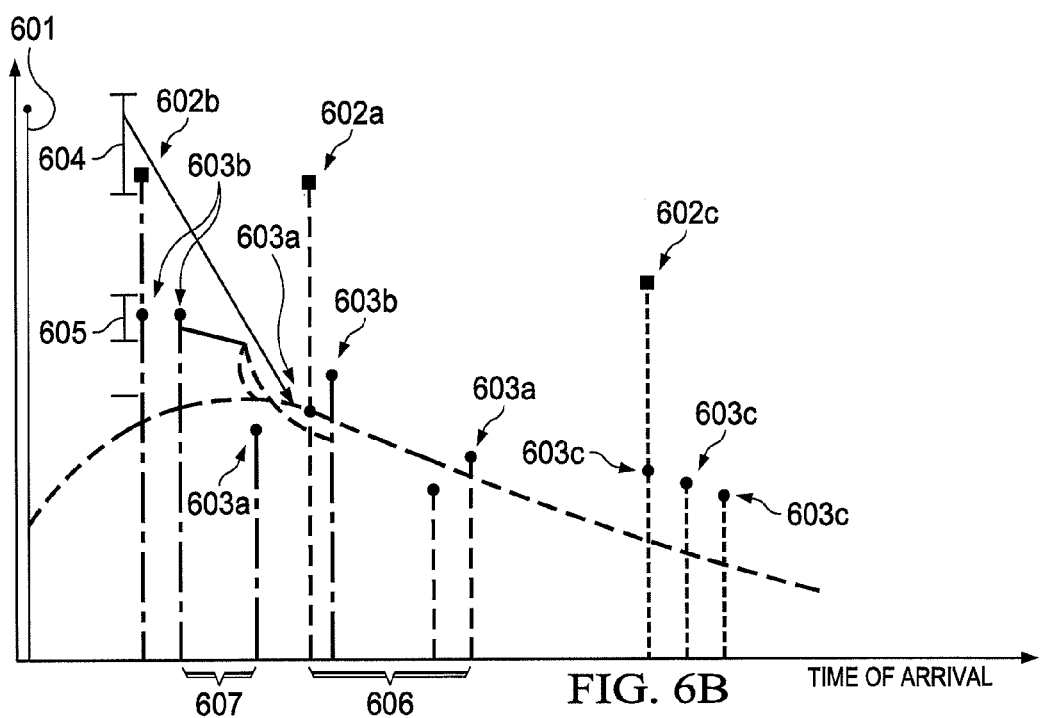

A cluster 505, 506 is defined as the spatially resolvable components of the channel, in angle-of-arrival (AoA) and angle-of-departure (AoD). Sub-clusters 507, 508, 509 and 510 refer to components that are time-of-arrival resolvable. The BS or UE 101 may be able to resolve clusters and sub-clusters if the UE is able to form beams with beamwidths smaller than the reference beamwidths. The paths within the sub-clusters may not be resolvable in space or time-of-arrival. The paths taken by the different beams (clusters) are distinctly separable based on AoA and AoD, as illustrated in FIGS. 6A and 6B. FIG. 6A illustrates separable clusters 602a, 602b and 602c plotted by AoA and AoD relative to LOS 601, while FIG. 6B illustrates time of arrival of sub-path signals including clusters 602a, 602b and 602c and sub-clusters 603a, 603b and 603c. The cluster shadowing 604 and sub-cluster shadowing 605 as well as the cluster delay spread 606 and the sub-cluster delay spread 607 is evident from the plot of FIG. 6B. Beamforming at the Tx or Rx can thus select some of these clusters which offer good communication performance while providing acceptable beamforming gains, minimizing wasted energy in undesirable directions and avoiding interference.

FIGS. 7A and 7B illustrate delay spread variation with omni-directional antennas. As can be seen, there are three clusters 701, 702 and 703 that can be separated in AoA and AoD and have approximately 50%, 20% and 25% respectively of the total normalized channel power.

Figure 8A:
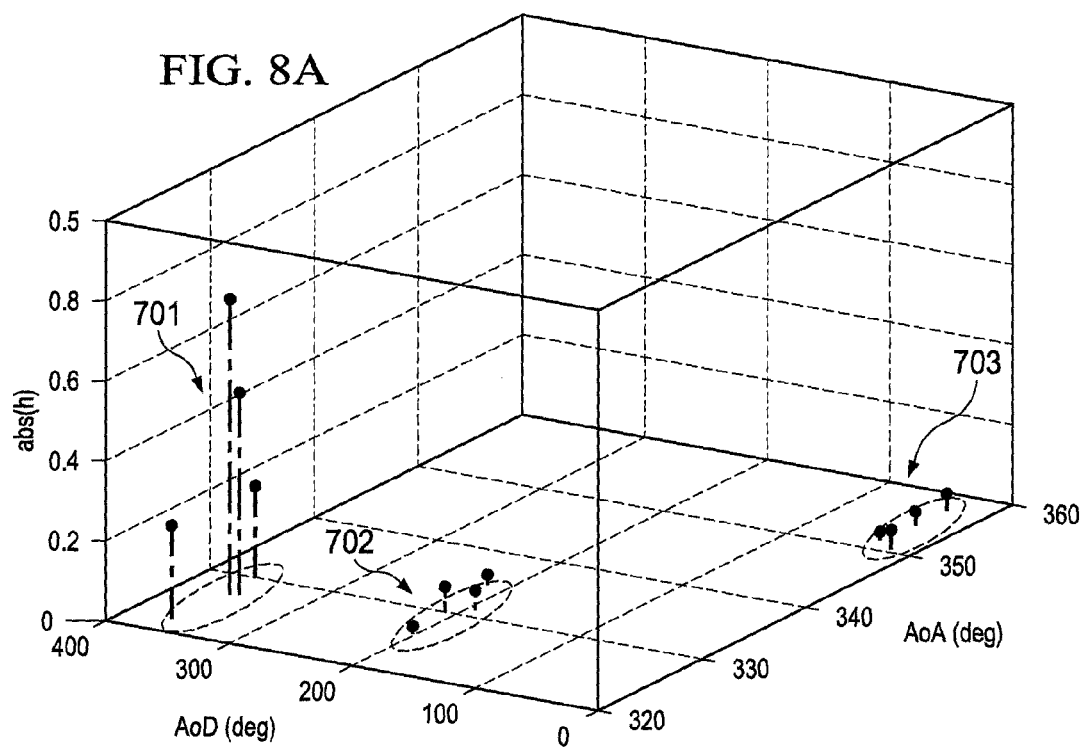
FIGS. 8A and 8B illustrate delay spread variation due to beamforming with phased antenna arrays, demonstrating the impact of beamforming on the channel statistics represented by FIGS. 7A and 7B.
Figure 8B:
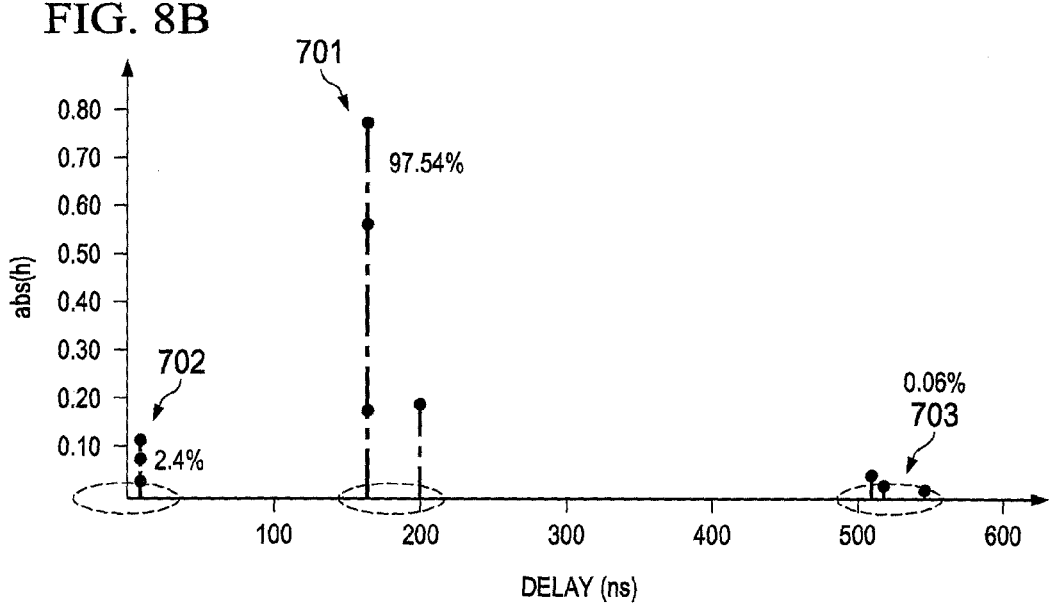
Figure 8C:
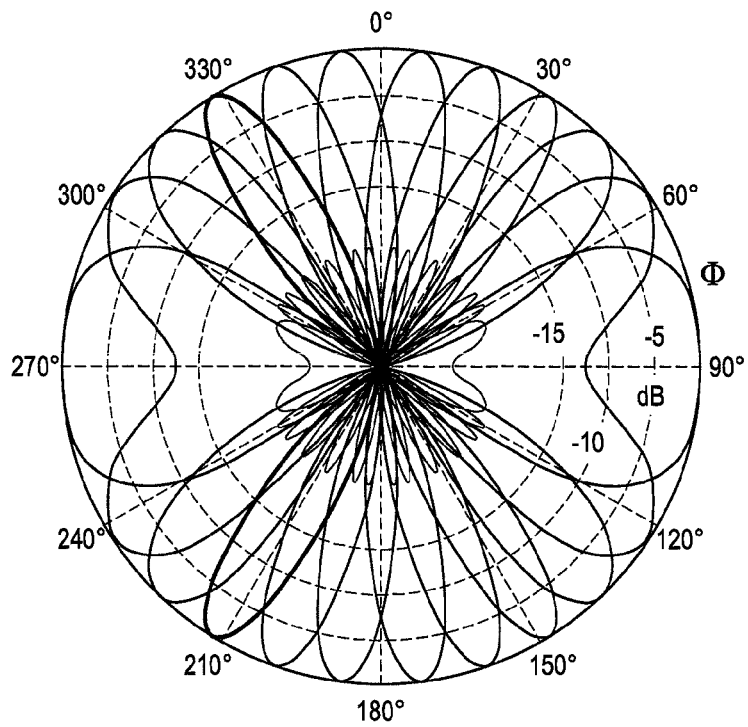
FIGS. 8C and 8D illustrate the beamforming employed for an eight element base station antenna array and a four element mobile station antenna array, respectively, in producing the delay spread variation shown in FIGS. 8A and 8B.
Figure 8D:
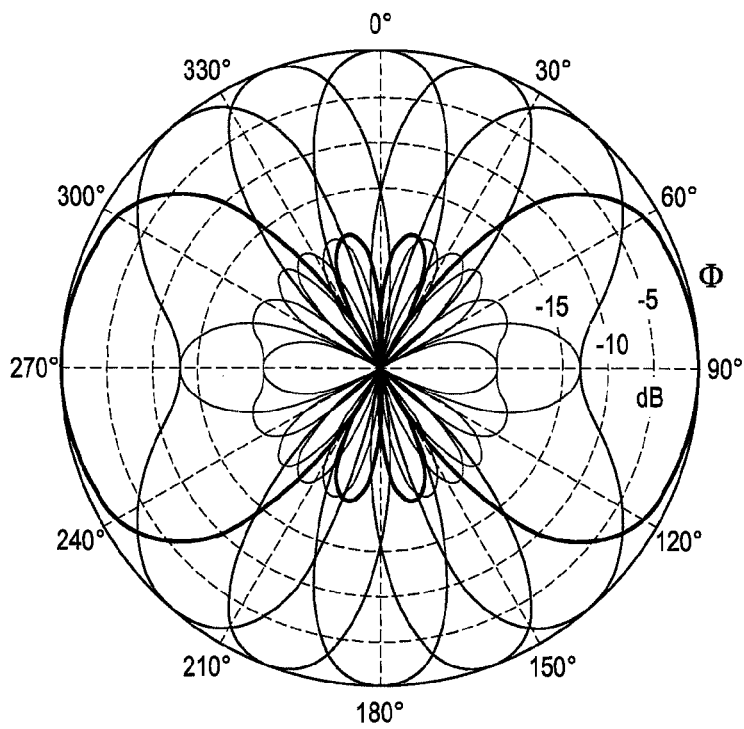

FIGS. 8A and 8B illustrate delay spread variation due to beamforming with phased antenna arrays, demonstrating the impact of beamforming on the channel statistics represented by FIGS. 7A and 7B. A linear array of eight antenna elements at the BS is assumed, and a linear array of four antenna elements at the UE. The BS is beamformed to select an AoA of 330° while the MS is beamformed to select an AoD of 90°, as illustrated respectively in FIGS. 8C and 8D. In this case, the cluster 701 that was capturing 55% of the total channel power is enhanced by beamforming to now capture 98% of the total channel power.

Figure 9:
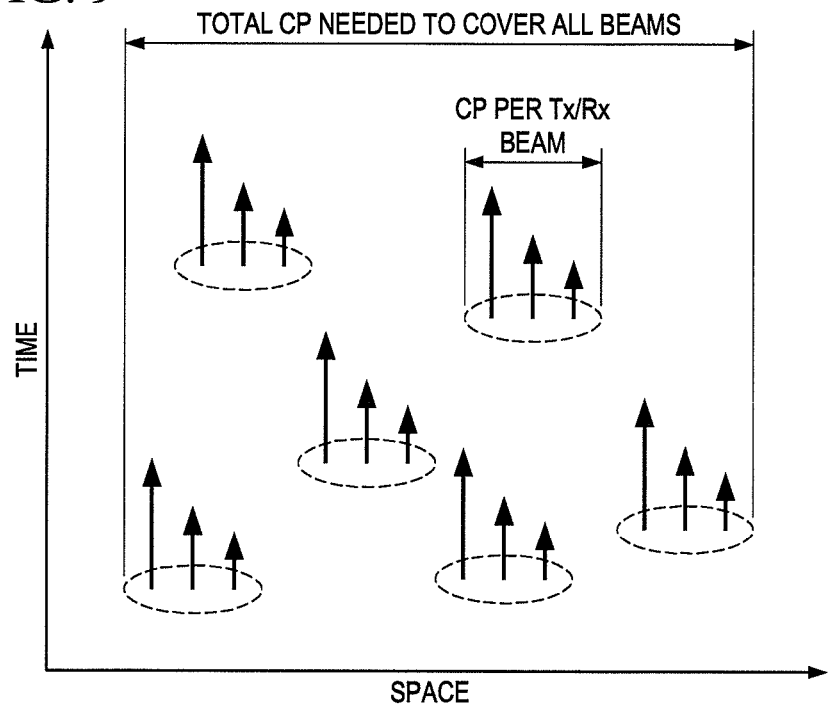
FIG. 9 illustrates delay spread variation across space and time and the associated cyclic prefix requirements in a millimeter wave wireless communications system in accordance with one embodiment of the present disclosure.

FIG. 9 illustrates delay spread variation across space and time and the associated cyclic performance requirements in millimeter wave wireless communications system in accordance with one embodiment of the present disclosure. The present disclosure focuses on the issue of wide delay spread estimation during data transmission in mmWave mobile systems. If there is no a priori knowledge of the beams and the system is designed to cover all possible beams, the cyclic prefix (CP) needed in an OFDM signal may be quite large (in some cases, exceeding 1 μs for example). If the system is designed with this CP, the total CP overhead may be increased by more than 100%. When beamforming is used at the BS or UE, only a subset of the total CP is received by the UE. Hence, designing the system to take advantage of the reduced CP due to beamforming can help reduce the CP requirements in the system and improve efficiency.

Figure 10A:
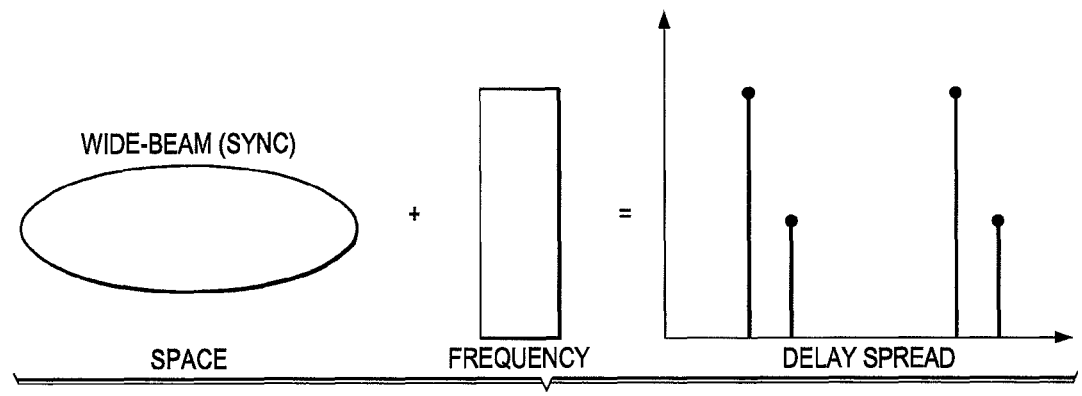
FIGS. 10A, 10B and 10C illustrate delay spread variation due to alternative designs using different existing reference signals to estimate delay spread for millimeter wave wireless communications in accordance with one embodiment of the present disclosure.
Figure 10B:
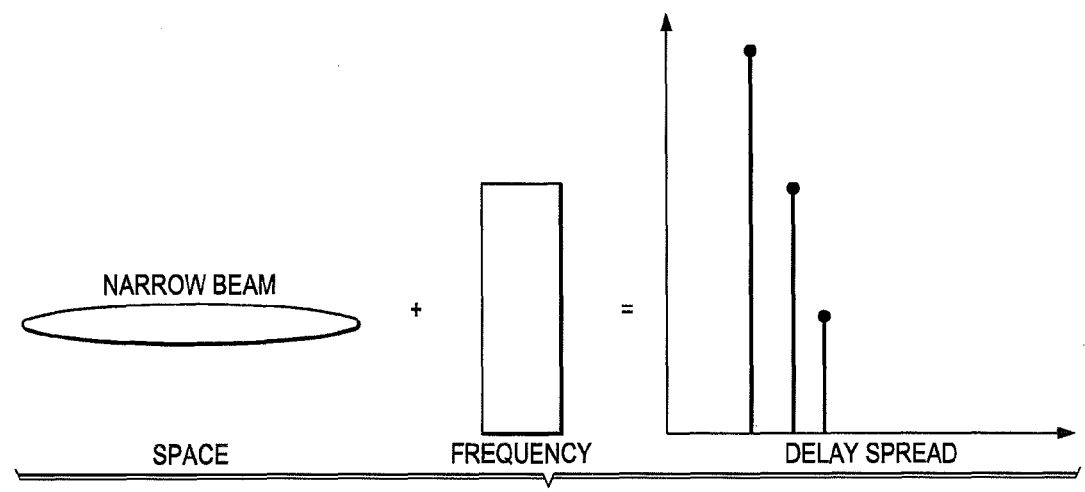
Figure 10C:
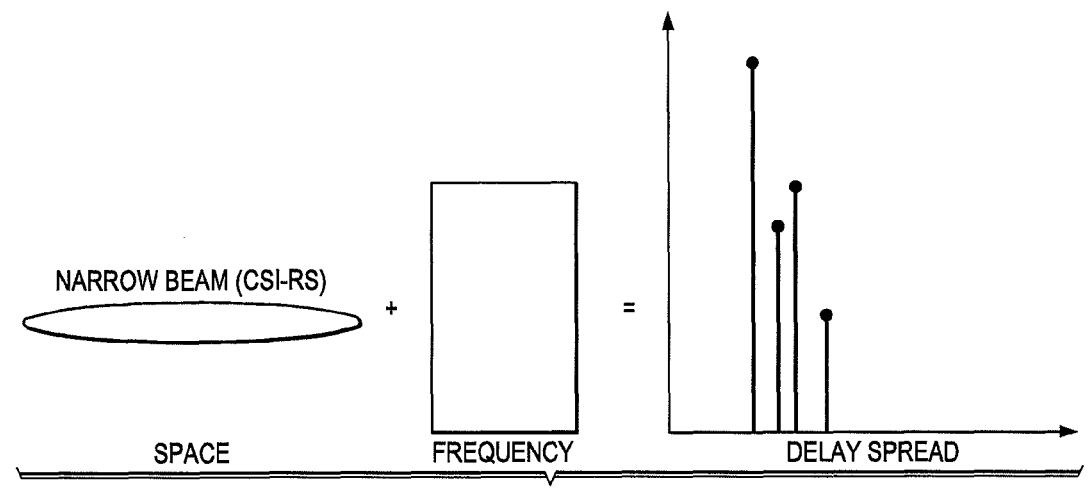

Several reference signals existing in communication standards offer means to estimate the delay spread. For example, the SYNC signal, which is typically a wide-beamwidth signal operating within a minimum system bandwidth, may be used to get a coarse estimate of the delay spread, as illustrated in FIG. 10A. However, the PDSCH channel may use a much finer beamwidth, effectively selecting some clusters or sub-clusters and eliminating other clusters as illustrated in FIG. 10B. In addition, the beamforming gain can further enhance the amplitude taps of the channel, showing more channel taps that were previously below the noise floor. PDSCH also uses a wide-bandwidth signal, which may make more taps appear due to increased frequency selectivity. Thus, as illustrated in FIG. 10C, the channel state information may be captured using channel state information reference signals (CSI-RSs), which are typically narrow in beamwidth (same as PDSCH) and spread wide in frequency to capture multipath diversity.

Figure 11A:
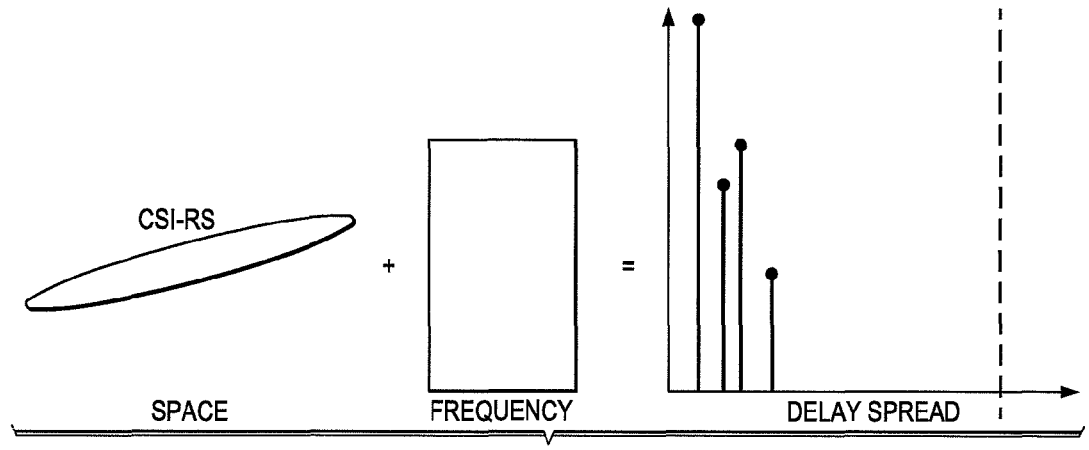
FIGS. 11A, 11B and 11C illustrate delay spread variation due to alternative designs using different beam orientations to estimate delay spread for millimeter wave wireless communications in accordance with one embodiment of the present disclosure.
Figure 11B:
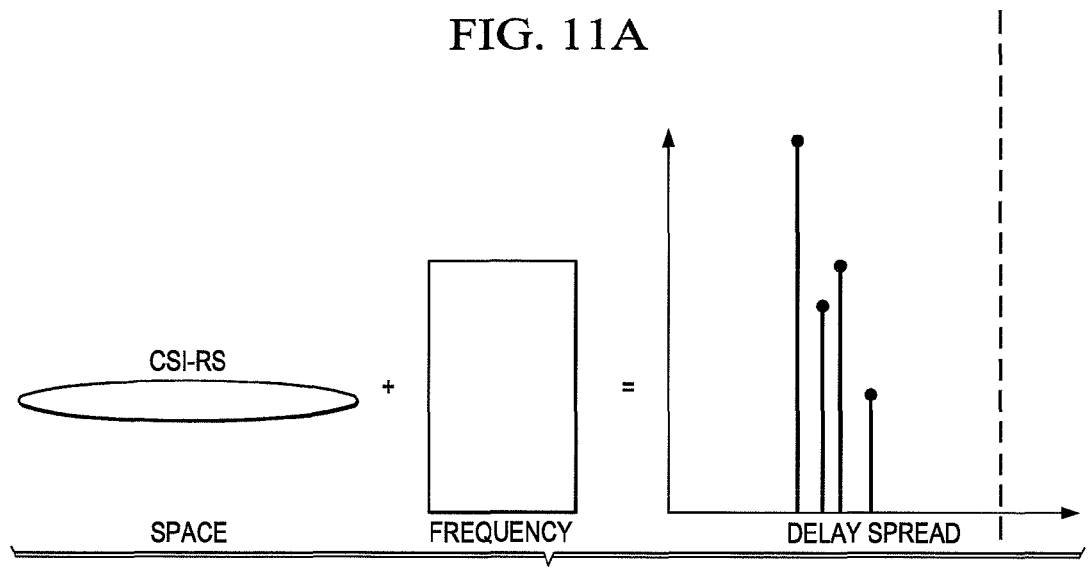
Figure 11C:
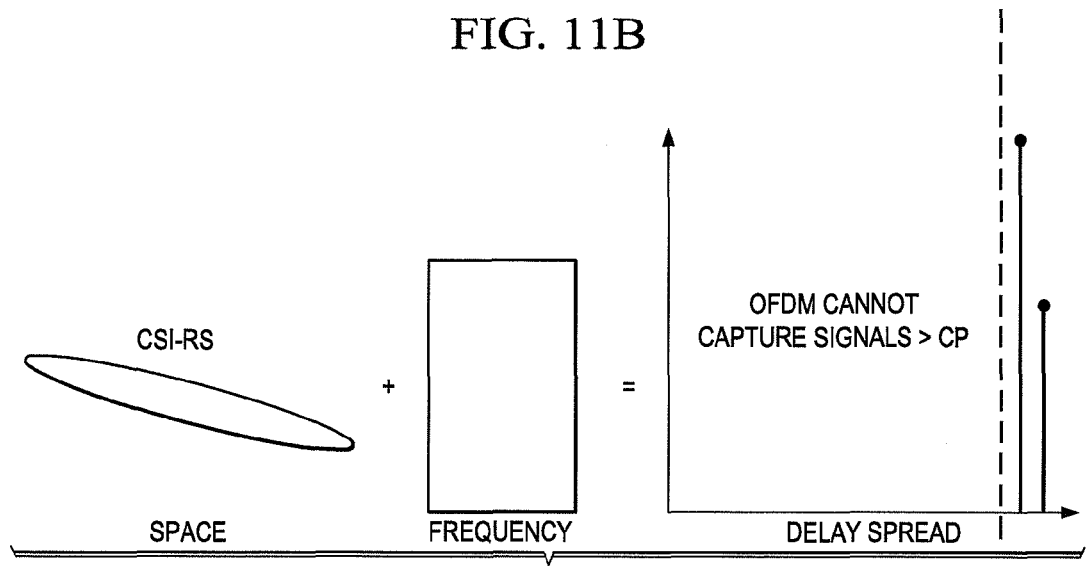

One way to capture the delay spread of the channel at the UE is to send the CSI-RS signals in different directions and estimate the delay spread in each direction, as illustrated in FIGS. 11A, 11B and 11C. While this method will work for a "full-delay spread" system, in order to use a reduced delay spread system, an OFDM based CSI-RS signal cannot capture the delay spread exceeding the cyclic prefix (see FIG. 11C). Hence, if the system is synchronized to one of the beams, the CSI-RS cannot estimate the delay spread of other beams that exceed the CP of the system. CSI-RS (OFDM) signals are therefore used to capture delay spread less than the CP.

Figure 12A:
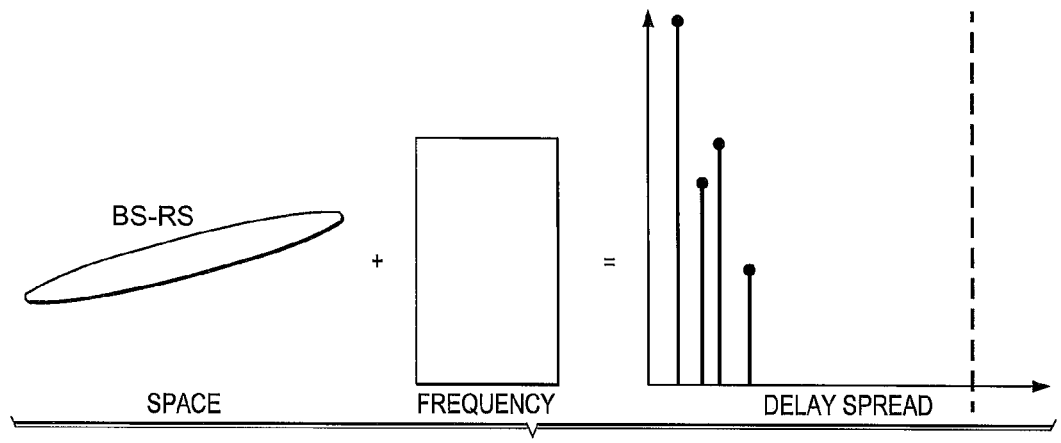
FIGS. 12A, 12B and 12C illustrate using a special beam switching reference signal (BS-RS) that includes a non-OFDM signal embedded into the OFDM signal to estimate delay spread exceeding the cyclic prefix for millimeter wave wireless communications in accordance with one embodiment of the present disclosure.
Figure 12B:
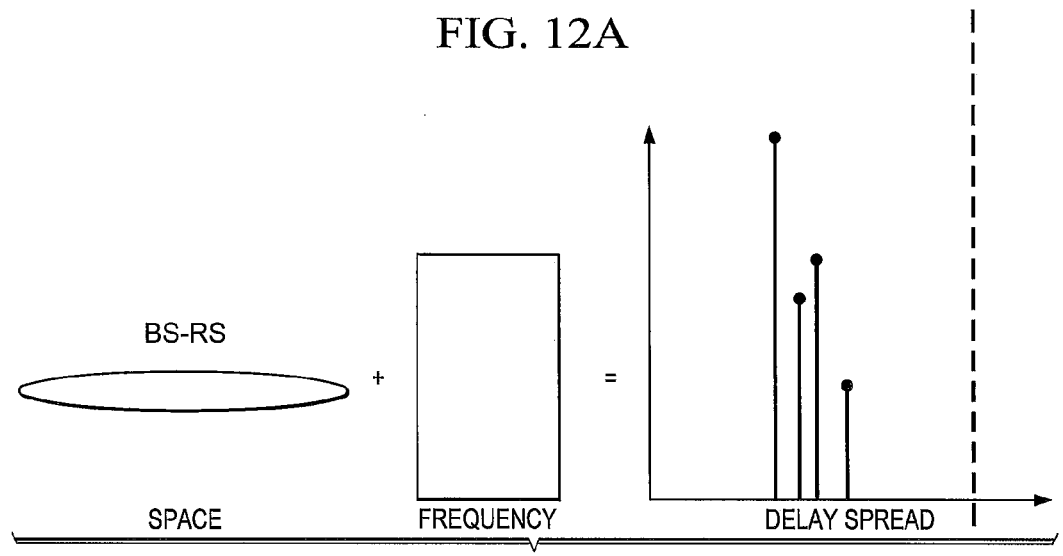
Figure 12C:
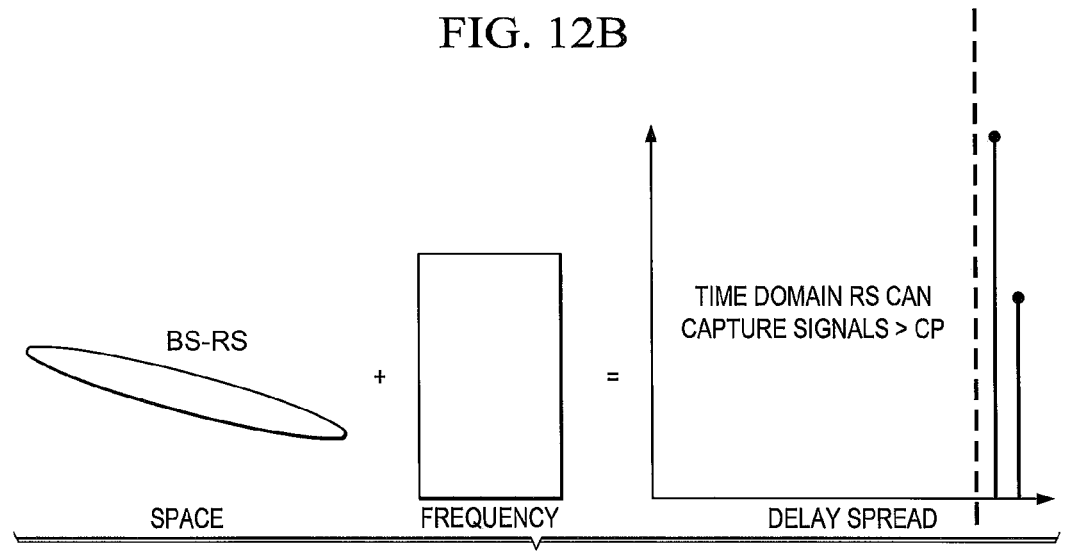

In one embodiment of the present disclosure, a special beam switching reference signal (BS-RS) that is a non-OFDM signal embedded into the OFDM signal is used to estimate the delay spread exceeding the cyclic prefix of the OFDM signal, as illustrated in FIGS. 12A, 12B and 12C. TABLE I below is a comparison of the BS-RS reference signal against other commonly used types of reference signals. A key constraint in the design of BS-RS is that the BS-RS signal should exhibit similar characteristics to the PDSCH data transmission in terms of beam width, bandwidth and power, to allow estimation of the power delay profile (PDP) in a manner that will be seen during actual data transmission.

TABLE I

| | Sync Signal | CSI-RS Signal | BS-RS Signal |
|---|---|---|---|
| Bandwidth | Narrow contiguous in frequency (min. system BW) | Wide non-contiguous in frequency (Pilots) | Wide non-contiguous in frequency (Pilots) |
| Beamwidth Utilization | Wide Synchronization | Narrow Channel State Information | Narrow Delay spread exceeding CP |

Figure 13A:
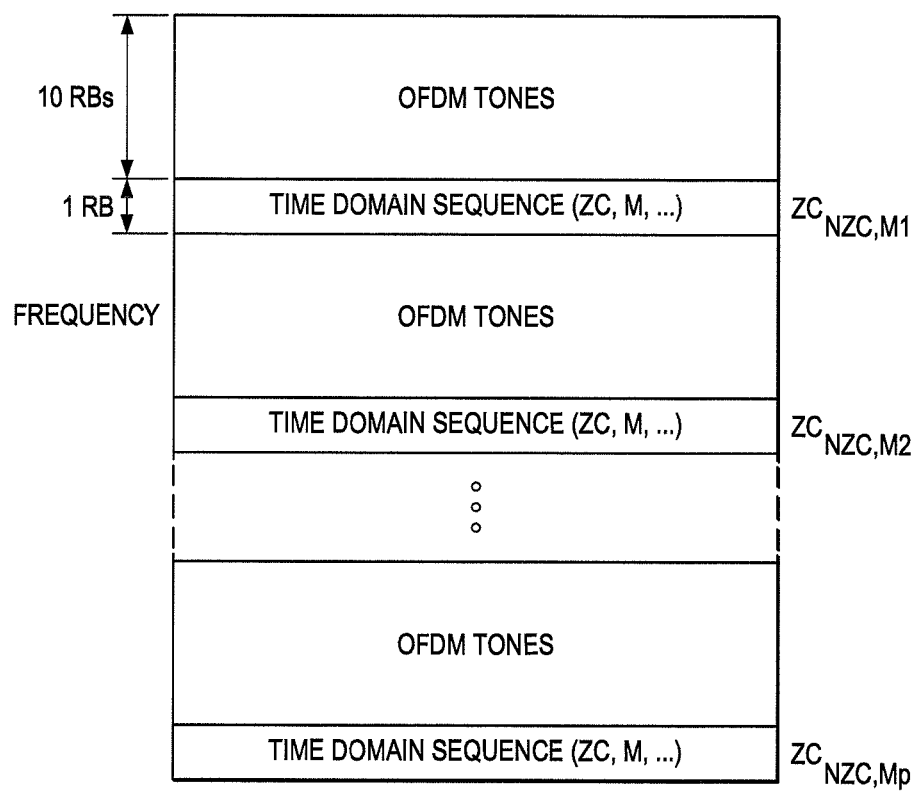
FIGS. 13A, 13B, 13C and 13D illustrate different beam switching reference signal designs that include a non-OFDM signal embedded in an OFDM signal for use in estimating delay spread for millimeter wave wireless communications in accordance with one embodiment of the present disclosure.

FIG. 13A illustrates a beam switching reference signal design that includes a non-OFDM signal embedded in an OFDM signal for use in estimating delay spread for millimeter wave wireless communications system in accordance with one embodiment of the present disclosure. In one embodiment of the present disclosure, the design structure of the BS-RS signal that is embedded in the OFDM signal for use as shown in FIGS. 12A, 12B and 12C could involve use of a sequence based on typical sequences used for synchronization and delay spread estimation such as Zadoff Chu (ZC) sequences or M-sequences. Several of these sequences could be distributed within the wide bandwidth of operation to get a good estimate of the multipath delay profile. The bandwidth occupied by each of these sequences could be of the order of one resource block (RB) and the spacing between the sequences could be ten RBs, for example.

In a variant of the above embodiment, the different time domain sequences could be based from the same root of the sequence in order to simplify implementation complexity. For example, if the ZC sequence is considered, cyclically shifted versions of the sequence are orthogonal to one another. A ZC sequence of length $N_{ZC}$ can be defined as $ZC_{N_{ZC},M}$ where M is the root of the sequence (M is a relatively prime to $N_{ZC}$) as below:

$$ZC_{N_{ZC},M}[k] = \begin{cases} \exp\left(-j\frac{M\pi k^2}{N_{ZC}}\right) & \text{for } N_{ZC} \text{ integer even} \\ \exp\left(-j\frac{M\pi k(k+1)}{N_{ZC}}\right) & \text{for } N_{ZC} \text{ integer odd.} \end{cases}$$

Figure 13B:
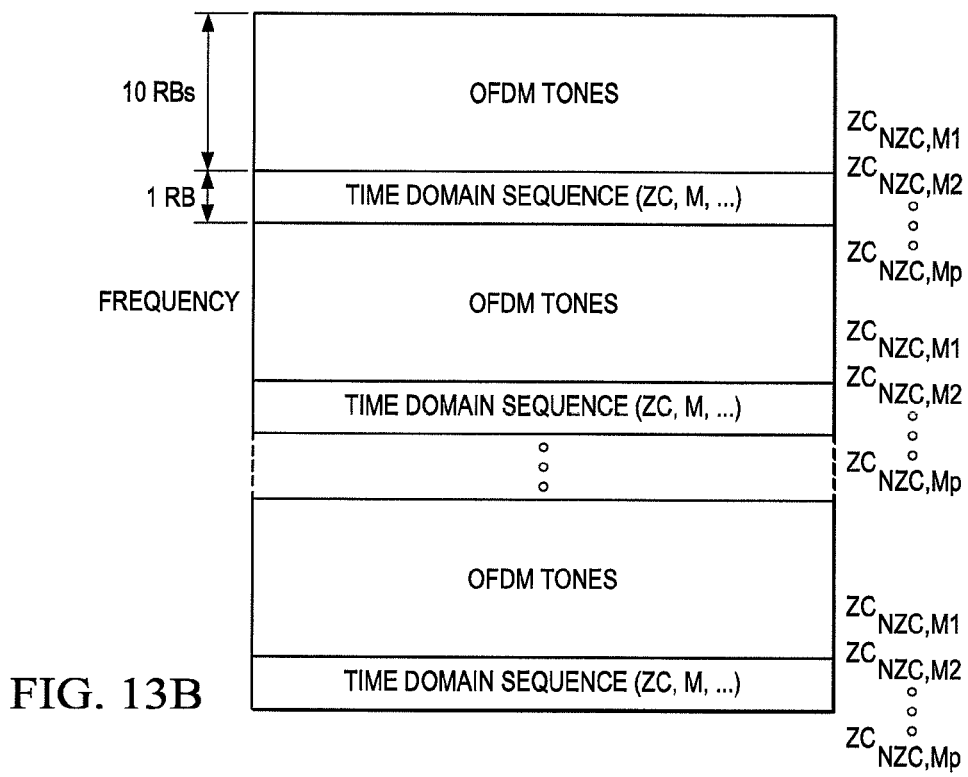

In an interleaved beam switching variant illustrated in FIG. 13B, different roots of the ZC sequence can be applied between the OFDM symbols, and used to multiplex different BS-RS signals during simultaneous BS-RS transmission from multiple RF chains or multiple BS sectors or transmitters, for example, and thereby minimize interference at the UE due to having low cross-correlation.

In another embodiment, the ZC sequences can be interleaved over the whole band as in FIG. 13A. Note, in the scheme in FIG. 12C each ZC sequence is compressed in frequency and spread in time over the whole OFDM length (in fact, in time the ZC sequence is an interpolated ZC sequence). That configuration will affect the detected delay spread resolution. On the other hand, in the scheme in FIG. 13A each ZC sequence is spread in frequency and compressed in time (in fact, in time the ZC sequence will be repeated multiple times to cover the whole OFDM length). This configuration will give a better delay spread resolution, but needs a more complex delay spread estimator to distinguish between the channel taps and the repetitive transmitted copies of the ZC sequence.

Figure 13C:
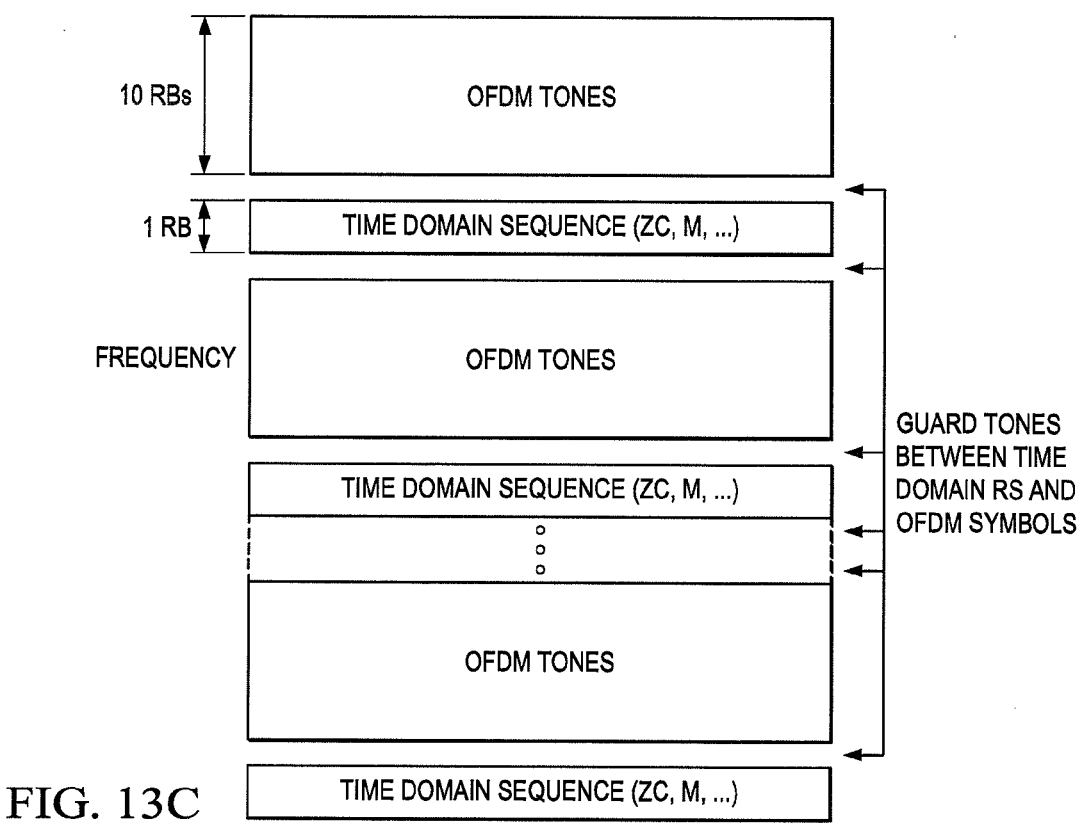
Figure 13D:
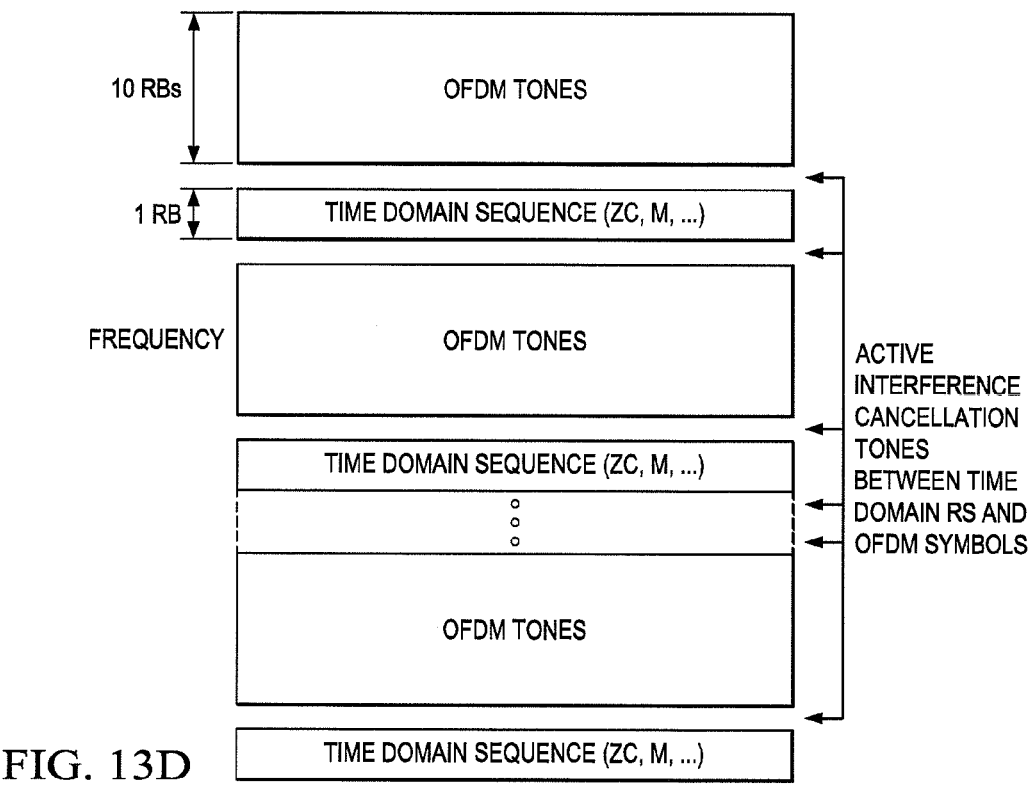

In another embodiment of the present disclosure illustrated in FIG. 13C, guard tones are placed between the OFDM tones and the BS-RS signals in order to minimize inter-subcarrier interference (Fast Fourier Transform or "FFT" leakage) on the BS-RS signal from the OFDM signal. In still another embodiment illustrated in FIG. 13D, active interference cancellation tones are placed between the OFDM tones and the BS-RS signals in order to minimize inter-subcarrier interference (FFT leakage) on the BS-RS signal from the OFDM signal. Active interference cancellation tones are special tones that are placed in the edges of the OFDM signal in order to minimize FFT leakage. Such tones are data dependent tones and the values change depending on the input data. This technique may also be used to provide deeper nulls and minimize FFT leakage.

Figure 14A:
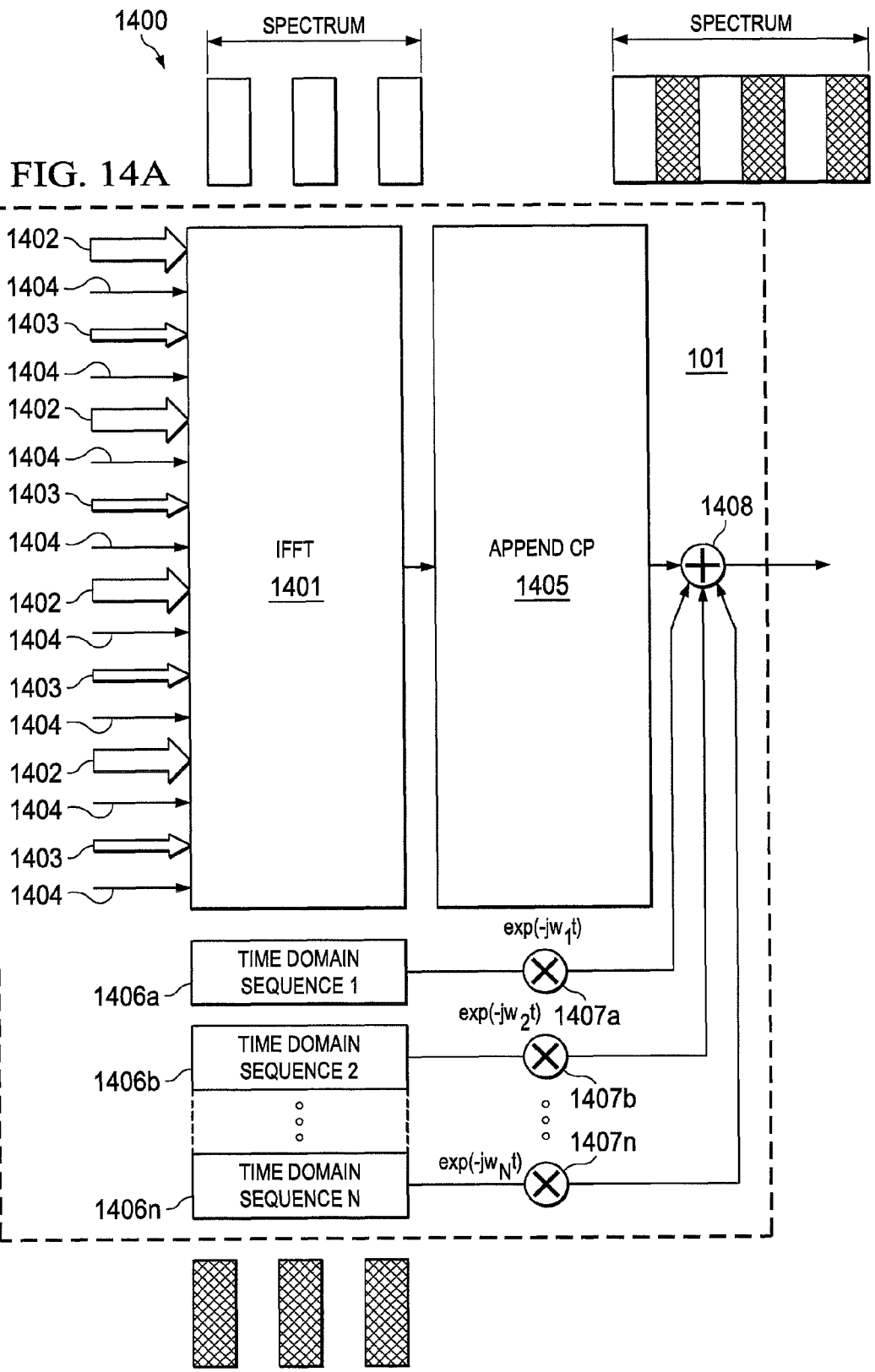
FIGS. 14A and 14B depict a BS-RS transmitter and receiver architecture design for use in estimating delay spread for millimeter wave wireless communications in accordance with one embodiment of the present disclosure.
Figure 14B:
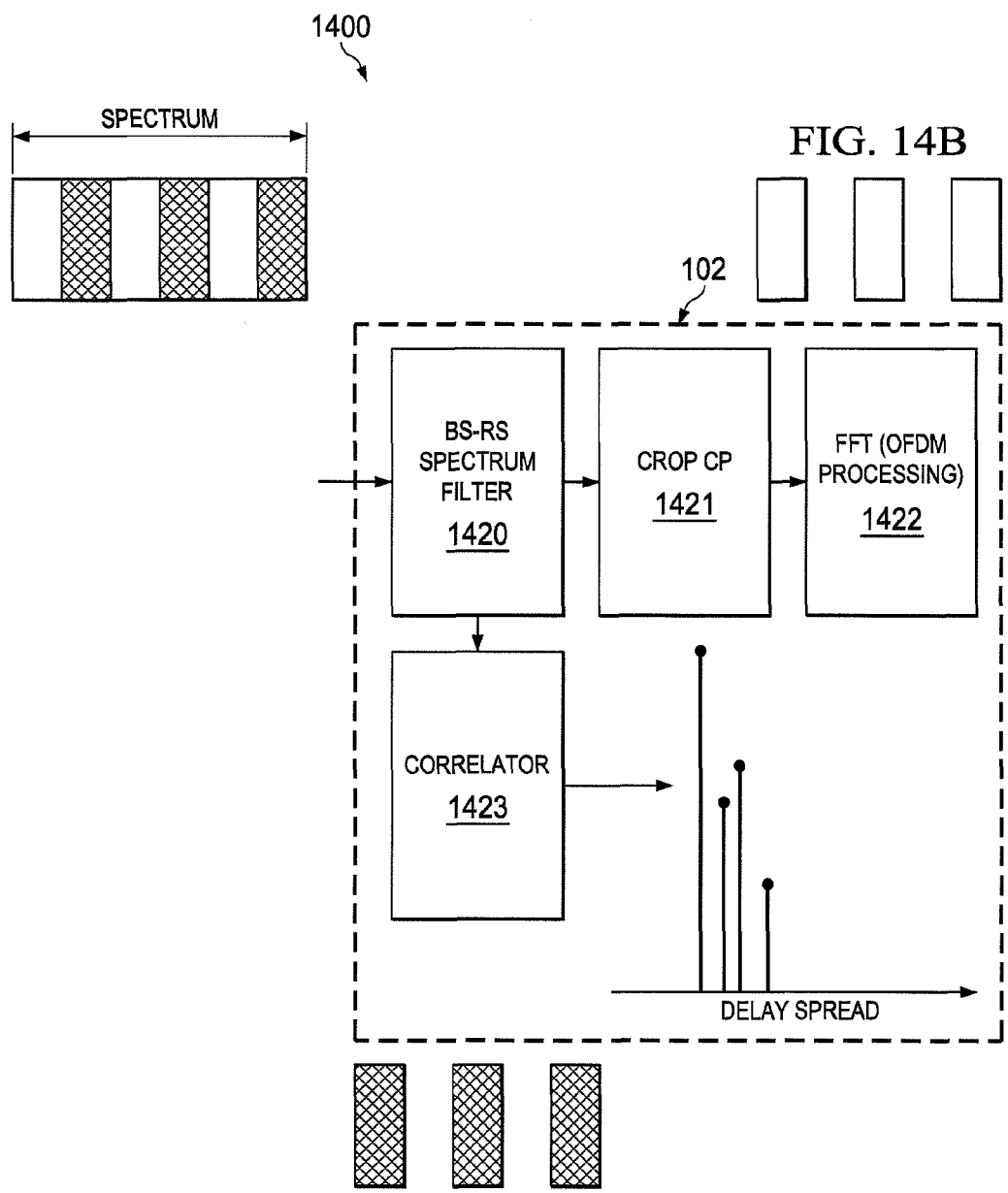

FIGS. 14A and 14B depict a BS-RS transmitter and receiver architecture design for use in estimating delay spread for millimeter wave wireless communications system in accordance with one embodiment of the present disclosure. In another embodiment of the present, the architecture design 1400 of the transmitter 101 supports the non-OFDM based BS-RS. Null tones 1403 are inserted in the Inverse Fast Fourier Transform (IFFT) 1401 of the transmitter in the locations between the OFDM symbols 1402 where the BS-RS is supposed to be placed. In addition, guard tones or active interference cancellation (AIC) tones 1404 may be placed at the edges to minimize spectral leakage in-band. The CP is then appended by unit 1405 to the output of the IFFT 1401. Finally, the BS-RS signal is formed by adding 1408 the product 1407a-1407n of the time domain sequences 1406a-1406n with an exponential signal in the time-domain to fill in the spectral holes left by the null tones. The BS-RS signal, being in the time domain, is not restricted to a single OFDM signal length and may span multiple OFDM symbols. Hence, this architecture 1400 can be used to estimate very large delay spreads.

Figure 15:
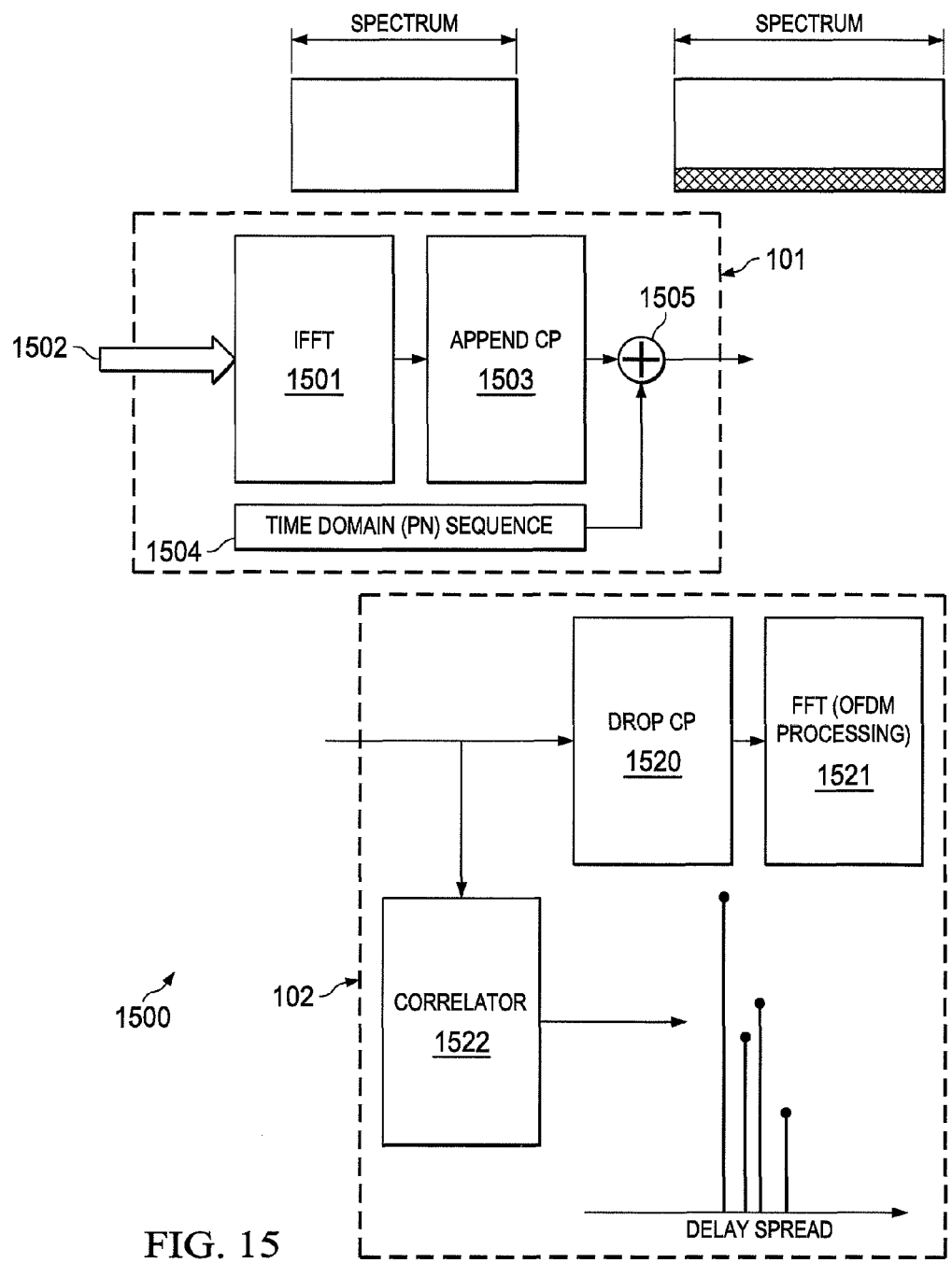
FIG. 15 depicts an alternate BS-RS transmitter and receiver architecture design for use in estimating delay spread for millimeter wave wireless communications in accordance with another embodiment of the present disclosure.

FIG. 15 depicts an alternate BS-RS transmitter and receiver architecture design for use in estimating delay spread for millimeter wave wireless communications system in accordance with another embodiment of the present disclosure. In this design 1500, the transmitter 101 includes an IFFT 1501 receiving the OFDM symbols 1502, appends the CP in unit 1503, and adds the time domain sequence 1504 in adder 1505. The BS-RS is sent in the time domain signal, but spread over the whole bandwidth. The BS-RS will have the same power as a single PDSCH OFDM symbol, but should be spread over multiple OFDM symbols (say, Q OFDM symbols). The BS-RS sequence will share the same band as the data and will present interference on the data channel, but the spreading of the BS-RS power will make this interference negligible. For example, with Q=216

(BS-RS length=1 ms), the BS-RS will add an interference of −23 dB. With Q=1080, the BS-RS will add an interference of −30 dB. The receiver 102 drops the CP 1520 before OFDM processing 1521, and operates with correlator 1522 on the received signal to determine the delay spread.

The time domain sequence 1504 will be very long, and is preferably sequence that can be generated easily and will have low complexity correlator. A pseudo-random noise (PN) sequence is suitable for this design, as long length PN sequences are easily generated using a LFSR (linear feedback shift register) with good autocorrelation and cross-correlation properties.

Figure 16A:
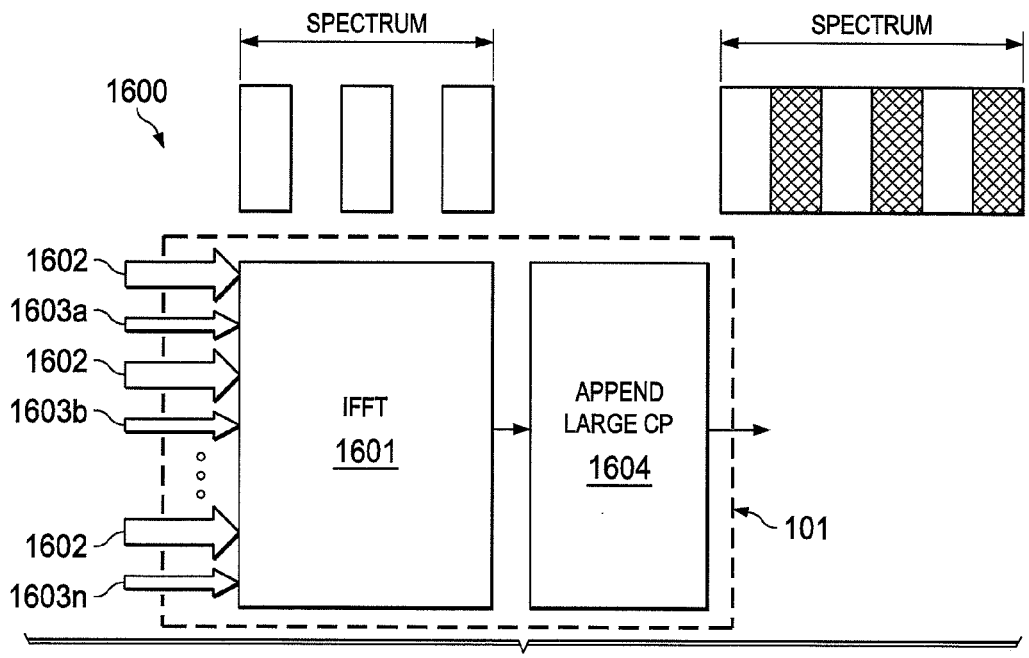

FIGS. 16A and 16B depict a BS-RS transmitter and receiver architecture design for use in estimating delay spread for millimeter wave wireless communications system in accordance with still another embodiment of the present disclosure. This different design 1600, the OFDM symbols 1602 are received by the IFFT 1601 together with a plurality of ZC sequences 1603a-1603n (e.g., ($N_{ZC}$,M1), ZC($N_{ZC}$, M2), . . . ZC ($N_{ZC}$,Mp)). The BS-RS is sent as a OFDM frequency domain signal with the sequences designed in the frequency domain. A sufficiently large cyclic prefix is added 1604 for the transmission of this symbol to cover the possible delay spread for all beams. Since the entire delay spread is covered within the CP, the receiver can now estimate the PDP 1624 and then find the delay spread for the different beam combinations by dropping the CP 1621, FFT processing 1622 and dropping the BS-RS tones 1623. A small or regular CP could also work but may have slightly worse performance due to interference.

Figure 17:
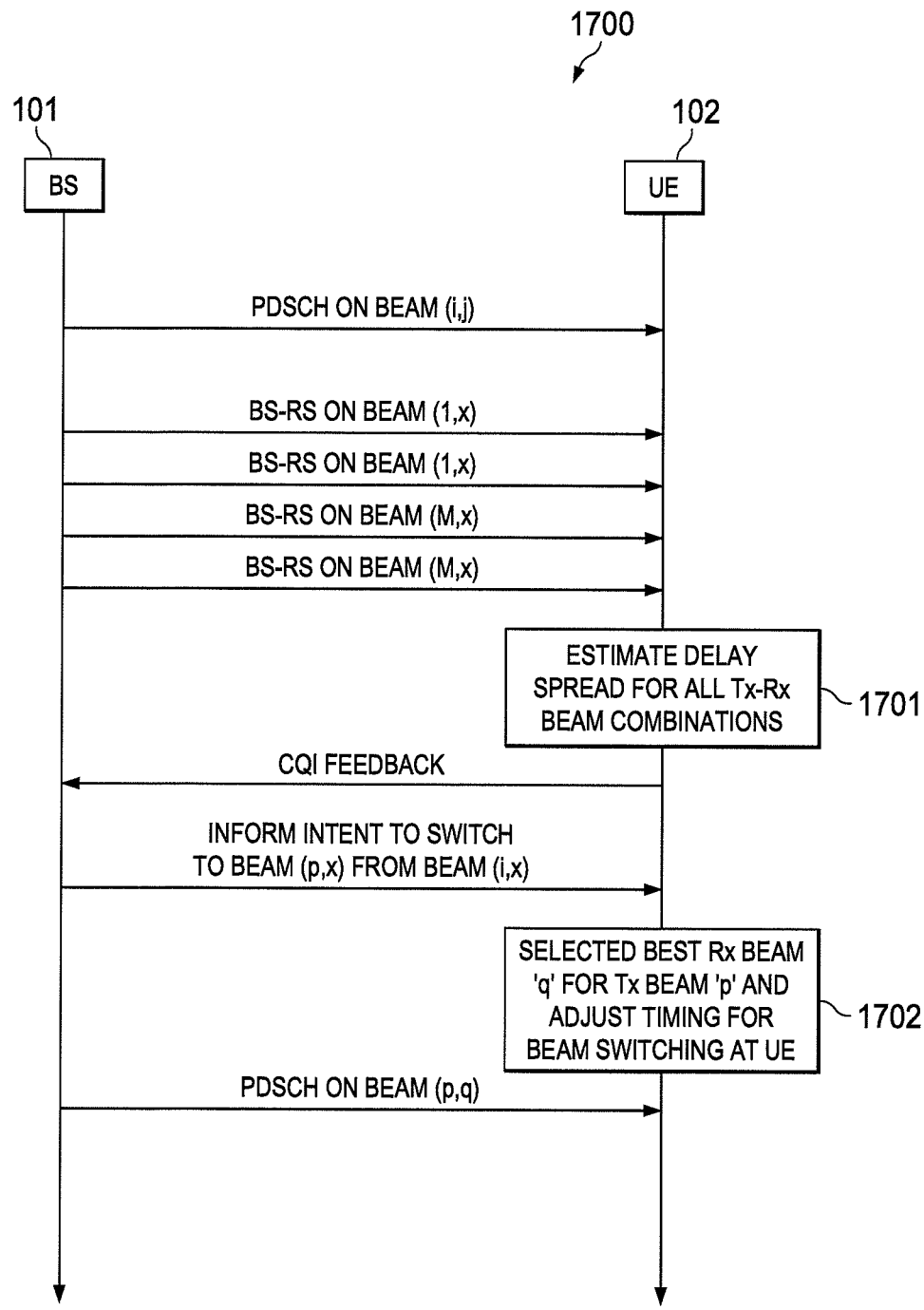
FIG. 17 is a signal timing diagram for a process of beam switching using a BS-RS within a millimeter wave wireless communications system in accordance with another embodiment of the present disclosure.

FIG. 17 is a signal timing diagram for a process of beam switching using a BS-RS within a millimeter wave wireless communications system in accordance with another embodiment of the present disclosure. In one embodiment of the present disclosure, the system is assumed to already be synchronized with an active data channel using beam pair (i,j), where "i" is the beam index at the transmitter (BS 101 in this example) and "j" is the beam index at the receiver (UE 102 in this example). After transmission of the PDSCH on beam pair (i,j), the BS reference signal is transmitted in multiple directions beam pair (1,x) to beam pair (M,x) within the slice in which the UE is located, similar to CSI-RS transmission. "M" is the total number of beam directions at the transmitter and "x" is the beam direction at the receiver, which is agnostic to the transmitter. Each transmitter beam direction may be repeated multiple times as shown in FIG. 17 to help with training multiple receiver directions or to provide more repetitions to help improve the delay spread estimation at the receiver. The UE estimates the delay spread for all Tx/Rx beam combinations (1701) and calculates the time differential (which may be positive or negative compared to the current synchronization). The BS receives the CSI feedback on the uplink and makes a decision to switch to a different beam, if necessary. The UE, upon notification from the BS of the intent to switch beams, automatically adjusts the timing for the new transmission with at most 1 symbol delay (1702).

Figure 18A:
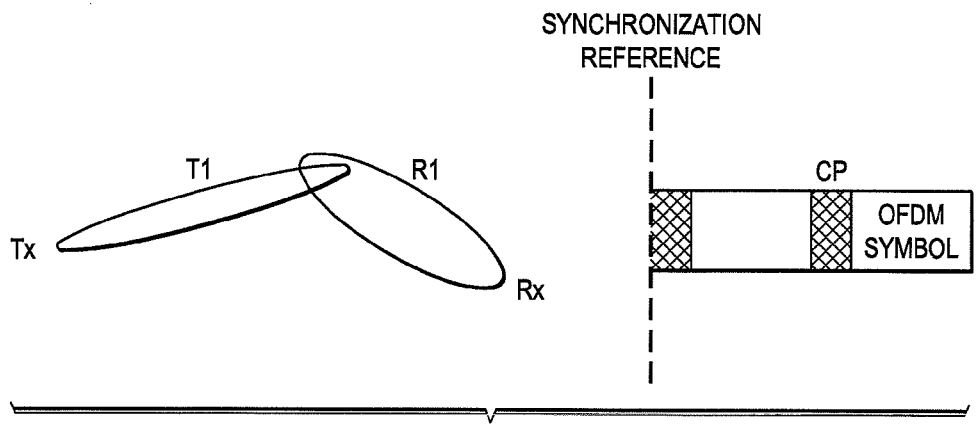
FIGS. 18A, 18B and 18C illustrate a process of beam switching to a signal with a delay spread exceeding the cyclic prefix using a BS-RS within a millimeter wave wireless communications system in accordance with another embodiment of the present disclosure.
Figure 18B:
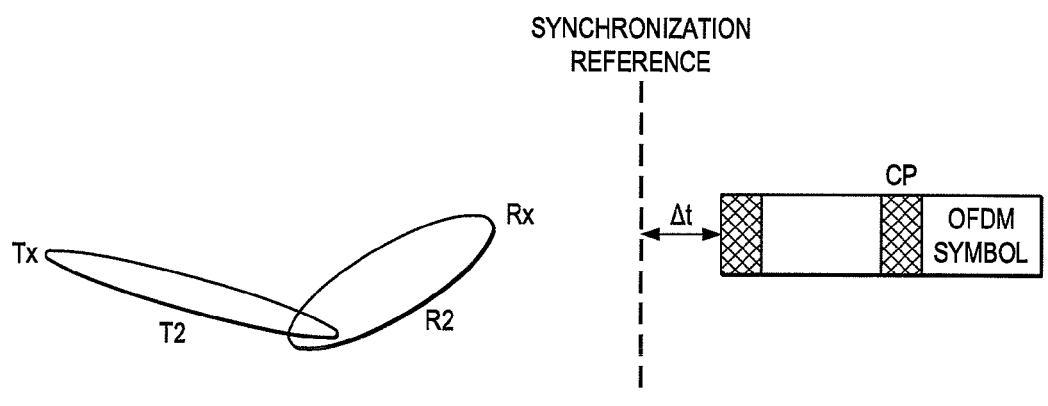
Figure 18C:
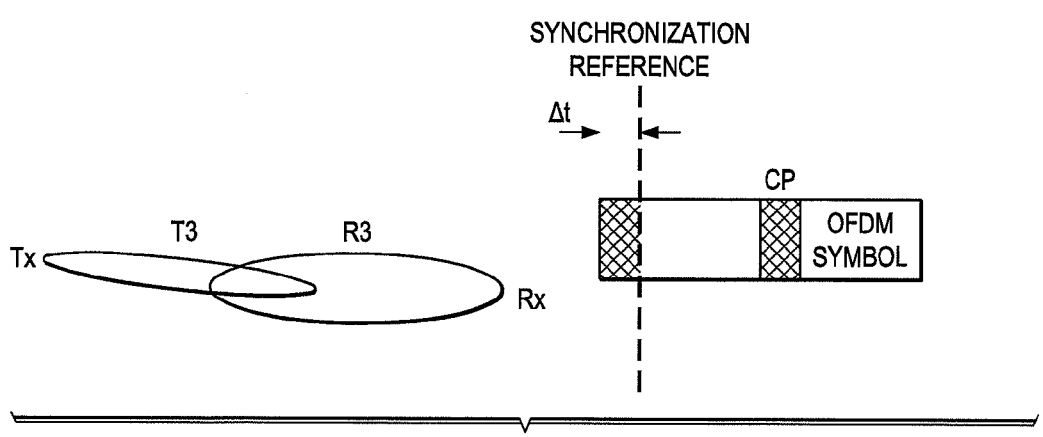

FIGS. 18A, 18B and 18C illustrate a process of beam switching to a signal with a delay spread exceeding the cyclic prefix using a BS-RS within a millimeter wave wireless communications system in accordance with another embodiment of the present disclosure. In embodiments of the present disclosure, beam switching to a second beam having a delay spread exceeding the cyclic prefix of the first beam is supported, and advantage of beam switching using BS-RS. Assuming that the system is synchronized as illustrated in FIG. 18A and is operating with Tx beam T1 and Rx beam R1. When the beams are switched from that operating arrangement to beams T2 and R2 as illustrated in FIG. 18B, it is possible that the delay spread Δt can exceed the CP established by the beams T1 and R1. With the large delay spread estimation, BS-RS supports new beams having delay spread exceeding the CP of the current beams and enables fast timing adjustments within one symbol delay, so that the system can beam switch to the new beam pair immediately. For switching from an established beam pair T2-R2 to some beams T3 and R3, the delay spread Δt may be negative as illustrated in FIG. 18C.

Figure 19A:
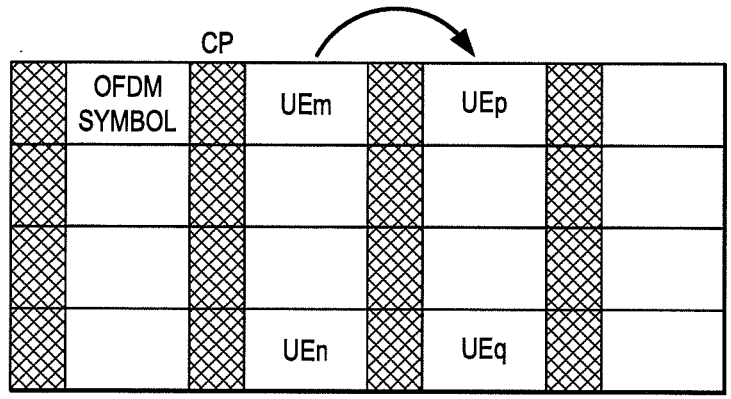
FIGS. 19A, 19B and 19C illustrate options for scheduling users during beam switching within a millimeter wave wireless communications system in accordance with another embodiment of the present disclosure.
Figure 19B:
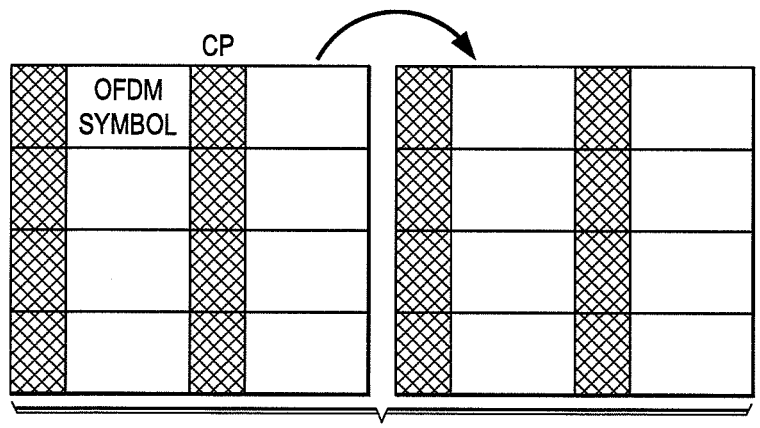
Figure 19C:
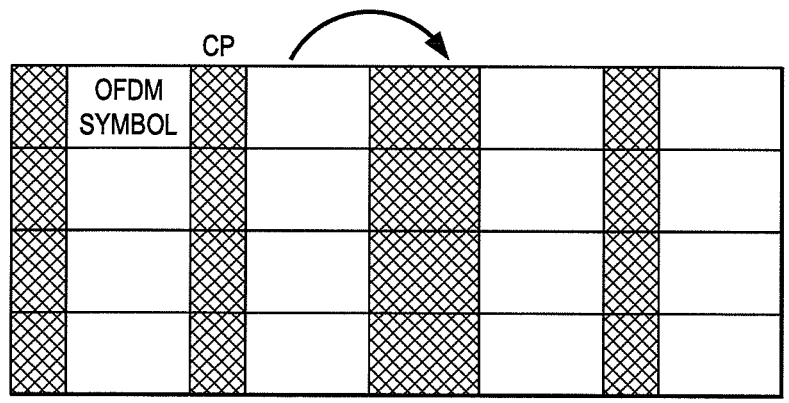

FIGS. 19A, 19B and 19C illustrate options for scheduling users during beam switching within a millimeter wave wireless communications system in accordance with another embodiment of the present disclosure. Various options may be needed to support beam switching (indicated by the curved arrow in FIGS. 19A-19C) during the transmission of symbols in the frame to mitigate the impact of a 1 symbol delay during beam switching. As shown in FIG. 19A, when beam switching occurs, the same users UEm and UEn should not be scheduled at the next time instant; instead users UEp and UEq with the starting delay greater than that of the current beam transmission (as shown in switching from T1-R1 in FIG. 18A to T2-R2 in FIG. 18B) should be scheduled during beam switching to avoid loss of data transmission. If the users cannot be rescheduled (for example, if control or broadcast symbols need to be transmitted), a quiet time needs to be inserted between the symbols during beam switching as illustrated in FIG. 19B. Alternately, a large CP can also be inserted during beam switching as illustrated in FIG. 19C, to accommodate the delay spread variation.

In one variant, the beam switching for all users in the slice is only done at a slot boundary. Thus, the quiet time addition or the large CP addition is done only for the first symbol of the entire slot in a consistent manner.

Figure 20:
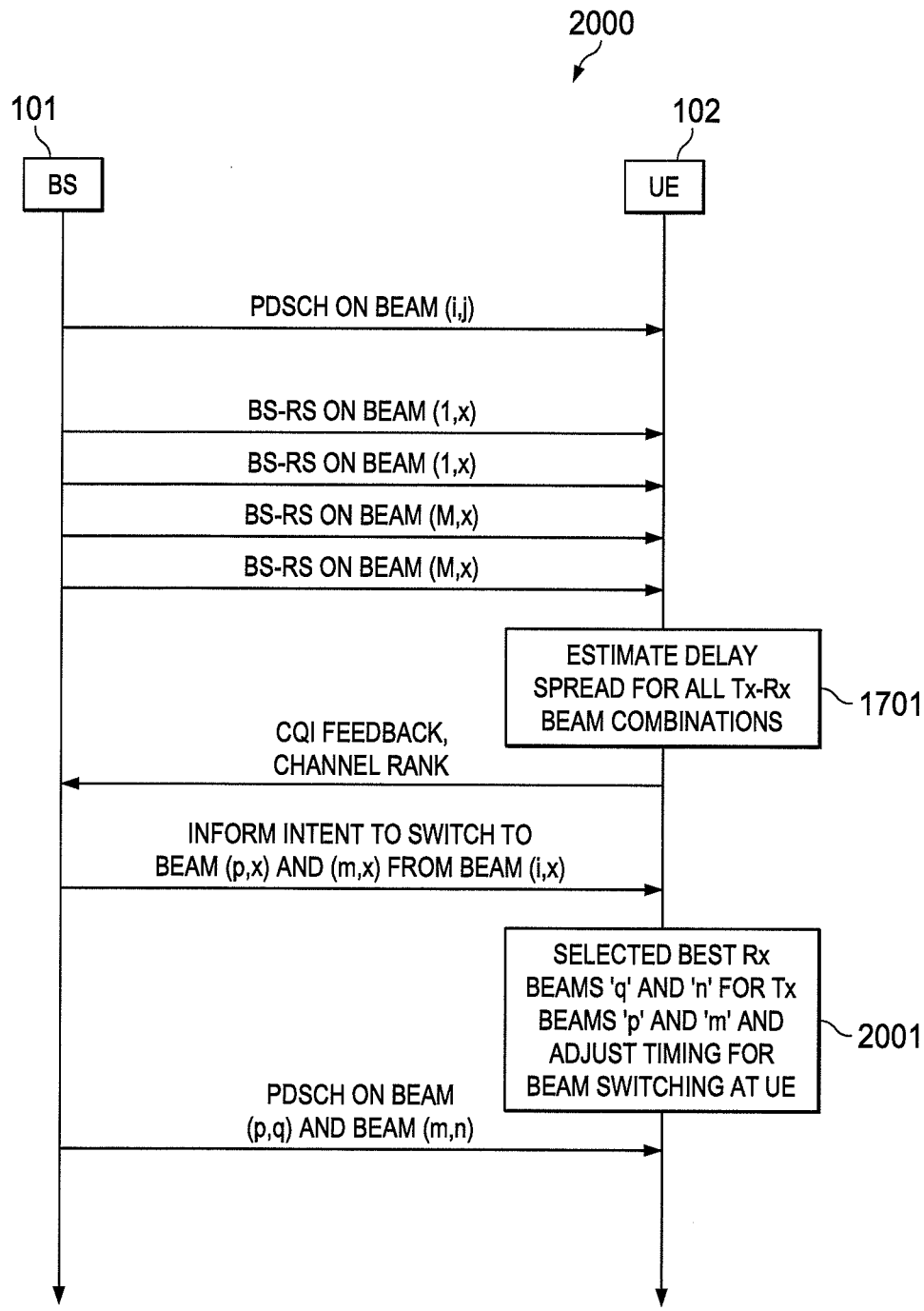
FIG. 20 is a signal timing diagram for a process of beam switching from one beam to multiple beams using a BS-RS within a millimeter wave wireless communications system in accordance with another embodiment of the present disclosure.
Figure 21:
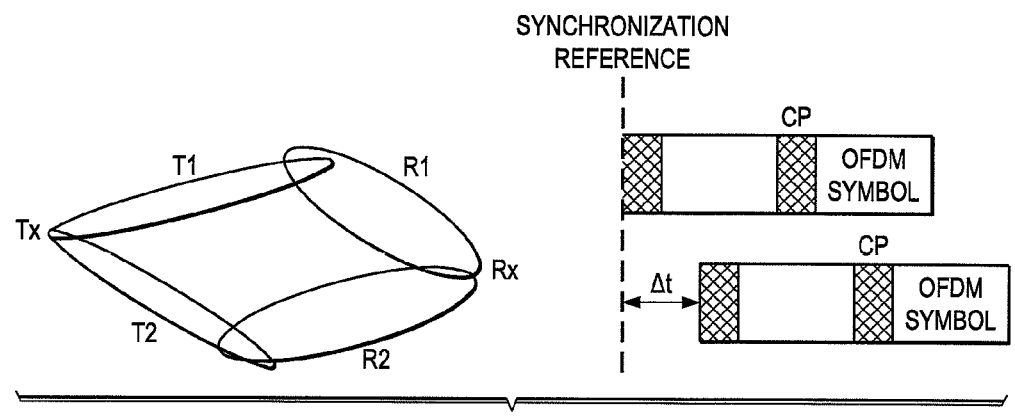
FIG. 21 illustrates SU-MIMO operation with two transmit beams and two receive beams, the Tx-Rx pairs having different delays with the delay of a second pair exceeding the cyclic prefix of the first pair.

FIG. 20 is a signal timing diagram for a process of beam switching from one beam to multiple beams using a BS-RS within a millimeter wave wireless communications system in accordance with another embodiment of the present disclosure. In another embodiment of the present disclosure, single user MIMO (SU-MIMO) is supported even when the delays of the second beam exceed the CP of the first beam. Another advantage of the BS-RS is to provide higher rank SU-MIMO support when the delays between the two streams at the receiver exceed the CP. While similar to the timing shown in FIG. 17, the receiver feeds back channel rank as well as CQI in this embodiment. When the BS receives the channel rank information from the UE and makes a decision to support multiple beams (beam pair (p,x) and beam pair (m,x)) at the transmitter, the receiver finds the best Rx beams corresponding to the transmitted beams and adjusts the delays for both beams to support SU-MIMO (2001), even if the delays of the second beam exceed the CP of the first beam. FIG. 21 illustrates SU-MIMO operation with two transmit beams and two receive beams. The two Tx-Rx pairs T1-R1 and T2-R2 have different delays, with the delay of the second pair T2-R2 exceeding the cyclic prefix of the first pair T1-R1.

Figure 22:
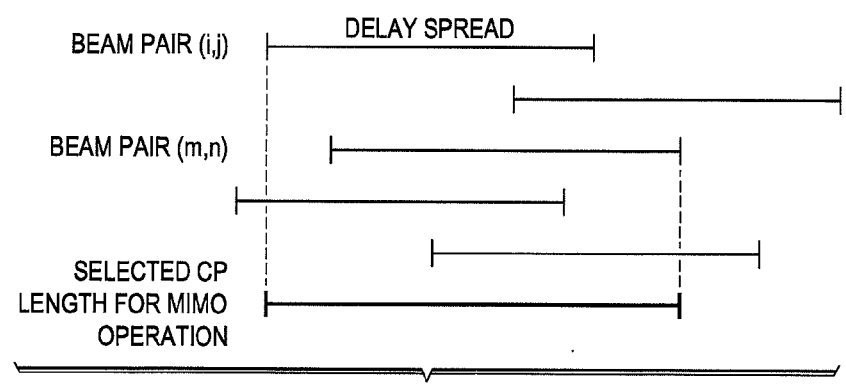
FIG. 22 illustrates MIMO operation with a "common" cyclic prefix length selected within a millimeter wave wireless communications system in accordance with another embodiment of the present disclosure.

FIG. 22 illustrates MIMO operation with a "common" cyclic prefix length selected within a millimeter wave wireless communications system in accordance with another embodiment of the present disclosure. In another embodiment of the present disclosure, a "common" CP length is selected for MIMO operation with two beams, beam pair (i,j) and beam pair (m,n), having different CP timings. The selected common CP length for MIMO operation encompasses the delay spread for both beams, in order to provide MIMO support even when there may be interference between the channel transmissions for the two beams—i.e., the channel matrix may not be close to a diagonal matrix and there may be components from the other transmission being received in the current RF chain at the receiver. In this case, a common CP length encompassing both the delay spread directions could be used to accommodate both the delay spreads. The delay spreads for the different beams could also be used by the UE to help with the decision on beam selection for MIMO operation.

For example, as shown in FIG. 22, if beam pairs (i,j) and (m,n) are chosen for transmission/reception, the CP could be chosen to be the union of both the delay spreads:

Selected CP length=Delay_spread_1∪Delay_spread_2

In practical implementations, it may not be possible to have arbitrary CP lengths and hence, the CP length may be chosen among a few possible options satisfying the above constraint.

Figure 23:
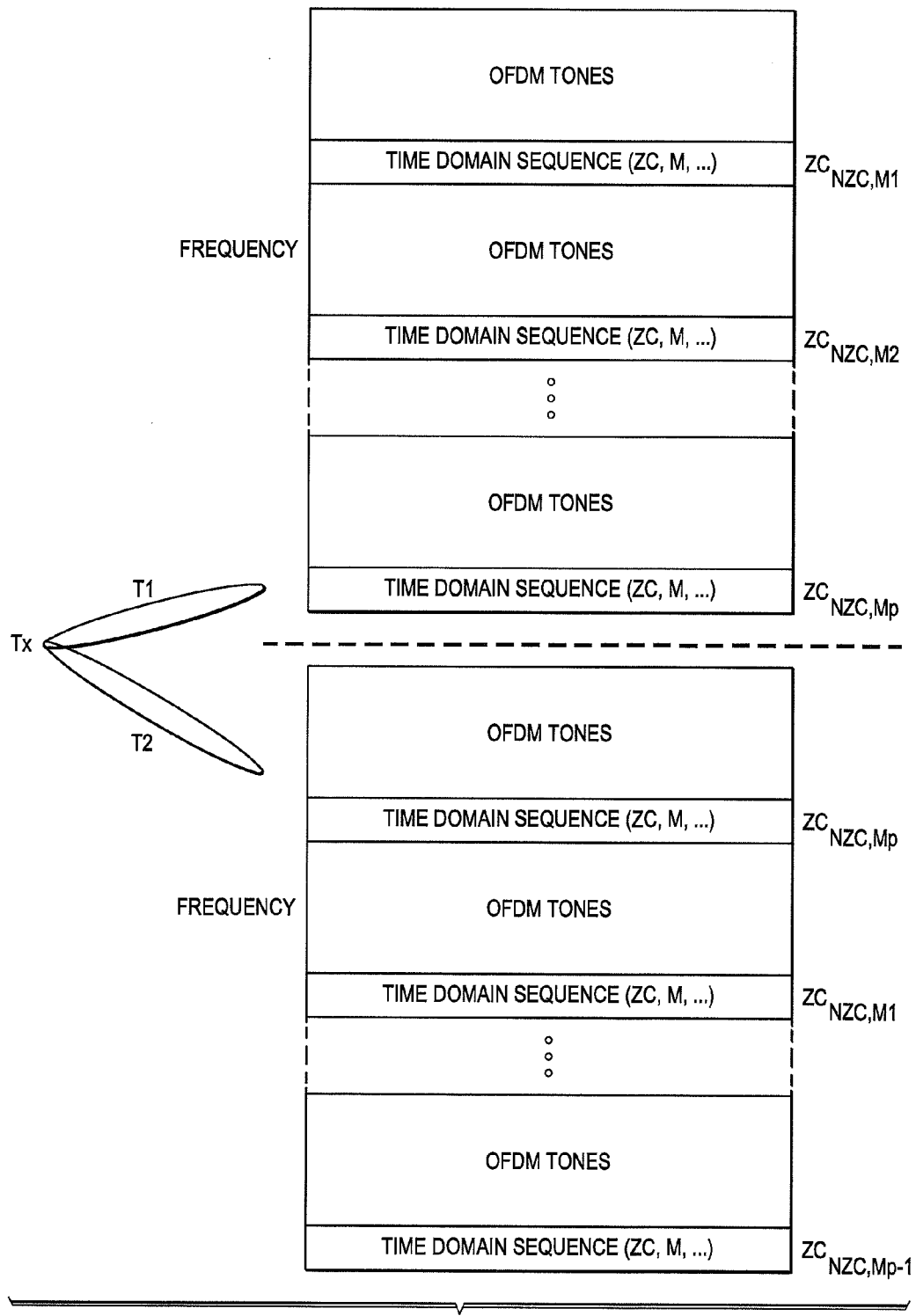
FIG. 23 illustrates interference mitigation between BS-RS signals by rotating orthogonal sequences between BS-RS signals for MIMO operation within a millimeter wave wireless communications system in accordance with another embodiment of the present disclosure.

FIG. 23 illustrates interference mitigation between BS-RS signals by rotating orthogonal sequences between BS-RS signals for MIMO operation within a millimeter wave wireless communications system in accordance with another embodiment of the present disclosure. In another embodiment of the present disclosure, interference between different BS-RS signals at the receiver is mitigated. Multiple RF chains may be used simultaneously at the transmitter for transmitting BS-RS signals, or a receiver may receive the BS-RS signals from multiple base-stations or multiple sectors that may interfere with each other.

Interference may be mitigated using multiple orthogonal sequences (such as ZC sequences) with the same sequence length but with different indices having very low cross correlation in different bands. Different BS-RS transmissions may change the transmission indices, by rotation for example as shown in FIG. 23, where transmit beam T1 uses the ZC sequences in a first order ($ZC_{N_{ZC},M1}$, $ZC_{N_{ZC},M2}$, ..., $ZC_{N_{ZC},Mp}$), while transmit beam T2 uses the same ZC sequences in a second, cyclically rotated order ($ZC_{N_{ZC},Mp}$, $ZC_{N_{ZC},M1}$, ..., $ZC_{N_{ZC},Mp-1}$). This prevents interference between the different BS-RS signals at the UE.

Figure 24A:
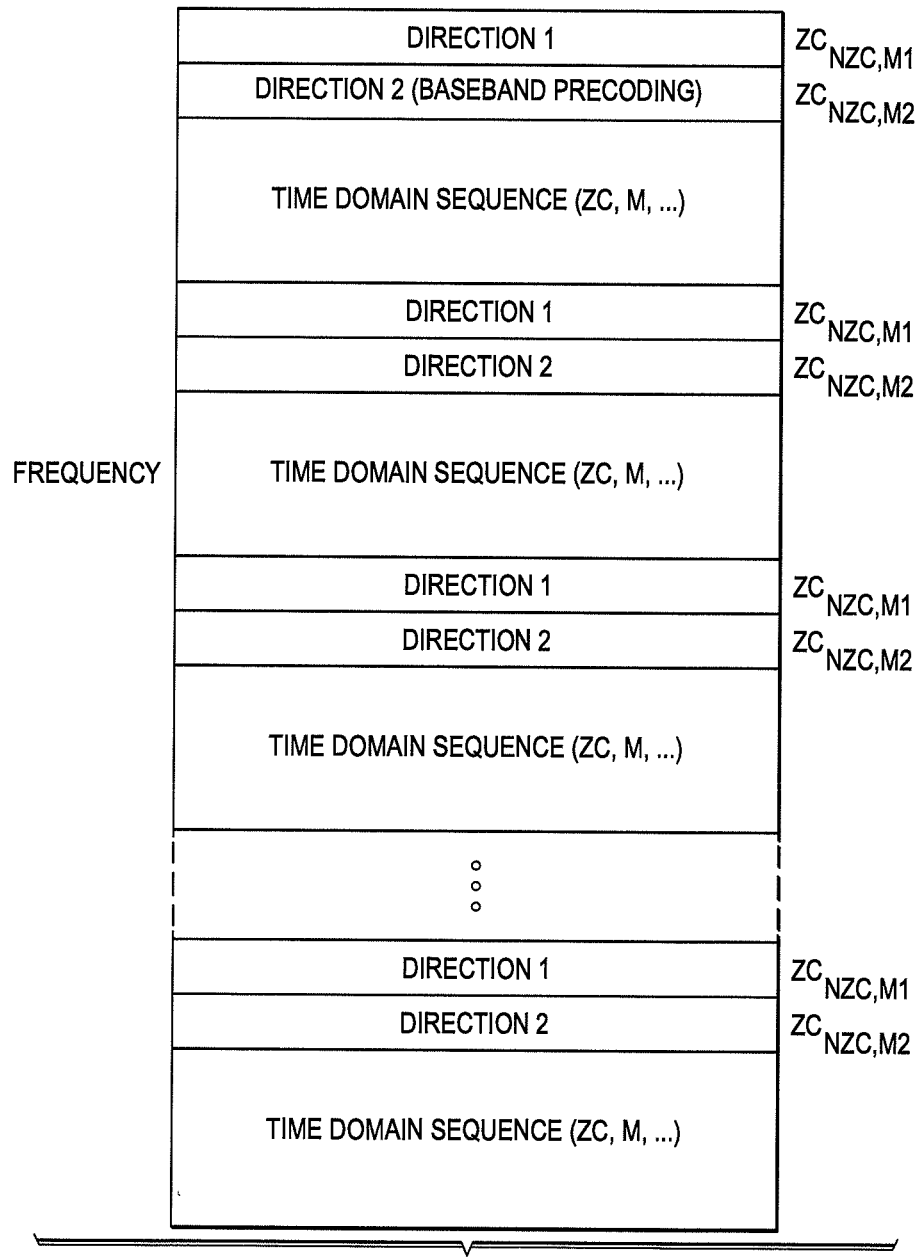
FIGS. 24A and 24B illustrate time domain designs for beam switching reference signals for MIMO operation within a millimeter wave wireless communications system in accordance with another embodiment of the present disclosure.
Figure 24B:
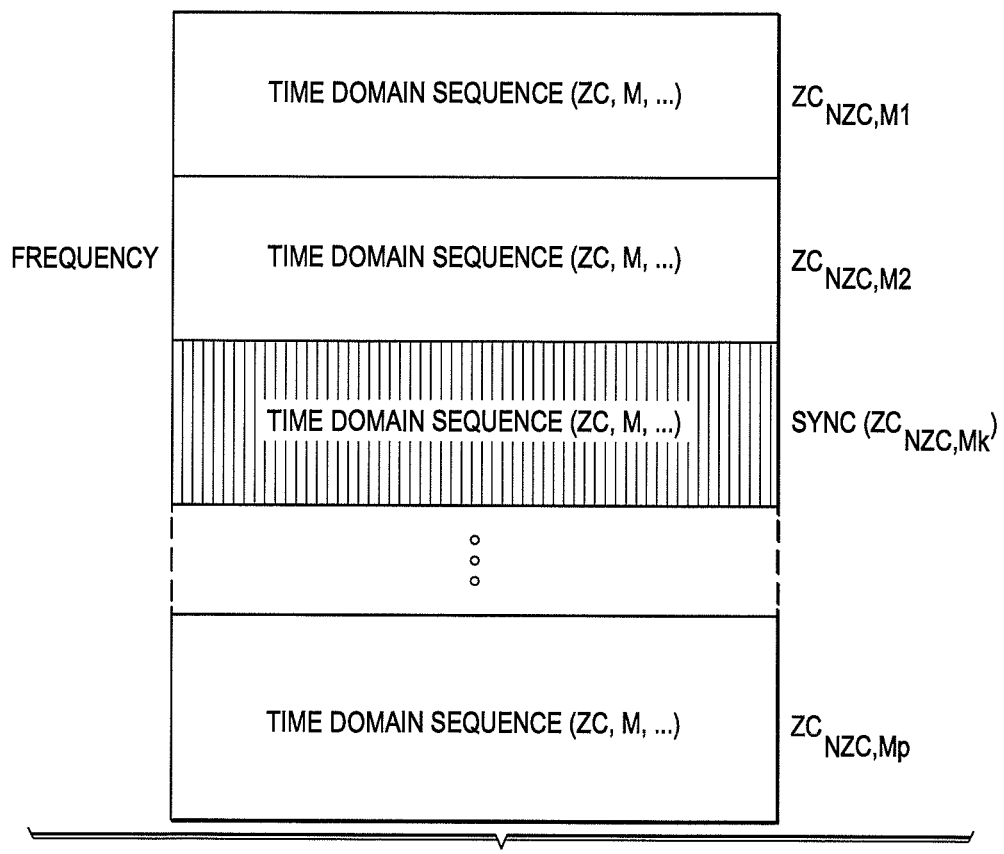
Figure 25:
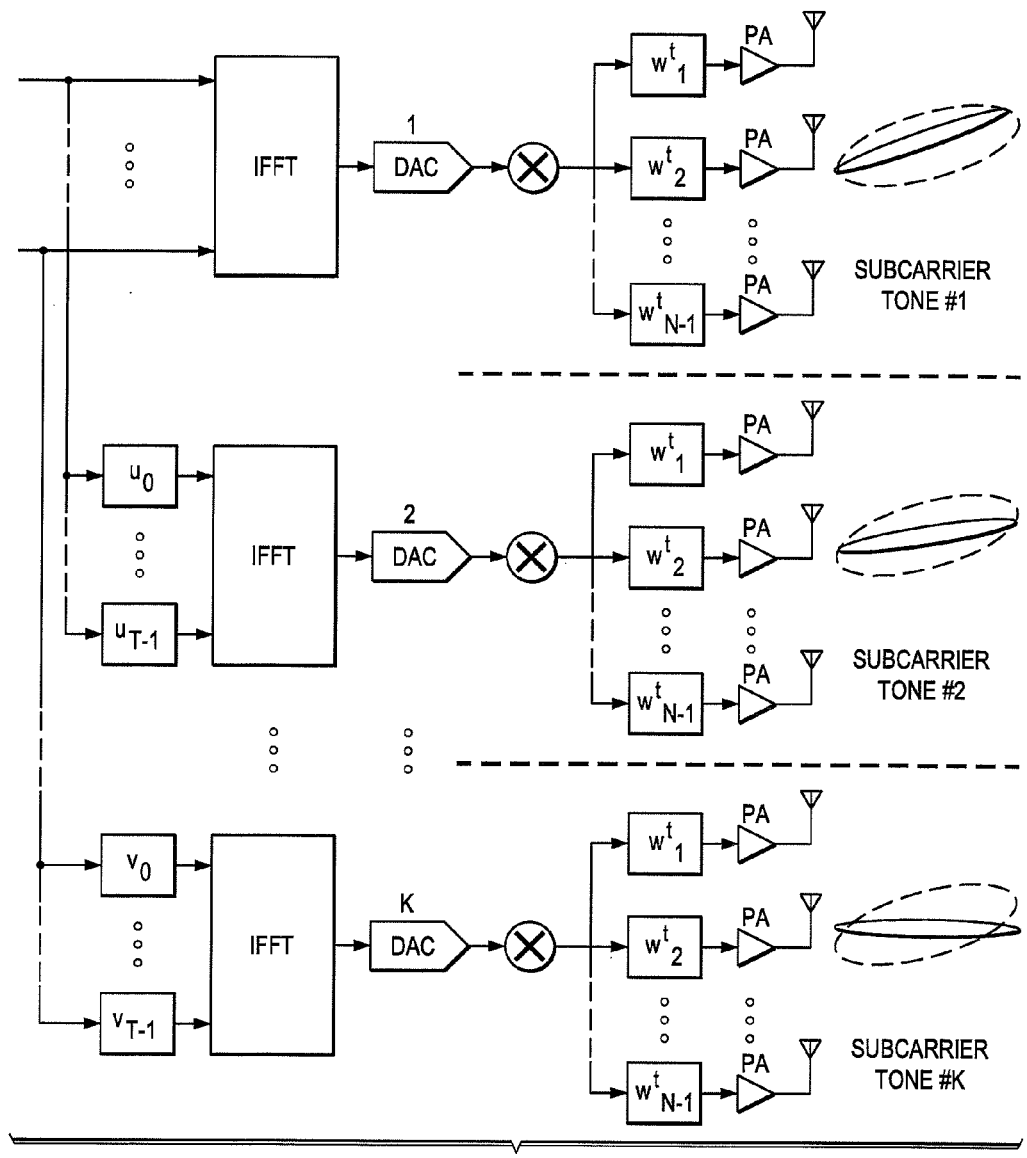
FIG. 25 illustrates the transmission of BS-RS signals in different directions using multiple RF chains.

FIGS. 24A and 24B illustrate time domain designs for beam switching reference signals for MIMO operation within a millimeter wave wireless communications system in accordance with another embodiment of the present disclosure. In another embodiment of the present disclosure, the BS-RS signal(s) need not be multiplexed with other OFDM signals. Instead, BS-RS signal(s) can occupy the whole band or can be multiplexed with other, possibly non-OFDM signals such as the SYNC. FIG. 24A shows the case where the entire frequency band is filled with the BS-RS signal. However, each BS-RS signal is sent in a different direction by doing baseband frequency domain precoding across tones (similar to open loop precoder cycling). Note that the same direction is repeated multiple times in frequency with the same sequence in order for the receiver to get a wideband estimate in that direction. In this case, the analog precoders for all antennas are pointing in the same direction and the digital precoding is done across tones in order to send the different BS-RS signals in different directions. However, this requires multiple RF chains at the transmitter. FIG. 24B shows the case where the BS-RS signals can co-exist with other signals in the system such as the synchronization (SYNC) signal, for example. FIG. 25 shows how the transmission of BS-RS signals in different directions can be achieved using multiple RF chains. Wideband signals are transmitted using multiple subcarrier tones 1 through K (illustrated as dashed outlined regions in FIG. 25). Using digital baseband precoding per subcarrier using precoders $U_0$ to $U_{T-1}$ through $V_0$ to $V_{T-1}$ prior to separate IFFT processing, narrowband signals (illustrated as solid outlined regions in FIG. 25) are transmitted in multiple directions simultaneously.

Figure 26:
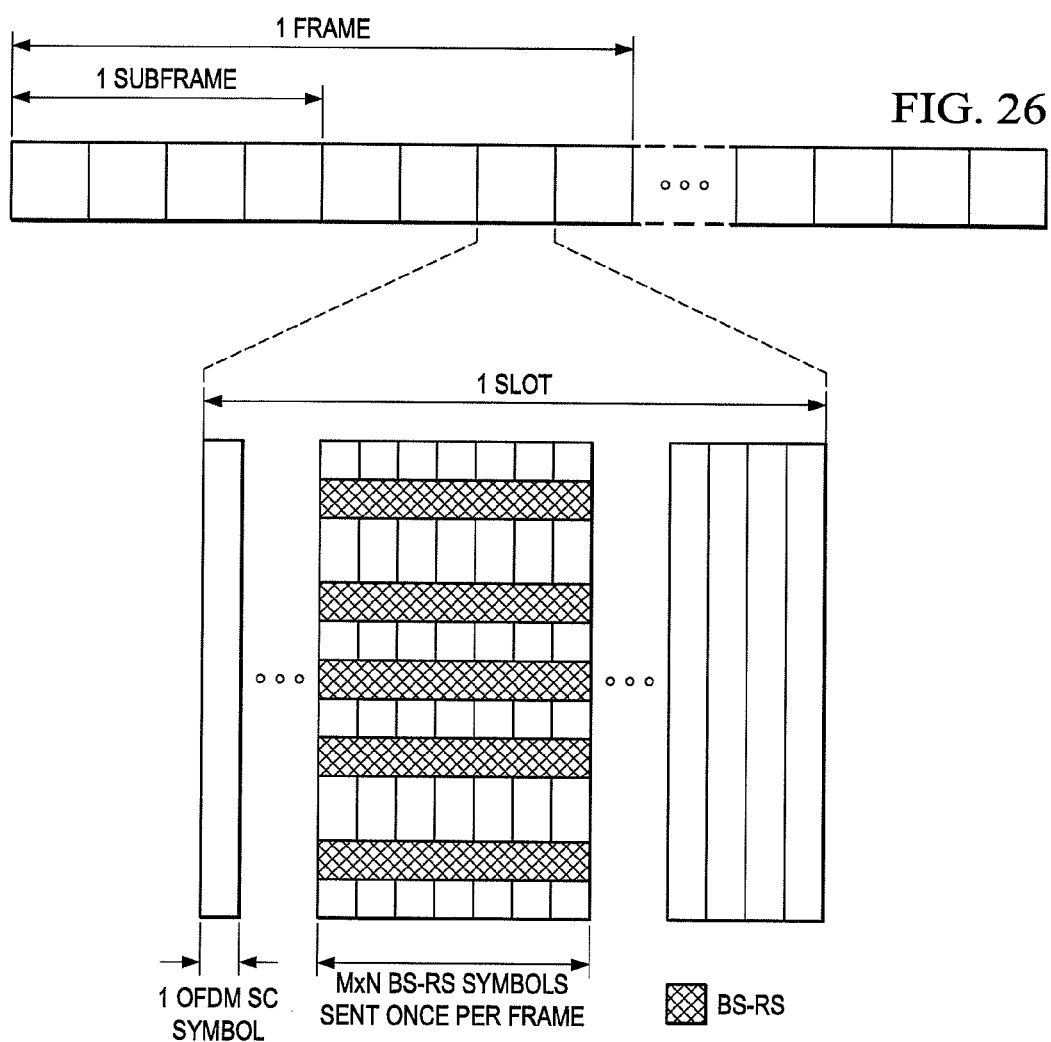
FIG. 26 depicts an example of transmission of BS-RS signals in a transmission frame within a millimeter wave wireless communications system in accordance with another embodiment of the present disclosure.

FIG. 26 depicts an example of transmission of BS-RS signals in a transmission frame within a millimeter wave wireless communications system in accordance with another embodiment of the present disclosure. Multiple repetitions of the BS-RS signals are placed consecutively in order to support PSDCH transmissions and delay spread estimation for multiple directions similar to CSI-RS signals. The BS-RS signals may also be extended over multiple symbols or repeated in the same direction to get a better delay estimate in a particular direction. The BS-RS signal need not be sent on every slot transmission, simply once per frame since it is expected to vary slowly over time.

Having a small CP is very important to improve efficiency in 5G systems to accommodate the increased control overhead due to beamforming. The techniques described above help reduce the CP by providing a large delay estimation to estimate delay spread variations for different Tx-Rx beam combinations, which can be used for fast, efficient beam switching and for SU-MIMO support when the CP difference between the two beams is large.

Figure 27:
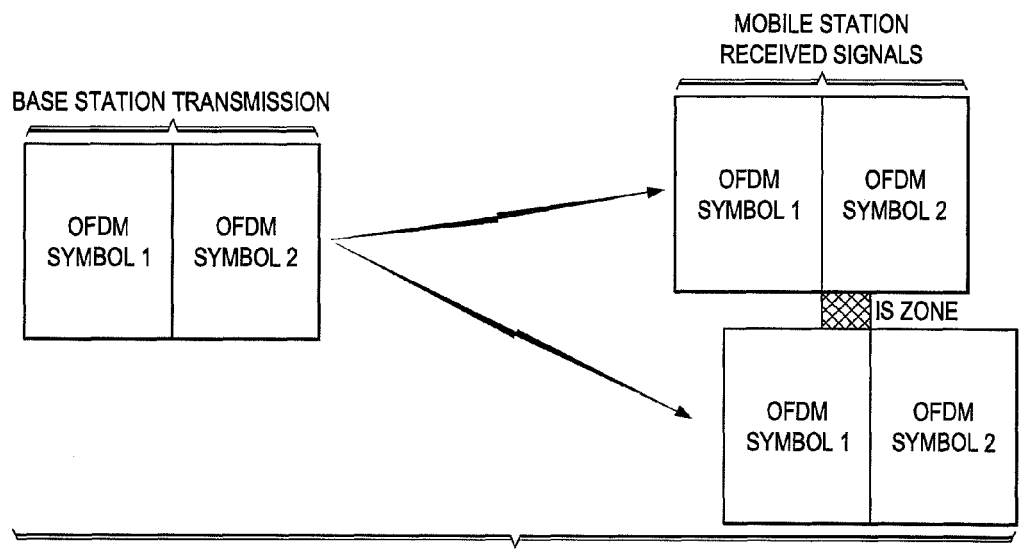
FIG. 27 illustrates the Inter-Symbol Interference (ISI) problem that the CP is intended to address.

FIG. 27 illustrates the ISI problem that the CP is intended to address. As previously discussed, when two consecutive OFDM symbols are transmitted from the base station and there are two communications paths with different path delays from the base station to the mobile station, the mobile station receives two replicas of the symbol pair with one pair overlapping the other in time. The temporal overlap of the two symbols creates an ISI zone within which the signal would be seen by the receiver as corrupted. To avoid such signal corruption by ISI, a CP at the beginning of each OFDM symbol, which is typically redundant signal spliced off the back of the prior symbol, to ensure that the ISI is confined to the CP duration. The CP thus serves a dual purpose: in addition to keeping the inter-symbol interference confined within duration of CP, the CP also allows the linear convolution of the channel with the transmitted signal from the base station to become a circular convolution.

Figure 28:
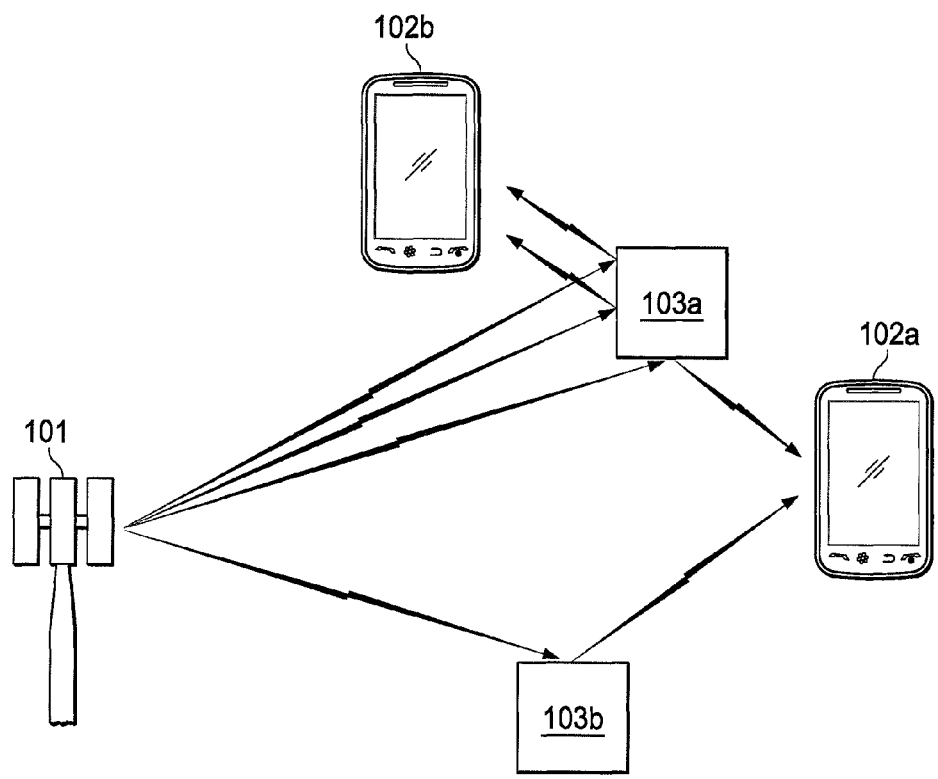
FIG. 28 illustrates two different manners in which mobile stations can receive replicas of consecutive symbols with different path delays.

FIG. 28 illustrates two different manners in which mobile stations can receive replicas of consecutive symbols with different path delays. Different mobile stations can experience different delay spread depending on their location and the existence and size of reflective objects such as buildings or geographic features. In the example of FIG. 28, UE1 102a receives significant powers from two reflectors 103a and 103b. Each of the reflected beams travels along paths which have significant difference in lengths. By contrast, UE2 102b receives beams only from one reflector 103a. The path differences are smaller and hence the delay spread is much shorter for UE2 as compared to UE1.

The CP is an additional overhead over the regular transmission time of the OFDM symbol. Thus, if the duration of the OFDM symbol excluding CP is $T_s$, then the percent of overhead that CP occupies is given as $$\text{Overhead} = \frac{T_{CP}}{T_s + T_{CP}}.$$

In LTE, two values of CP are specified by the standard: regular CP which is 4.2 μs and extended CP which is 14.7 μs. The symbol duration $T_s$ is 66.6 μs in LTE, and thus CP overhead is 5.9% for the regular case and 18% for the extended case.

The total symbol time $T_s+T_{CP}$ should be within the coherence time $T_c$ of the channel, such that a general requirement is that $T_s+T_{CP} \ll T_c$. As noted above, due to a lack of available spectrum in the current low frequencies employed for wireless communications, one option as has been proposed for mmWave broadband (MMB) is to use frequencies that are an order of magnitude higher than current cellular frequencies. The corresponding coherence time $T_c$, which is inversely proportional to the frequency, is thus an order of magnitude lower.

The cyclic prefix needs to be as long as the observed channel delay spread. In case of transmission at millimeter wave frequencies, as the observed delay spread is expected to be smaller than 4.2 microseconds (μs). However, the delay spread for each UE can be different, and using a CP as large as the largest observed delay spread is not efficient. On the other hand, the use of short CPs to support users who can experience large delay spreads will lead to substantial degradation of the SNR for these UEs.

To strike a balance between these competing requirements, OFDM symbols within a subframe may be allowed to have variable CP length. To reduce signaling overhead and to ensure synchronous operation, only a set of finite subframe configurations (e.g., {1, . . . , n}) should be employed. The CP for each OFDM symbol in a subframe and the number of OFDM symbols are chosen so that total transmission time for the subframe is the same for all the n subframe configurations.

For illustrative purposes, assume that the subframe duration is 30 μs, and let $T_s$=2.5 μs. If three values are permitted for CP, with short CP equal to 0.5 μs, medium CP equal to 1.25 μs, and long CP equal to 2.5 μs, the following subframe structures could each spanning 30 μs:

TABLE II

| Subframe index | # Short CPs | # Medium CPs | # Long CPs |
|---|---|---|---|
| 1 | 10 | 0 | 0 |
| 2 | 0 | 8 | 0 |
| 3 | 0 | 0 | 6 |
| 4 | 5 | 4 | 0 |
| 5 | 0 | 4 | 3 |
| 6 | 5 | 0 | 3 |

This example of defined subframe structures is just an illustration of the basic principle, and other configurations could be constructed.

To enable variable CP configurations in the communications system, in one embodiment of the present disclosure the base station may configure a periodic update of the delay spread from each mobile station. The periodicity may vary depending upon the mobility of the corresponding mobile station. The base station can also send a special broadcast message or unicast message to UEs to report their delay spreads as needed.

Figure 29:
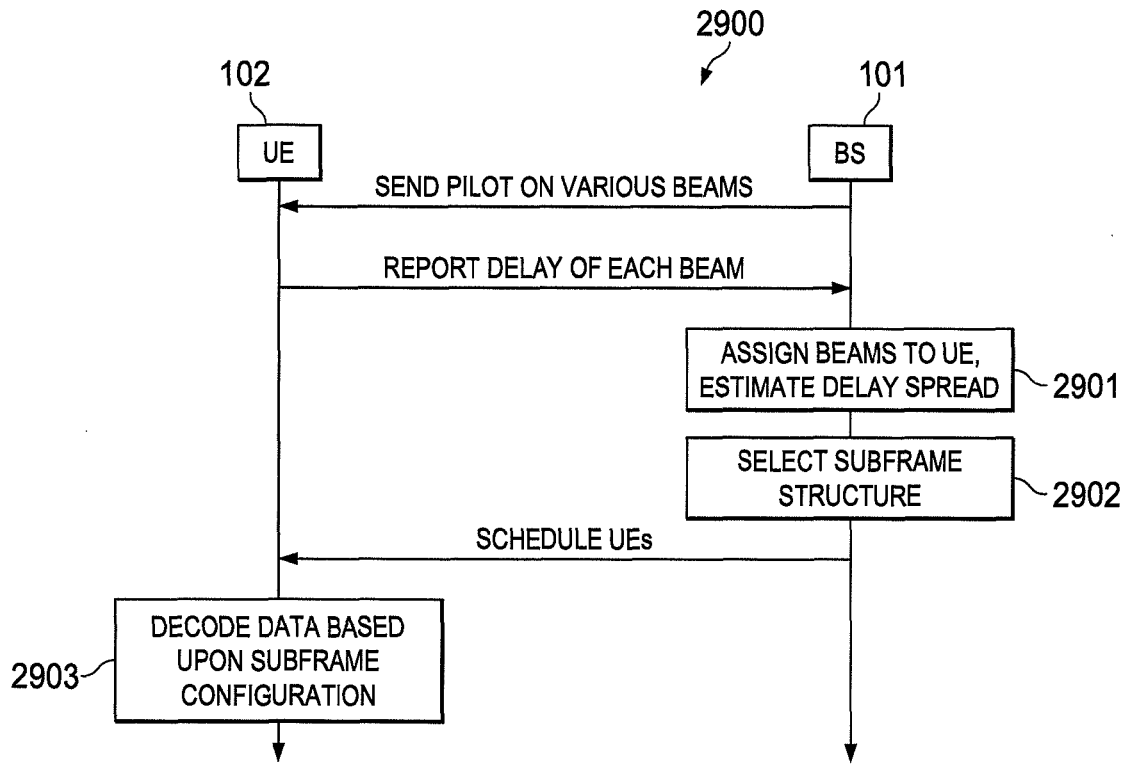
FIG. 29 is a signal timing and process flow diagram for a process of subframe configuration selection with variable duration CP within a millimeter wave wireless communications system in accordance with another embodiment of the present disclosure.

FIG. 29 is a signal timing diagram for a process of subframe configuration selection with variable duration CP within a millimeter wave wireless communications system in accordance with another embodiment of the present disclosure. The signaling procedure 2900 between the base station and the mobile station begins with the base station sending pilots on different beams. The mobile station reports the beam indices and their respective delays and the base station, after obtaining a report from each mobile station, decides upon a scheduling algorithm (2901), assigning beams to each UE. Depending upon the scheduling algorithm, the base station determines if the UE will see significant delay spread while decoding data by estimating that delay based on reported information. The base station then selects one or more subframe structures matching the UE requirements for short, medium, or long CP. Eventually the base station selects one subframe structure (2902) matching the UE requirements and signals the subframe structure selected to the UEs. The UEs subsequently decode received data based on the subframe structure indicated, until a change in subframe structure is signaled by the base station.

In a variation on the above scheme, the UE does not report the delay of each beam, but requests a CP based on the worst case delay observed and conveys that CP request to the base station. The base station, depending upon the request from each UE, decides upon a subframe type and conveys an identification of the selected subframe type to the UEs.

Figure 30:
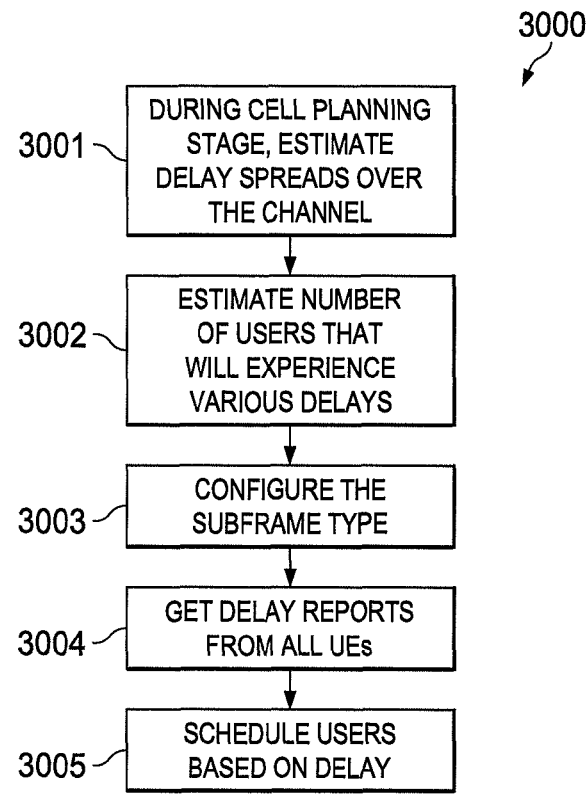
FIG. 30 is a high level flow diagram for a process of subframe configuration selection with variable duration CP within a millimeter wave wireless communications system in accordance with another embodiment of the present disclosure.

FIG. 30 is a high level flow diagram for a process of subframe configuration selection with variable duration CP within a millimeter wave wireless communications system in accordance with another embodiment of the present disclosure. In one embodiment of the present disclosure, the process 3000 of subframe configuration involves configuration at cell planning stage and is not changed thereafter. The subframe structure is selected based upon measurements and estimated delay spreads performed at the time of base station planning (step 3001), and on estimates of the number of users that will experience various delays (step 3002). During the cell planning stage, the base station can be configured with a frame type (step 3003) depending on the measurements and the expected number of users that could experience delay spread. The base station then receives delay reports from all UEs (step 3004) and schedules UEs on the large CP symbols within the selected subframe configuration based on the reports or requests from each UE (step 3005).

Figure 31:
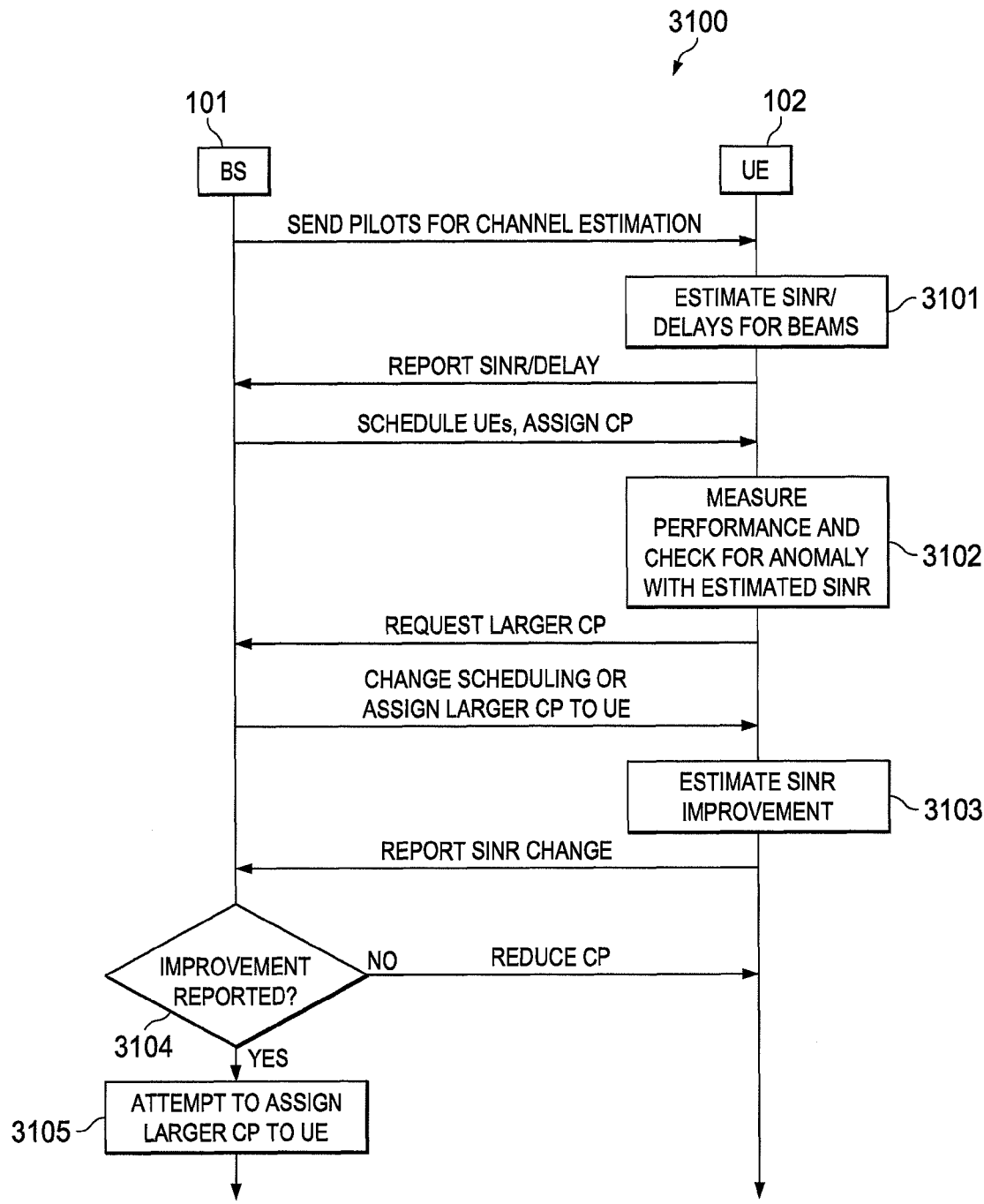
FIG. 31 is a signal timing and process flow diagram for an alternate process of subframe configuration selection with variable duration CP within a millimeter wave wireless communications system in accordance with another embodiment of the present disclosure.

FIG. 31 is a signal timing and process flow diagram for an alternate process of subframe configuration selection with variable duration CP within a millimeter wave wireless communications system in accordance with another embodiment of the present disclosure. The signaling procedure 3100 between the base station and the mobile station begins with the base station sending pilots on different beams. In this embodiment of the present disclosure, the UE determines whether significant ISI is observed by observing parameters such as frame error rate (FER), signal to interference plus noise ratio (SINR), etc. (3101), reports those estimates and receives scheduling with an assigned CP duration (short, medium, long), and looks for any anomalies (3102) based upon the SINR estimated using the pilot. If a significant discrepancy is observed between these numbers, the UE reports to the base station that the UE wishes to be scheduled with a larger CP within the subframe structure that the base station has configured. The base station can then schedule that UE in a longer CP symbol, after which UE can again estimate SINR (3103) and report whether the discrepancy is gone, making it clear (3104) whether short CP was the cause of the degradation in CQI. If not, the base station may again assign the UE a short CP, since the longer CP did not improve performance. If so, however, the base station may attempt to assign longer CPs to the UE (3105) in future frames.

Figure 32:
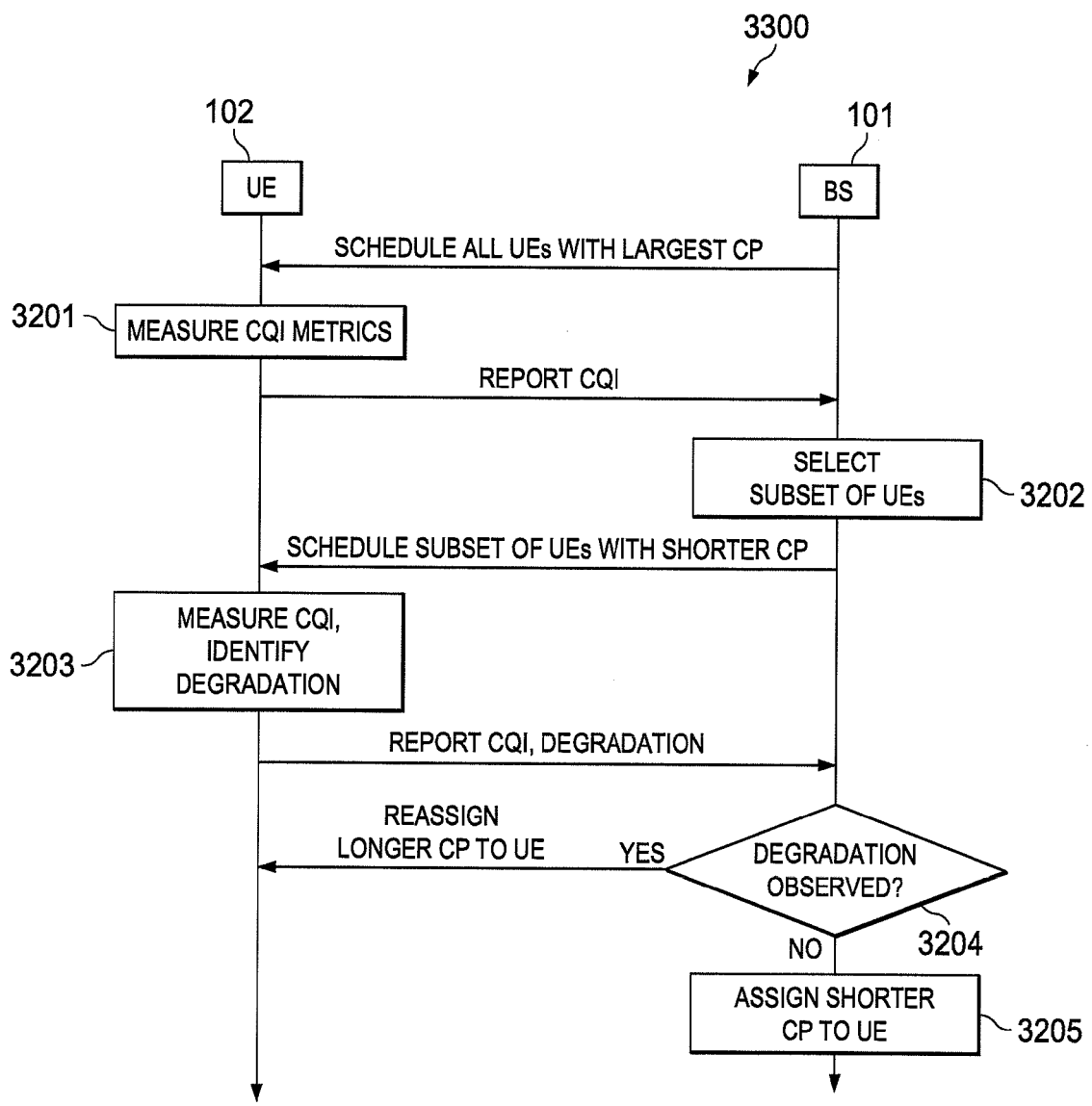
FIG. 32 is a signal timing and process flow diagram for another process subframe configuration selection with variable duration CP, without explicit feedback, within a millimeter wave wireless communications system in accordance with another embodiment of the present disclosure.

FIG. 32 is a signal timing and process flow diagram for another process of subframe configuration selection with variable duration CP, without explicit feedback, within a millimeter wave wireless communications system in accordance with another embodiment of the present disclosure. In one embodiment of the present disclosure, the base station initially schedules all UEs with the largest CP length, then, uses reports of measured CQI (3201) to select a subset of the UEs (3202) for scheduling with shorter CP lengths. Each of those UEs then reports whether degradation in the CQI was observed (3203) with the shortened CP length. If any UE does not suffer degradation (3204), then the BS continues to schedule that with the shorter CP length, otherwise schedules that UE with larger CP (3205).

Variable CP length also introduces additional issues in the decoding of the subframe. The UE decoding of the control channel generally requires knowledge of the frame structure. If the subframe type is changed dynamically, then all UEs have to know the current subframe type to be able to decode received subframes. Several solutions can resolve this issue.

Figure 33A:
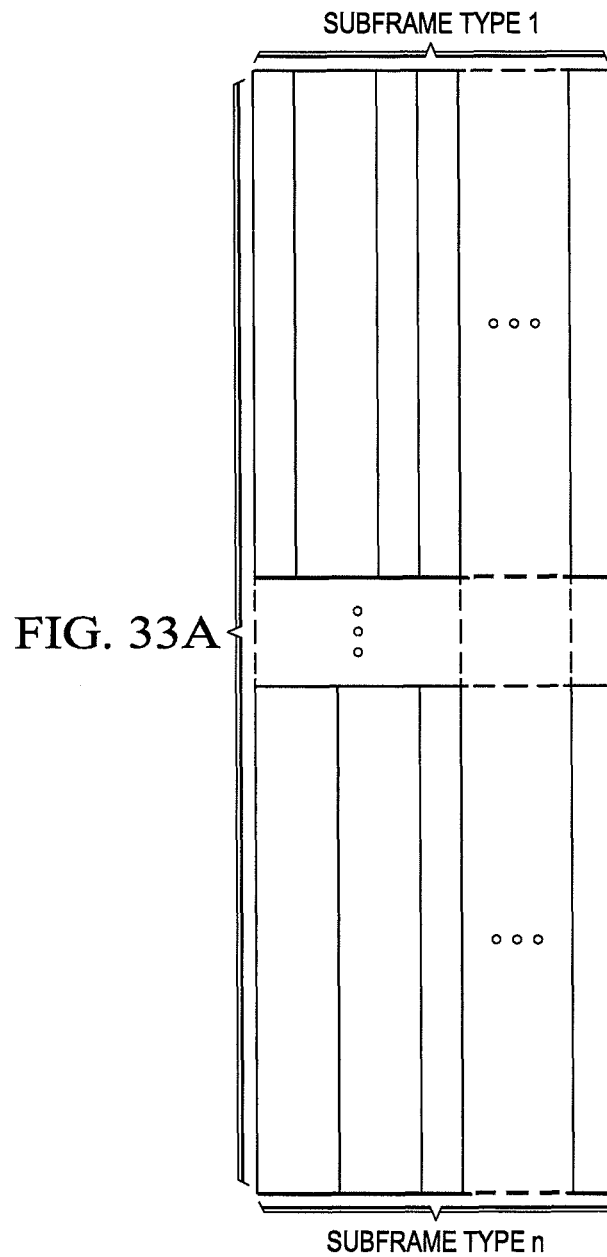
FIGS. 33A and 33B illustrate subframe types defined for use in decoding subframes configured with variable duration CP within a millimeter wave wireless communications system in accordance with another embodiment of the present disclosure.
Figure 33B:
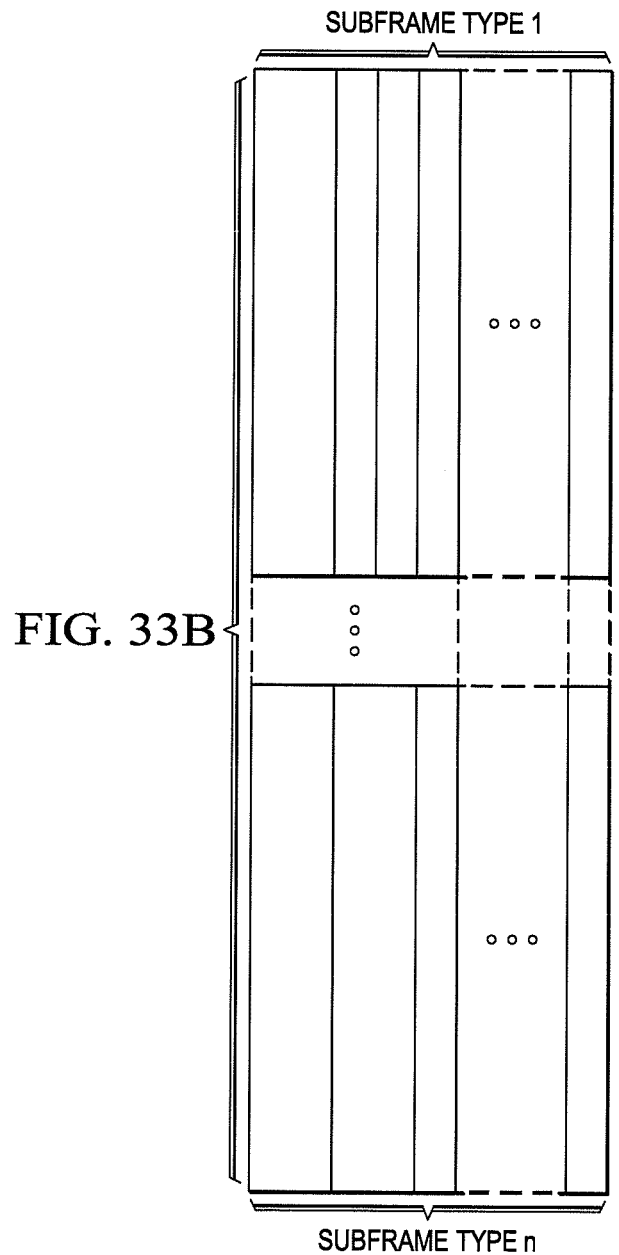

FIGS. 33A and 33B illustrate subframe types defined for use in decoding subframes configured with variable duration CP within a millimeter wave wireless communications system in accordance with another embodiment of the present disclosure. In one embodiment of the invention illustrated in FIG. 33A, no restriction is placed on the subframe structure and the subframe type is denoted within the first symbol. Each UE attempts to decode the first symbol by progressively trying out all possible defined CP values, and decodes the rest of the subframe, after recovering the type from the first symbol. This solution requires the most effort from the UEs, and possibly also need buffering of the subframe before decoding is feasible, once the first symbol is properly decoded.

In another embodiment of the present disclosure illustrated in FIG. 33B, the first OFDM symbol has always the same CP length (e.g., long) across all defined subframe types. That first OFDM symbol always contains the subframe type so that the UE can decode the rest of the subframe after decoding the first symbol. The advantage of this design is that the overhead is reduced from trying out all CP configurations before proceeding to decode the subframe.

Figure 34:
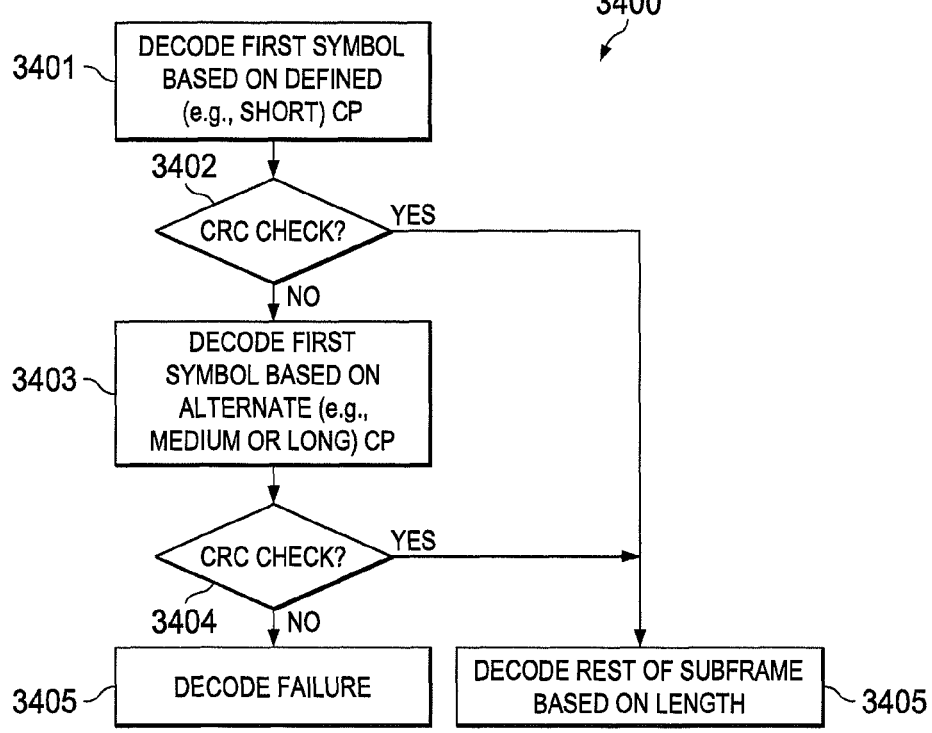
FIG. 34 is a high level flow diagram for a process of decoding subframes configured with variable duration CP within a millimeter wave wireless communications system in accordance with another embodiment of the present disclosure.

FIG. 34 is a high level flow diagram for a process of decoding subframes configured with variable duration CP within a millimeter wave wireless communications system in accordance with another embodiment of the present disclosure. The process 3400 begins with decoding the first symbol based on a selected one or a predefined one of the CP lengths (e.g., short) (step 3401). A cyclic redundancy check (CRC) of the decoded subframe is performed (step 3402). If the CRC fails, the first symbol is decoded based on an alternate (e.g., medium or long) CP (step 3403) and another CRC check of the decoded data is performed (step 3404). If either CRC passes, the remainder of the subframe is decoded based on the subframe CP configuration indicated in the first symbol (step 3405). If neither CRC check passes (once all CP lengths are tried), the decoding has failed (step 3406).

In one embodiment of the present disclosure, the subframe type is always indicated in the last symbol of the previous OFDM subframe, allowing the UEs to prepare for the next data symbol. This design allows full flexibility in choosing subframe configurations while reducing the overhead of trying out various CP lengths. Even a UE that is unaware of the subframe type can decode the last symbol of the subframe, because once a UE is synchronized the end of the subframe is known. Whatever the CP configuration may be, the UE simply needs to start decoding the symbol $T_s$ seconds before the end of the subframe.

This embodiment also enables the UE to perform a parallel decoding of the succeeding OFDM subframe. Once the last symbol is decoded, the structure of the next subframe is known and it is possible to decode the symbols in parallel, rather than waiting for the first symbol to be decoded before being able to decode the remainder of the subframe.

In one embodiment of the present disclosure, the synchronization channel or a system wide broadcast message can use a long CP. The CP configuration of the synchronization channel can be a preconfigured type, e.g., the longest CP of the all the CP types. The synchronization channel can carry information about the CP type of the current or the next subframe. Once the UE decodes the synchronization channel, the CP type of the current or the next subframe is known. Such type information may be carried explicitly in the sync channel, or implicitly on the sync channel (e.g., by partitioning the sync preamble sequences, where each partition corresponds to one type of CP).

In one embodiment of the present disclosure, the primary broadcast channel (BCH) can use long CP. The CP configuration of the BCH channel can be a preconfigured type, e.g., the longest CP of all the CP types. The BCH channel can carry information about the CP type of the current or the next subframe or frame or superframe. Once the UE decodes the BCH channel, the CP type of the current or the next subframe or frame or superframe is known. Such type information may be carried explicitly in the BCH channel.

In one embodiment of the present disclosure, the network or the base station can send information about the future subframe configuration to the UE, e.g., in a message. Such information can be sent via broadcast/multicast/unicast, etc. For example, the network or the base station can send the UE either resource mapping information or scheduling information for data communication, together with the frame and subframe number and the CP configuration (e.g., the CP configuration types, CP configuration, etc.) of the subframe.

In one embodiment of the present disclosure, the CP configuration of the subframes may not be changed very often in some situations, such as when a mobile station is not moving fast, or the environment is not changing fast. For example, a small cell can serve one or multiple UEs, all of which may not move often. If there is a need for a subframe CP configuration change, the base station can send a message including, for example, the subframe from which a change will start, or a certain time (e.g., the number of subframes) after which the change will start, and the CP configuration that will be used following the change. The UE can send confirmation about the CP reconfiguration to the BS. The BS can reconfigure the CP at the identified time. Then the UE can use the correct CP configuration to decode subframes following the change. For as long as the UE does not receive a CP reconfiguration, the UE can continue using the current CP configuration. This embodiment provides a larger time scale for CP reconfiguration.

In one extension of that embodiment, the BS can change the subframe CP only if the confirmation of the message is received from all served UEs.

In one embodiment of the present disclosure, the base station requests each UE to report back delay spread of a given beam, or can ask the UE to report back delay spread between a pair (or set) of beams. For example, in a system with two beams the reporting could be configured as follows:

TABLE III

| Base station message | UE to report delay spread |
| --- | --- |
| 0 | Beam 1 (intra-beam delay) |
| 1 | Beam 2 (intra-beam delay) |
| 2 | Beam 1-Beam 2 (inter-beam delay) |

The base station requests the delay spread information based on internal scheduling decisions. For example, if the base station wants to schedule UE on beam 1 or beam 2, the base station can request the intra-beam delay spread for these two beams and pick the beam that is most advantageous in terms of conserving overhead. The BS can also combine this information from multiple UEs while making scheduling decisions.

In an extension, the delay spread report could be part of the CQI feedback. For example, if the mobile station recommends rank 2 transmission using a pair of beams, the MS can also indicate the delay spread between these two beams, in addition to precoder, modulation and coding scheme (MCS), etc.

In one embodiment of the present disclosure, the MS uses a table of CP sizes supported by the BS to indicate the required minimum CP that the BS must use to transmit data to the MS. An example of the table of cyclic prefixes that the MS chooses from follows:

TABLE IV

| CP Index | CP Duration (ns) |
| --- | --- |
| 0 | 250 |
| 1 | 500 |
| 2 | 1000 |
| 3 | 2500 |

The index of the CP whose duration is larger than the estimated delay spread will be reported back to the BS using an uplink feedback channel. For example, if the estimated delay spread is about 650 ns, then the CP duration required to support communication should be at least 1000 ns. The MS may transmit CP INDEX=2 to the BS using an uplink feedback channel. For the four different CP indices described in the table above, a minimum of two bits are required on the uplink feedback channel to be transmitted to the BS.

In another embodiment of the present disclosure, the MS may select the CP index to be transmitted to the BS based on the worst case delay spread estimated from the different Tx-Rx beam pairs from the BS. The delay spreads for the different Tx-Rx beam pairs that are used in computing the required CP may be chosen based on a sub-set of beams pairs whose signal power, signal to interference and noise ratio, or signal to noise ratio is greater than some threshold. This threshold power value may be static and set by a BS or may be dynamically altered and indicated by the BS in a system configuration message.

In another embodiment of the present disclosure, the MS may select the CP index to be transmitted to the BS whose duration is longer than the estimated delay spreads of the M Tx-Rx beam pairs starting from the Tx-Rx beam pair with the highest power and including the M−1 Tx-Rx beam pairs ordered according to the decreasing received powers. The M beam pairs that must be used in computing the required CP Duration may be static and set by a BS or may be dynamically altered and indicated by the BS. If indicated by the BS, the set of M beam pairs may be common to all MSs, in which case the set is indicated in a system configuration message. Alternately, the BS may tailor the parameter M for each MS and indicate that value when the uplink feedback channel is being configured.

In an embodiment of the present disclosure, the MS may indicate the CP based on Tx-Rx beam pair(s) on which data is to be received. An example where the MS may choose this mode of indication is when the channel is very slowly changing. Another example where the MS may choose this mode of indication is when the required CP for the best transmit receive beam pair is much smaller than the CP computed based on the delay spread of the top M transmit receive beam pairs. In the uplink feedback channel, the MS may indicate this condition by choosing an explicit code that is to be transmitted on the uplink feedback channel. On receiving this code, the BS understands that the MS has chosen the specific CP using the estimated delay spread for specific transmit receive beam pair. The MS may use this code as an exception for some reporting intervals and resume regular reporting based on BS configuration in remaining reporting intervals.

In an embodiment of the present disclosure, the MS uses a table to quantize the observed delay spreads for indication to the BS. An example of the table for quantizing delay spreads follows:

TABLE V

| Reporting Index | DS ranges (ns) |
| --- | --- |
| 0 | DS < 500 |
| 1 | 500 < DS < 1000 |
| 2 | 1000 < DS < 2000 |
| 3 | 2000 < DS < 3000 |

The reporting index to be transmitted to the BS using an uplink feedback channel is chosen based on the configuration for each MS. Examples of the configuration include a subset of Tx-Rx beam pairs to report the delay spread ranges, or the worst delay spread among the M transmit receive beam pairs that have the highest power.

Figure 35:
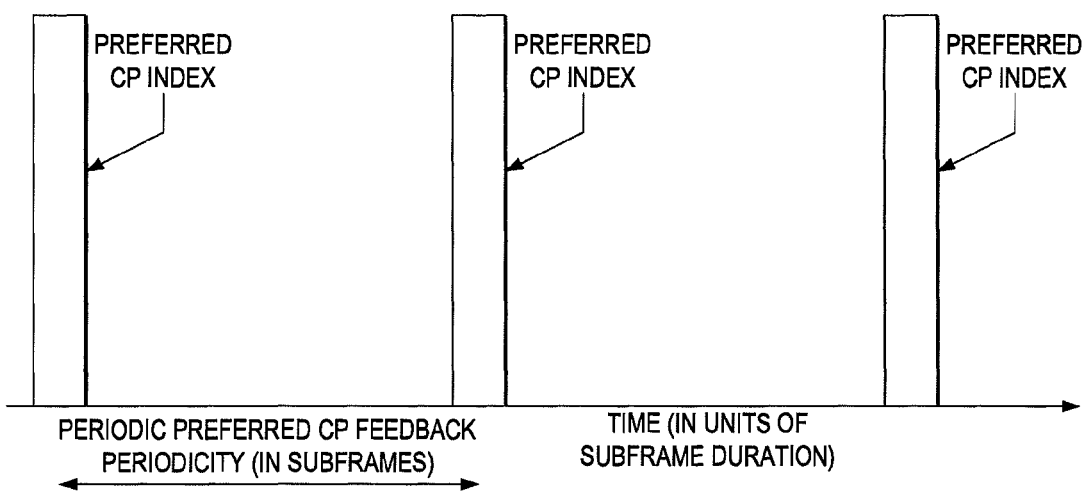
FIG. 35 is a timing diagram for CP feedback regarding variable duration CPs used within a millimeter wave wireless communications system in accordance with another embodiment of the present disclosure.
Figure 36:
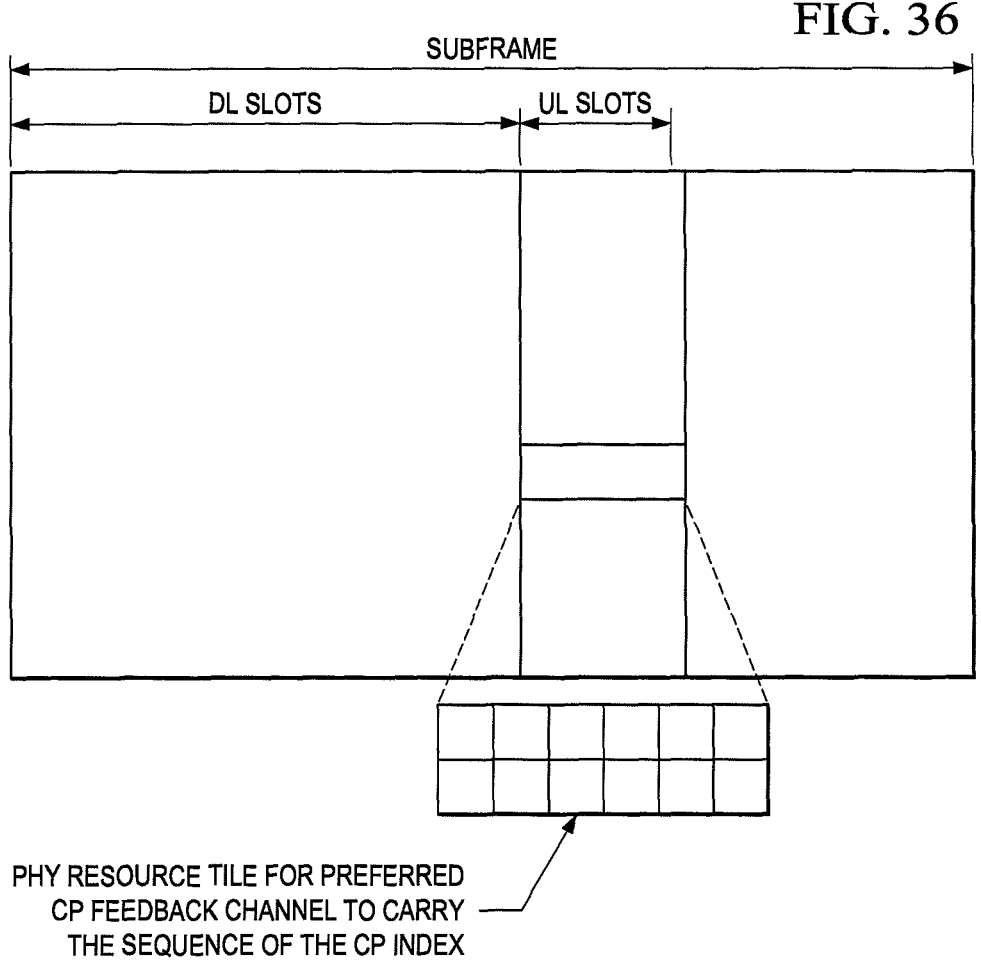
FIG. 36 illustrates the physical (PHY) layer resource tile used for CP feedback regarding variable duration CPs used within a millimeter wave wireless communications system in accordance with another embodiment of the present disclosure.

FIG. 35 is a timing diagram for CP feedback regarding variable duration CPs used within a millimeter wave wireless communications system in accordance with another embodiment of the present disclosure. FIG. 36 illustrates the physical (PHY) layer resource tile used for CP feedback regarding variable duration CPs used within a millimeter wave wireless communications system in accordance with another embodiment of the present disclosure. In an embodiment of the present disclosure, the BS may configure the format of uplink feedback channel that the MS is to use to report the preferred CP or quantized DS range as a stand-alone periodic, low data rate feedback channel. The BS may indicate the periodicity with which the MS is to report the preferred CP, the format of the report and the physical resource for the report. For example, the Preferred CP Indication (PCPI) feedback channel may use a non-coherent structure where an N length sequence is transmitted in a feedback tile composed of M subcarriers each with T symbols, occurring every P super-frames. For the exemplary table shown below, the four indices than can be reported are assigned to four sequences each of which are of length N=12. Based on the estimated DS, the MS chooses one of the four codewords that corresponds to its computation and places the selected codeword in the assigned feedback resource tile (of dimensions 2 subcarriers×6 symbols, in the example shown) before transmitting on the UL feedback slot.

TABLE VI

| Reporting Index | DS ranges (ns) | Sequence |
|---|---|---|
| 0 | DS < 500 | 111111111111 |
| 1 | 500 < DS < 1000 | 101111010110 |
| 2 | 1000 < DS < 2000 | 011010111101 |
| 3 | 2000 < DS < 3000 | 001010010100 |

Figure 37:
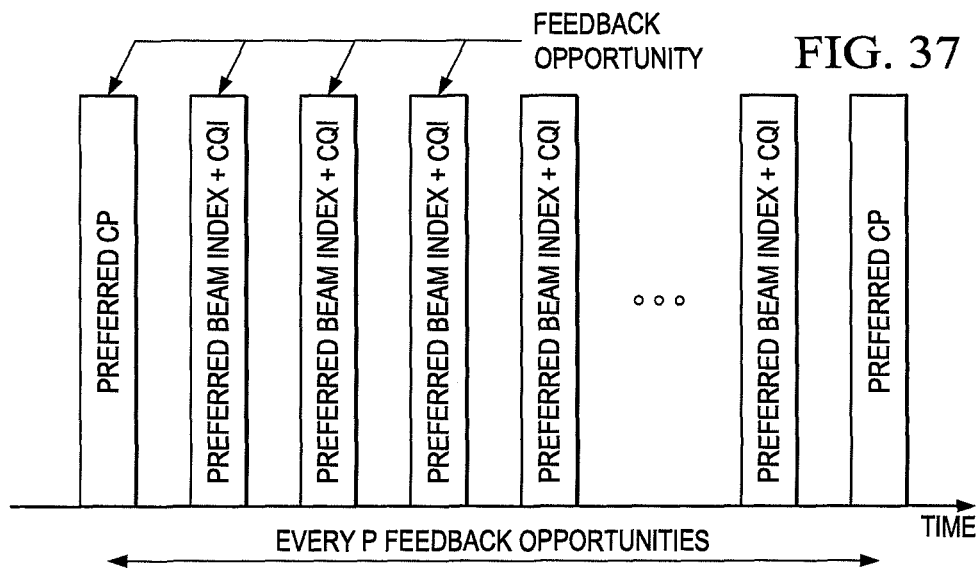
FIG. 37 is a timing diagram for CP feedback every P CQI reporting opportunities within a millimeter wave wireless communications system in accordance with another embodiment of the present disclosure.

In an embodiment of the present disclosure, the BS may configure the preferred CP or quantized DS range feedback by puncturing the periodic CQI feedback channel. The periodic CQI channel is configured as an uplink fast feedback channel so that the MS may report the current channel condition to support different transmission modes on the downlink. The BS may specify certain periodicity for the CQI feedback as illustrated in FIG. 37. In configuring the CQI feedback, the BS may indicate that in some reporting instances, the MS is expected to transmit the preferred CP or quantized DS in place of the CQI feedback. The BS will specify the puncturing interval and the type of report that the BS is expecting the MS to transmit to indicate its preferred CP.

In an embodiment of the present disclosure, the BS may reserve some sequences to be used in the uplink fast feedback channel to indicate a change in CP duration from the previous reported duration. The BS configures the uplink fast feedback channel for the MS primarily to report CQI. However, the MS may in some situations use certain reserved sequences in place of the CQI when some changes in the environment results in the change of the estimated delay spread which would need an updated CP. There is no explicit configuration to periodically report the preferred CP or quantized DS to the BS. The MS reports only if a change is required to be indicated to the BS.

In one embodiment of the present disclosure, the BS may respond to the preferred CP feedback by the MS by transmitting an acknowledgement (ACK) to the MS acknowledging and assigning the preferred CP reported as the assigned CP. The assigned CP is the CP that will be used on OFDM symbols that will be used to transmit data to the MS. The BS may also respond to the preferred CP feedback by the MS by transmitting an explicitly assigned CP to the MS that may or may not be the same as the preferred CP indicated by the MS. If the assigned CP is not the same as the preferred CP, then the assigned CP should definitely be larger than the preferred CP.

In one embodiment of the present disclosure, the BS responds to the quantized DS range feedback by the MS by transmitting an ACK to the MS acknowledging the quantized DS range. The ACK indicates the assigned CP is the one that is larger than and closest (smallest time difference) to the largest DS in the reported quantized interval. The BS may also respond to the quantized DS range feedback from the MS by transmitting an explicit assigned CP to the MS that is larger than the largest DS in the reported quantized interval.

In an embodiment of the present disclosure, the MS may use one of the uplink control channels to request bandwidth for an uplink grant to report the updated preferred CP. In this mode, the BS does not configure an explicit feedback channel for the MS to report the updated preferred CP. Instead, the MS based on the observed delay spreads performs an UL Grant request procedure to the BS and on receipt of an UL Grant transmits the updated preferred CP information to the BS. This is an on-demand configuration designed to keep the overall feedback overhead for reporting preferred CP low.

In one embodiment of the present disclosure, the downlink control channel (PDCCH) that describes the resource assignment and other information necessary for data decoding for the MSs scheduled in the sub-frame is transmitted as a single block in the first few OFDM symbols whose CP is set to be just enough to cover the largest delay spread of the MS scheduled in the slot.

Figure 38:
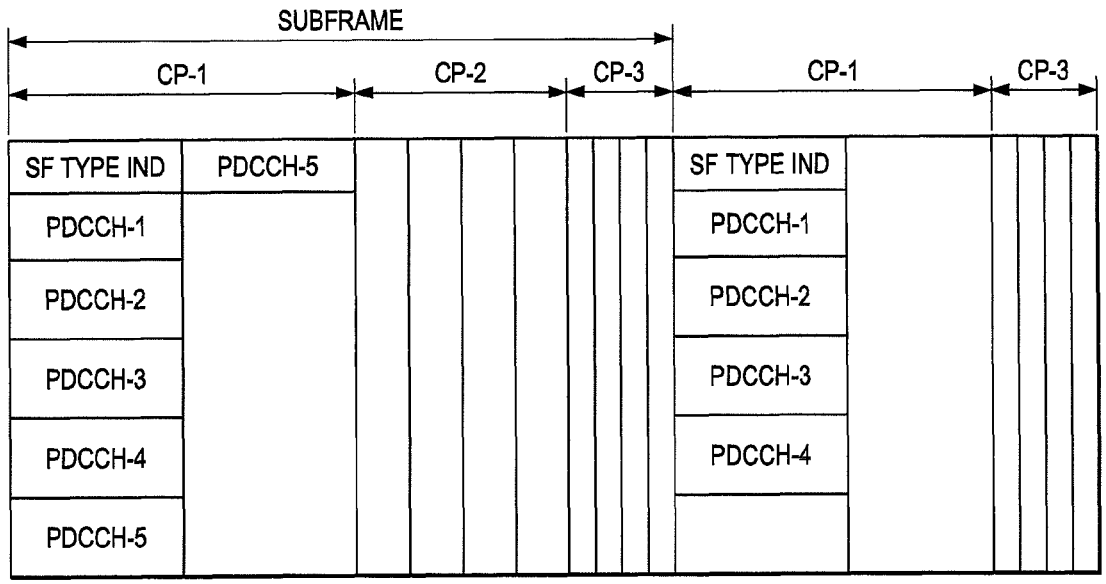
FIG. 38 illustrates assigning the PDCCH to be carried on the symbols with the largest CP within a millimeter wave wireless communications system in accordance with another embodiment of the present disclosure.

In one embodiment of the present disclosure, the PDCCH for the MSs scheduled in the sub-frame is transmitted as a single block in the first few OFDM symbols that use the largest CP allowed by the system configuration. This is done to ensure that all MSs can receive the PDCCH without any ISI and leave the optimization of the CP overhead for the symbols that carry the data. This specific scheme of indication is illustrated in FIG. 38.

In one embodiment of the disclosure, the Physical Downlink Control CHannel (PDCCH) that describes the resource assignments and other information necessary for data decoding for the MSs scheduled in the sub-frame is transmitted in a distributed fashion where the PDCCH blocks for the MSs are transmitted in the first few subcarriers/symbols of the OFDM symbols whose CP is the preferred CP for the MSs scheduled in those symbols.

Figure 39:
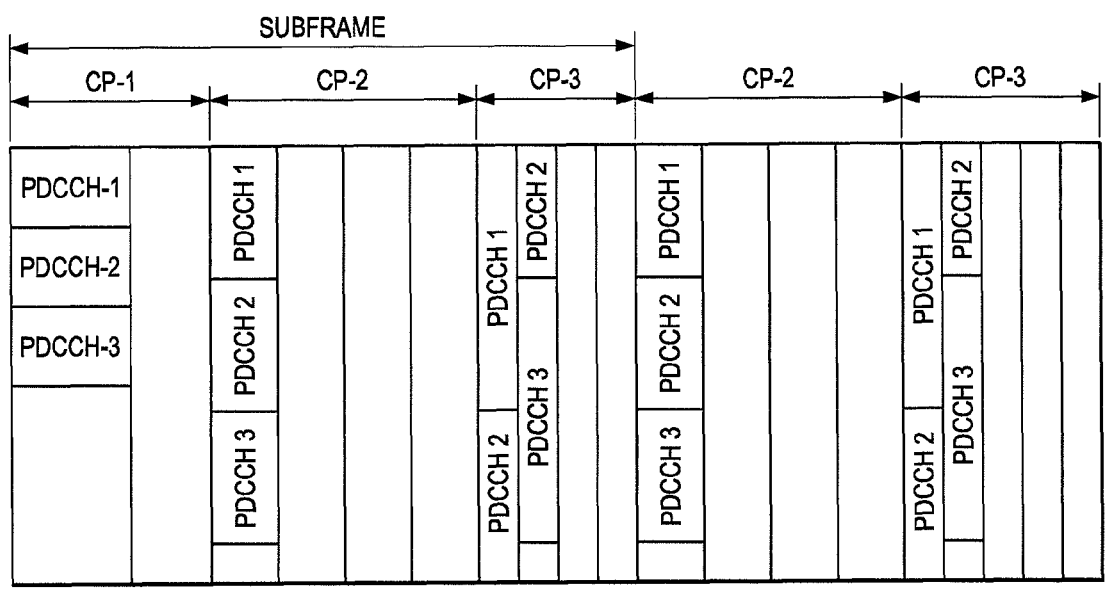
FIG. 39 illustrates distributing the PDCCH for transmission on the subcarriers of symbols having the same CP within a millimeter wave wireless communications system in accordance with another embodiment of the present disclosure.

In one embodiment of the present disclosure, the PDCCH for the MSs scheduled in the sub-frame is transmitted in a distributed fashion where the PDCCH blocks for the MSs with data allocation is multiplexed using frequency division multiplexing by using a resource tile made up of a sub-set of subcarriers and all OFDM symbols with the preferred CP for the MSs scheduled in these symbols, as illustrated in FIG. 39.

In one embodiment of the present disclosure, on reading the subframe configuration message an active MS may go to sleep mode if the CP assigned to that MS (by the BS) is not used on any OFDM symbols in the succeeding sub-frame. Thus the MS uses the sub-frame configuration that indicates the different CPs used in the sub-frame to identify if any data may be scheduled for transmission to that MS during the subframe. If the CP assigned to the MS is not used, then the MS interprets that no data may be scheduled for delivery during that subframe and immediately proceeds to go into sleep mode.

In one embodiment of the present disclosure, on reading the subframe configuration message that indicates the configuration for the succeeding N subframes, an active MS may go to sleep if the CP assigned to that MS (by the BS) is not used in the OFDM symbols of the succeeding subframes. Thus the MS uses the sub-frame configuration message to identify if any data may be scheduled to for delivery during the N subframes. If the CP assigned to the MS is not used in the subframes defined in the configuration message, then the MS interprets that no data may be scheduled for delivery and without starting an inactivity timer, proceeds to go in to the sleep mode.

while each process flow and/or timing or signal diagram depicted in the figures and described involves a sequence of steps, signals and/or events, occurring either in series or in tandem, unless explicitly stated or otherwise self-evident (e.g., signal cannot be received before being transmitted), no inference should be drawn regarding specific order of performance of steps or occurrence of the signals or events, performance of steps or portions thereof or occurrence of signals or events serially rather than concurrently or in an overlapping manner, or performance of the steps or occurrence of the signals or events depicted exclusively without the occurrence of intervening or intermediate steps, signals or events. Moreover, those skilled in the art will recognize that complete processes and signal or event sequences are not illustrated or described. Instead, for simplicity and clarity, only so much of the respective processes and signal or event sequences as is unique to the present disclosure or necessary for an understanding of the present disclosure is depicted and described.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method, comprising:
inserting, by a transmitter, a beam switching reference signal in an Orthogonal Frequency Division Multiplexing (OFDM) signal for transmission to a mobile station in a Multiple Input, Multiple Output (MIMO) wireless communications system; and
estimating delay spread, of new beams, exceeding a current cyclic prefix of the OFDM signal using the beam switching reference signal,
wherein the beam switching reference signal comprises a plurality of different time domain Zadoff Chu (ZC) sequences each based on one of a plurality of different sequence roots, wherein the ZC sequences based on the different sequence roots are inserted between sets of contiguous resource blocks in time and frequency within the OFDM signal.

2. The method according to claim 1, wherein the beam switching reference signal is a non-OFDM signal embedded into the OFDM signal.

3. The method according to claim 1, wherein a beam width, a band width and a power of the beam switching reference signal are comparable to a Physical Downlink Shared CHannel (PDSCH) transmission.

4. The method according to claim 3, wherein the beam width, band width and power of the beam switching reference signal are selected to allow estimation of a power delay profile (PDP) during data transmission.

5. The method according to claim 1, wherein the beam switching reference signal has characteristics allowing synchronization in addition to delay spread estimation.

6. The method according to claim 1, wherein the beam switching reference signal comprises cyclically shifted versions of a Zadoff Chu (ZC) sequence that are orthogonal to one another.

7. The method according to claim 6, wherein the beam switching reference signal comprises a ZC sequence that is orthogonal to a ZC sequence within a beam switching reference signal used in an adjacent sector or an adjacent cell.

8. The method according to claim 1, wherein the ZC sequences are interleaved over an entire band of the OFDM signal.

9. The method according to claim 8, wherein guard tones or active interference cancellation (AIC) tones are inserted between the ZC sequences and OFDM tones formed by the sets of contiguous resource blocks.

10. The method of claim 1, wherein estimating the delay spread of the new beams is performed by the mobile station, and
wherein the beam switching reference signal is configured to enable the mobile station to estimate, of the new beams, delay spread exceeding the current cyclic prefix of the OFDM signal.

11. A system, comprising:
a transmitter configured to:
transmit an Orthogonal Frequency Division Multiplexing (OFDM) signal to a mobile station in a Multiple Input, Multiple Output (MIMO) wireless communications system, the OFDM signal including a current cyclic prefix, and
insert a beam switching reference signal into the OFDM signal, wherein the beam switching reference signal is configured to enable the mobile station to estimate, of new beams, delay spread exceeding the current cyclic prefix of the OFDM signal,
wherein the beam switching reference signal comprises a plurality of different time domain Zadoff Chu (ZC) sequences each based on one of a plurality of different sequence roots, wherein the ZC sequences based on the different sequence roots are inserted between sets of contiguous resource blocks in time and frequency within the OFDM signal.

12. The system according to claim 11, wherein the beam switching reference signal is a non-OFDM signal embedded into the OFDM signal.

13. The system according to claim 11, wherein a beam width, a band width and a power of the beam switching reference signal are comparable to a Physical Downlink Shared CHannel (PDSCH) transmission.

14. The system according to claim 13, wherein the beam width, band width and power of the beam switching reference signal are selected to allow estimation of a power delay profile (PDP) during data transmission.

15. The system according to claim 11, wherein the beam switching reference signal has characteristics allowing synchronization in addition to delay spread estimation.

16. The system according to claim 11, wherein the beam switching reference signal comprises cyclically shifted version of a Zadoff Chu (ZC) sequence that are orthogonal to one another.

17. The system according to claim 16, wherein the beam switching reference signal comprises a ZC sequence that is orthogonal to a ZC sequence within a beam switching reference signal used in an adjacent sector or an adjacent cell.

18. The system according to claim 11, wherein the ZC sequences are interleaved over an entire band of the OFDM signal.

19. The system according to claim 11, wherein guard tones or active interference cancellation (AIC) tones are inserted between the ZC sequences and OFDM tones formed by the sets of contiguous resource blocks.

20. A system, comprising:
a transmitter configured to transmit an Orthogonal Frequency Division Multiplexing (OFDM) signal to a receiver in a Multiple Input, Multiple Output (MIMO) wireless communications system or the receiver is configured to receive the OFDM signal from the transmitter,
wherein the OFDM signal includes a beam switching reference signal inserted by the transmitter, the beam switching reference signal having at least one of:
a power corresponding to a single Physical Downlink Shared CHannel (PDSCH) symbol spread over a plurality of OFDM symbols, and
frequency domain signal characteristics enabling the receiver to estimate a power delay profile (PDP), and wherein the beam switching reference signal is configured to enable the receiver to estimate, of new beams, delay spread exceeding a current cyclic prefix of the OFDM signal, and wherein the beam switching reference signal comprises a plurality of different time domain Zadoff Chu (ZC) sequences each based on one of a plurality of different sequence roots, wherein the ZC sequences based on the different sequence roots are inserted between sets of contiguous resource blocks in time and frequency within the OFDM signal.

21. The system according to claim 20, wherein a cyclic prefix for symbols within the OFDM signal covers a delay spread for all beams between the transmitter and the receiver.

22. A method, comprising:
transmitting data from a base station to a first mobile station in a Multiple Input, Multiple Output (MIMO) wireless communications system using a first beam pair, determining a delay spread for each of a plurality of different beams between the base station and the first mobile station using a beam switching reference signal inserted by the base station into an Orthogonal Frequency Division Multiplexing (OFDM) signal carrying the data; and
at least one of:
selecting a second beam pair of the plurality of beams on which subsequent frames of the data are transmitted from the base station to the first mobile station based on one or more determined delay spreads, and
setting a cyclic prefix to exceed each of the one or more determined delay spreads,
wherein the beam switching reference signal is configured to enable the first mobile station to estimate, of the second beam pair, delay spread exceeding a current cyclic prefix of the OFDM signal; and wherein the beam switching reference signal comprises a plurality of different time domain Zadoff Chu (ZC) sequences each based on one of a plurality of different sequence roots, wherein the ZC sequences based on the different sequence roots are inserted between sets of contiguous resource blocks in time and frequency within the OFDM signal.

23. The method according to claim 22, wherein the second beam pair has a delay spread greater than a delay spread of the first beam pair.

24. The method according to claim 22, further comprising at least one of:
scheduling a second mobile station having a delay spread greater than a delay spread difference between the first beam pair and the second beam pair to receive data on the first beam pair after the base station switches transmitting data to the first mobile station from the first beam pair to the second beam pair;
inserting a quiet time for the first beam pair after the base station switches transmitting data to the first mobile station from the first beam pair to the second beam pair; and
inserting a large cyclic prefix for a symbol transmitted on the first beam pair after the base station switches transmitting data to the first mobile station from the first beam pair to the second beam pair.

25. The method according to claim 22, wherein switching transmission of data from the base station to the first mobile station from the first beam pair to the second beam pair occurs at a slot boundary.

26. The method according to claim 22, wherein the second beam pair has a delay spread greater than the cyclic prefix of the first beam pair.

27. The method according to claim 22, wherein a duration of the cyclic prefix is selected from a plurality of predetermined durations for the cyclic prefix.

* * * * *